(12) United States Patent
Kido et al.

(10) Patent No.: US 10,119,042 B2
(45) Date of Patent: Nov. 6, 2018

(54) INK, INKJET PRINTING APPARATUS, INKJET PRINTING METHOD, AND PRINTED MATTER

(71) Applicants: Masahiro Kido, Kanagawa (JP); Juichi Furukawa, Kanagawa (JP); Hidefumi Nagashima, Kanagawa (JP); Yuta Nakamura, Kanagawa (JP); Masaaki Tsuda, Kanagawa (JP); Hikaru Kobayashi, Kanagawa (JP); Yukihiro Imanaga, Tokyo (JP); Michihiko Namba, Kanagawa (JP); Hiroaki Takahashi, Kanagawa (JP); Takahiro Yoshida, Ibaraki (JP)

(72) Inventors: Masahiro Kido, Kanagawa (JP); Juichi Furukawa, Kanagawa (JP); Hidefumi Nagashima, Kanagawa (JP); Yuta Nakamura, Kanagawa (JP); Masaaki Tsuda, Kanagawa (JP); Hikaru Kobayashi, Kanagawa (JP); Yukihiro Imanaga, Tokyo (JP); Michihiko Namba, Kanagawa (JP); Hiroaki Takahashi, Kanagawa (JP); Takahiro Yoshida, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 31 days.

(21) Appl. No.: 15/382,139

(22) Filed: Dec. 16, 2016

(65) Prior Publication Data

US 2017/0174919 A1 Jun. 22, 2017

(30) Foreign Application Priority Data

Dec. 18, 2015 (JP) ................................. 2015-246907
Oct. 14, 2016 (JP) ................................. 2016-202805

(51) Int. Cl.
*C09D 11/03* (2014.01)
*C09D 11/102* (2014.01)
*C09D 11/36* (2014.01)

(52) U.S. Cl.
CPC .............. *C09D 11/36* (2013.01); *C09D 11/03* (2013.01); *C09D 11/102* (2013.01)

(58) Field of Classification Search
None
See application file for complete search history.

(56) References Cited

U.S. PATENT DOCUMENTS 8,382,271 B2    2/2013  Goto et al.
8,721,034 B2 *  5/2014  Yokohama ........... C09D 11/037
                                              347/100

(Continued)

FOREIGN PATENT DOCUMENTS

JP    2005-220352    8/2005
JP    2007-191556    8/2007

(Continued)

OTHER PUBLICATIONS

U.S. Appl. No. 15/201,741, filed Jul. 5, 2016.
U.S. Appl. No. 15/212,586, filed Jul. 18, 2016.
U.S. Appl. No. 15/236,858, filed Aug. 15, 2016.

*Primary Examiner* — Vu A Nguyen
(74) *Attorney, Agent, or Firm* — Oblon, McClelland, Maier & Neustadt, L.L.P.

(57) ABSTRACT

An ink including: water; at least one organic solvent; a polysiloxane surfactant; and acryl-silicone resin particles, where the polysiloxane surfactant has an HLB value of 8 or less.

19 Claims, 13 Drawing Sheets

(56) References Cited

U.S. PATENT DOCUMENTS

| | | |
|---|---|---|
| 8,883,275 B2 | 11/2014 | Nagashima et al. |
| 8,899,719 B2 | 12/2014 | Nagashima et al. |
| 9,108,439 B2 | 8/2015 | Toda et al. |
| 9,163,160 B2 | 10/2015 | Toda et al. |
| 9,243,158 B2 | 1/2016 | Toda et al. |
| 9,284,464 B2 | 3/2016 | Nagashima et al. |
| 9,321,923 B2 | 4/2016 | Nakagawa et al. |
| 9,340,692 B2 | 5/2016 | Nakagawa et al. |
| 9,358,810 B2 | 6/2016 | Fujii et al. |
| 9,446,606 B2 | 9/2016 | Fujii et al. |
| 2005/0176847 A1 | 8/2005 | Cagle |
| 2007/0197685 A1* | 8/2007 | Aruga ............... C09D 11/322 523/160 |
| 2009/0033704 A1* | 2/2009 | Mori ..................... B41M 5/00 347/19 |
| 2009/0047431 A1* | 2/2009 | Hatada ............... C09D 11/101 427/256 |
| 2010/0033523 A1* | 2/2010 | Suzuki ................. B41J 2/1752 347/9 |
| 2010/0196601 A1 | 8/2010 | Goto et al. |
| 2013/0155145 A1 | 6/2013 | Gotou et al. |
| 2014/0192121 A1 | 7/2014 | Bannai et al. |
| 2014/0204156 A1* | 7/2014 | Gotou .................... B41J 2/01 347/100 |
| 2014/0272327 A1* | 9/2014 | Fujii ....................... B41M 5/50 428/195.1 |
| 2014/0368572 A1* | 12/2014 | Goto .................. C09D 11/322 347/20 |
| 2015/0017396 A1 | 1/2015 | Nakagawa et al. |
| 2015/0050467 A1 | 2/2015 | Nakagawa et al. |
| 2015/0191614 A1 | 7/2015 | Nagashima et al. |
| 2015/0258783 A1 | 9/2015 | Toda et al. |
| 2015/0329731 A1 | 11/2015 | Fujii et al. |
| 2015/0361282 A1 | 12/2015 | Nakagawa et al. |
| 2015/0368492 A1 | 12/2015 | Fujii et al. |
| 2016/0032122 A1 | 2/2016 | Toda et al. |
| 2016/0068697 A1 | 3/2016 | Toda et al. |
| 2016/0102220 A1 | 4/2016 | Kido et al. |
| 2016/0264808 A1* | 9/2016 | Kido ................... C09D 11/322 |
| 2016/0272834 A1 | 9/2016 | Kobayashi et al. |
| 2016/0355695 A1 | 12/2016 | Nakagawa et al. |

FOREIGN PATENT DOCUMENTS

| | | |
|---|---|---|
| JP | 2007-217671 | 8/2007 |
| JP | 2008-095089 | 4/2008 |
| JP | 2008-101192 | 5/2008 |
| JP | 2008-163238 | 7/2008 |
| JP | 2009-019198 | 1/2009 |
| JP | 2009-155488 | 7/2009 |
| JP | 2011-094082 | 5/2011 |
| JP | 2013-076018 | 4/2013 |
| JP | 2013-123852 | 6/2013 |
| JP | 2013-177559 | 9/2013 |
| JP | 2013-194161 | 9/2013 |
| JP | 2014-140993 | 8/2014 |
| JP | 2015-054934 | 3/2015 |

* cited by examiner

INK, INKJET PRINTING APPARATUS, INKJET PRINTING METHOD, AND PRINTED MATTER

CROSS-REFERENCE TO RELATED APPLICATIONS

The present application claims priority under 35 U.S.C. § 119 to Japanese Patent Application No. 2015-246907, filed Dec. 18, 2015 and Japanese Patent Application No. 2016-202805, filed Oct. 14, 2016. The contents of which are incorporated herein by reference in their entirety.

BACKGROUND OF THE INVENTION

Field of the Invention

The present disclosure relates to an ink, an inkjet printing apparatus, an inkjet printing method, and a printed matter.

Description of the Related Art

Impermeable print media such as plastic films are used for industrial purposes such as advertisements and signages in order to improve durabilities such as light resistance, water resistance, and wear resistance. There have been developed various inks intended for use on the impermeable print media.

Widely used among such inks are solvent-based inks using an organic solvent as a solvent and ultraviolet-curable inks mainly made of a polymerizable monomer. However, there are concerns that the solvent-based inks may become hazardous to the environment through solvent vaporization. The ultraviolet-curable inks may be limited in selection of polymerizable monomers to be used in terms of safety.

Hence, there have been proposed water-based inks that are lowly environmentally hazardous and can be printed directly over impermeable print mediums (see Japanese Unexamined Patent Application Publication Nos. 2005-220352 and 2011-094082).

SUMMARY OF THE INVENTION

According to one aspect of the present disclosure, an ink includes water, at least one organic solvent, a polysiloxane surfactant, and acryl-silicone resin particles. The polysiloxane surfactant has an HLB value of 8 or less.

DESCRIPTION OF THE EMBODIMENTS (Ink)

Figure 1:
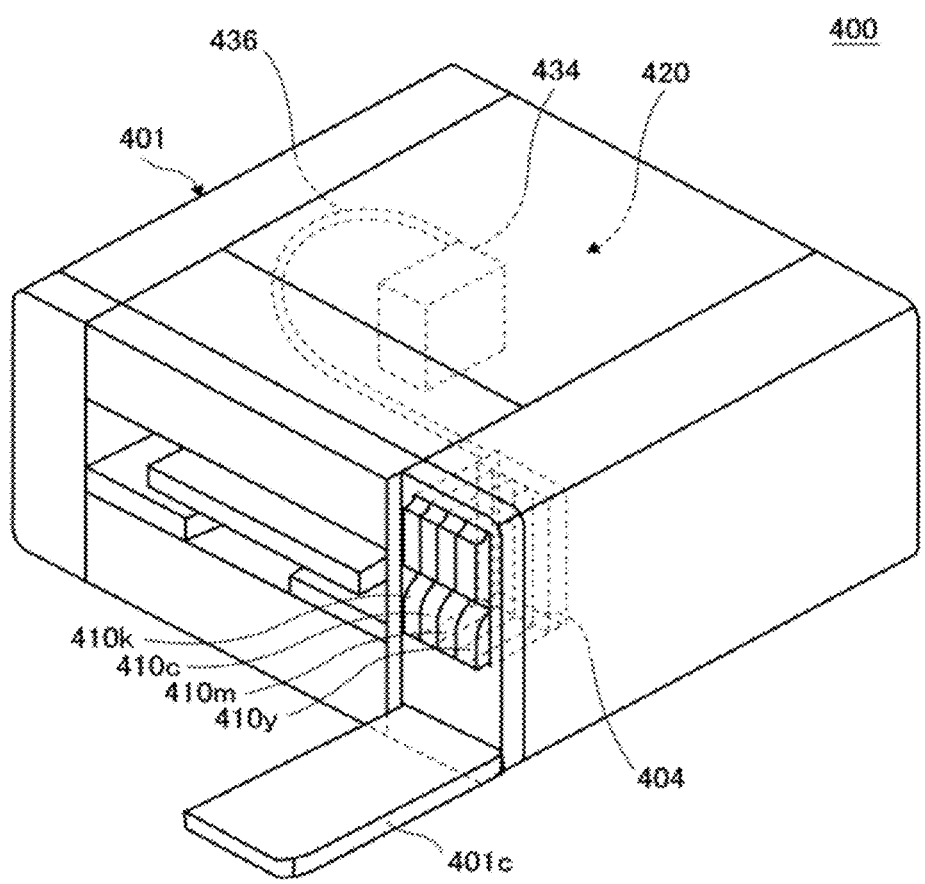
FIG. 1 is an explanatory perspective view illustrating an example of a serial type image forming apparatus.

An ink of the present disclosure includes water, an organic solvent, a polysiloxane surfactant, and acryl-silicone resin particles. The polysiloxane surfactant has an HLB value of 8 or less. The ink further includes other components if necessary.

The ink of the present disclosure is based on the findings described below. Specifically, solvent inks are generally excellent in fixability to impermeable print media because organic solvents in the inks swell the impermeable print media to fix the inks. Meanwhile, existing aqueous inks form final printed matters where the ink coated films remain on print media. Therefore, the ink coated films have insufficient fixability to the print media and the aqueous inks are deteriorated in high-speed printing ability, which is problematic. Moreover, considering that inks will be used for outdoor applications, printed matters formed with the inks are required to have properties that are much more excellent than printed matters formed with aqueous inks to be used in indoor applications (e.g., high rubfastness and high image strength). However, the ink of the present disclosure is based on the finding that the existing aqueous inks do not sufficiently achieve the above-described properties compatible to the solvent inks, which is problematic.

Moreover, the present inventors have found the following.

Specifically, among components in an ink, choice of a surfactant affects fixability of the ink to an impermeable print medium to be printed. Therefore, roles of the surfactant is considerably large. The present inventors have found that a compound having an HLB value of 8 or less among polysiloxane surfactants is added to the ink, which makes it possible to considerably improve the ink in fixability. Although this reason has been unknown, it is assumed that an HLB value satisfying 8 or less makes hydrophilic property high, resulting in improvement of affinity to various impermeable print media.

It is found that when the ink is improved in fixability to the impermeable print medium, it is possible to prevent a phenomenon (beading) that after ink droplets are landed, adjacent ink droplets are combined and contracted even in the high-speed recording, which makes it possible to obtain an image having high qualities. In addition, it is found that improvement of fixing speed makes it possible to improve drying ability and close adhesiveness, and thus the ink can be prevented from being transferred onto a reverse side of paper when the print medium is wound after printing.

However, when the HLB value is 8 or less, balance between water solubility and oil solubility may be inclined to oil solubility. In that case, in an aqueous ink including water component in an amount of more than 30% relative to the total amount of the components, a surfactant is hardly dissolved in the ink, which easily causes phase separation where the ink is separated into an oil phase and an aqueous phase. As a result, the ink may be deteriorated in storage stability.

The present inventors have found that when acryl-silicone resin particles are added in a predetermined amount to the ink, the polysiloxane surfactant can be stabilized in the ink. Therefore, it is possible to solve phase separation of the ink within such a temperature range that the ink is assumed to be used for an inkjet printing ink.

According to the present disclosure, it is possible to provide an ink having a favorable storage stability and capable of forming an image that is excellent in fixability and close adhesiveness to an impermeable print medium.
<Polysiloxane Surfactant>

Examples of the polysiloxane surfactant include compounds obtained by incorporating a hydrophilic group or a hydrophilic polymer chain into a side chain of a compound (silicone compounds) including a polysiloxane structure such as polydimethylsiloxane; and compounds obtained by incorporating a hydrophilic group or a hydrophilic polymer chain into a terminal part of a compound (silicone compounds) including a polysiloxane structure such as polydimethylsiloxane. Here, the polysiloxane surfactant may include a polysiloxane structure in its structure. Therefore, the polysiloxane surfactant also means a polysiloxane-based surfactant.

Examples of the hydrophilic group and the hydrophilic polymer chain include polyether groups (e.g., polyethylene oxide, polypropylene oxide, and copolymers thereof), polyglycerin (e.g., $C_3H_6O(CH_2CH(OH)CH_2O)_n$—H), pyrrolidone, betaines (e.g., $C_3H_6N^+(C_2H_4)_2$—$CH_2COO$—), sulfates (e.g., $C_3H_6O(C_2H_4O)_n$—$SO_3Na$), phosphates (e.g., $C_3H_6O(C_2H_4O)_n$—P(=O)OHONa), and quaternary salts (e.g., $C_3H_6N^+(C_2H_4)_3Cl^-$). Here, in the chemical formula, n represents an integer of 1 or more. Among them, incorporation of a polyether group is preferable.

Moreover, a vinyl-based copolymer may be suitably used, where the vinyl-based copolymer includes, at a side chain, a silicone-based compound chain (e.g., polydimethylsiloxane), which is obtained through copolymerization of polydimethylsiloxane incorporating a polymerizable vinyl group into a terminal part and another monomer capable of copolymerizing with the polydimethylsiloxane (at least one part of the monomer preferably includes a hydrophilic monomer such as (meth) acrylic acid and a salt thereof).

Among them, compounds including a polysiloxane structure and a hydrophilic polymer chain are preferable. More preferably, the compounds include a polyether group as the hydrophilic polymer chain. Particularly preferable are non-ionic surfactants which are obtained by incorporating methylpolysiloxane serving as the hydrophobic group and a polyoxyethylene structure serving as the hydrophilic group into the polysiloxane structure.

An HLB value of the polysiloxane surfactant is 8 or less, preferably 4.5 or more but 7.0 or less. When the HLB value is 8 or less, the ink can secure excellent fixability to various impermeable print media even when inkjet printing is performed. Moreover, when the HLB value is 4.5 or more but 7.0 or less, a temperature at which the ink does not cause phase separation can be increased.

Here, the HLB value means a balance between a hydrophilic group and a lipophilic group of the surfactant. The HLB value ranges from 0 through 20. As the HLB value is closer to 0, the surfactant has higher lipophilic property. As the HLB value is closer to 20, the surfactant has higher hydrophilic property. The HLB value is defined by the following formula (Griffin's method).

HLB value=20×(sum of formula weight of hydrophilic portions/molecular weight)

Examples of the polysiloxane surfactant include polyether-modified silicone and polyoxyalkylene group-including silicone compounds.

The polysiloxane surfactant may be a commercially available product. Examples of the commercially available product include: SILFACE SAG 005 (HLB value: 7.0) and SILFACE SAG 008 (HLB value: 7.0), (available from Nissin Chemical Industry Co., Ltd.); FZ 2110 (HLB: 1.0), FZ 2166 (HLB value: 5.8), SH-3772M (HLB value: 6.0), L7001 (HLB value: 7.4), and SH-3773M (HLB value: 8.0), (available from Dow Corning Toray Co., Ltd.); KF-945 (HLB value: 4.0), KF-6017 (HLB value: 4.5), (available from Shin-Etsu Chemical Co., Ltd.); and FormBan MS-575 (available from Ultra Addives Inc., HLB value: 5.0).

An amount of the polysiloxane surfactant is preferably 0.1% by mass or more but 4.0% by mass or less, more preferably 1.0% by mass or more but 2.0% by mass or less, relative to the total amount of the ink. When the amount is 0.1% by mass or more but 4.0% by mass or less, the ink can be improved in fixability to various impermeable print media and can also be improved in image qualities such as gloss level.
<Acryl-Silicone Resin Particles>

The acryl-silicone resin particles make it possible to prevent generation of separation of the polysiloxane surfactant in the ink. The ink preferably includes other resin particles in order to improve other properties.

The acryl-silicone resin particles are silicone-modified acrylic resin particles that can be obtained through polymerization of an acrylic-based monomer and a silane compound in the presence of an emulsifying agent and, if necessary, a silane coupling agent.

Examples of the acrylic-based monomer include: acrylic ester monomers such as methyl acrylate, ethyl acrylate, butyl acrylate, acrylic acid-2-ethylhexyl, 2-hydroxyethyl acrylate, acryloylmorpholine, and N,N'-dimethylaminoethyl acrylate; and amide-based acrylates such as N-methylolacrylamide and methoxymethylacrylamide. These may be used alone or in combination.

Examples of the silane compounds include tetramethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, hexyltrimethoxysilane, hexyltriethoxysilane, decyltrimethoxysilane, decyltriethoxysilane, and trifluoropropyltrimethoxysilane. These may be used alone or in combination.

Examples of the emulsifying agent include alkylbenzene sulfonic acid or salts thereof, dialkylsulfosuccinic acid esters or salts thereof, alkylnaphthalenesulfonic acid or salts thereof, formalin condensates of alkylnaphthalenesulfonate, higher fatty acid salts, sulfonates of higher fatty acid esters, ethylenediamine polyoxypropylene-polyoxyethylene condensates, sorbitan fatty acid esters or salts thereof, aromatic or aliphatic phosphate esters or salts thereof, formalin condensates of dodecylbenzene sulfonate, dodecyl sulfates, lauryl sulfates, dialkyl sulphosuccinates, polyoxyethylene alkyl phenyl ether sulfates, polyoxyethylene alkyl propenyl phenyl ether sulfates, alkyl phenyl ether disulfonates, polyoxyethylene alkyl phosphates, polyoxyethylene alkyl ether acetates, polyoxyethylene lanolin alcohol ethers, polyoxyethylene lanolin fatty acid esters, lauryl alcohol ethoxylate, laurylether sulfuric acid ester salts, lauryl ether phosphate esters, sorbitan fatty acid esters, fatty acid diethanolamide, and naphthalene sulfonic acid. These may be used alone or in combination.

Here, examples of the salt include sodium salts and ammonium salts.

As the emulsifying agent, a reactive emulsifying agent including an unsaturated double bond can be used.

Examples of the reactive emulsifying agent include: ADEKA REASOAP series SE, NE, and PP (available from ADEKA CORPORATION); LATEMUL S-180 (available from Kao Corporation); ELEMINOL JS-2 and ELEMINOL RS-30 (available from Sanyo Chemical Industries, Ltd.); and AQUALON RN-20 (available from DKS Co. Ltd.).

Examples of the silane coupling agent include vinyltrichlorosilane, vinyltrimethoxysilane, vinyltriethoxysilane, p-styryltrimethoxysilane, 3-methacryloxypropyl methyldimethoxysilane, 3-methacryloxypropyl trimethoxysilane, 3-methacryloxypropyl methyldiethoxysilane, 3-methacryloxypropyl triethoxysilane, 3-acryloxypropyltrimethoxysilane, N-2-(aminoethyl)3-aminopropyl methyldimethoxysilane, N-2-(aminoethyl)3-aminopropyl trimethoxysilane, N-2-(aminoethyl)3-aminopropyl triethoxysilane, 3-aminopropyl trimethoxysilane, 3-aminopropyl triethoxysilane, 3-triethoxysilyl-N-(1,3-dimethyl-butylidene)propylamine, N-phenyl-3-aminopropyl trimethoxysilane, hydrochlorides of N-(vinylbenzyl)-2-aminoethyl-3-aminopropyl trimethoxysilane, 3-ureidopropyltriethoxysilane, 3-chloropropyl trimethoxysilane, 3-mercaptopropyl methyldimethoxysilane, 3-mercaptopropyl trimethoxysilane, bis(triethoxysilylpropyl) tetrasulfide, and 3-isocyanatepropyl triethoxysilane.

A volume average particle diameter of the acryl-silicone resin particles is preferably 10 nm or more but 300 nm or less, more preferably 40 nm or more but 200 nm or less. When the volume average particle diameter is 10 nm or more, the resin emulsion can be prevented from increasing the viscosity when synthesized, resulting in improvement of discharging stability. When the volume average particle diameter is 300 nm or less, nozzles of the printer can be prevented from clogging of the acryl-silicone resin particles and generation of poor discharging.

An amount of a silicone derived from the acryl-silicone resin particles is preferably 0.01% by mass or more but 0.04% by mass or less relative to the total amount of the ink. The amount satisfying 0.01% by mass or more makes it possible to obtain a coated film excellent in rubfastness and resistance to markers. The amount satisfying 0.04% by mass or less makes it possible to improve storage stability.

A glass transition temperature (Tg) of the acryl-silicone resin particles is preferably 0° C. or less, more preferably −15° C. or more but 0° C. or less. The glass transition temperature satisfying 0° C. or less makes it possible to improve close adhesiveness.

A minimum film forming temperature of the acryl-silicone resin particles is preferably 20° C. or less. The minimum film forming temperature satisfying 20° C. or less makes it possible to improve fixability. That is, a dirty print medium, which is caused, on a printed portion on the print medium, by being scratched or using a marker to remove a pigment, can be prevented.

As the acryl-silicone resin particles, a commercially available product may be used. Specific examples of the commercially available product include AQ 914 (available from Daicel FineChem Ltd., solid concentration: 24% by mass, Tg: 50° C.), SA-6360 (available from DIC Corporation, solid concentration: 50% by mass, Tg: 21° C.), SYMAC 480 (available from Toagosei Company, Limited, solid concentration: 30% by mass, Tg: 0° C.), AE 980 (available from Emulsion Technology Co., Ltd., solid concentration: 50% by mass, Tg: −14° C.), AE 981A (available from Emulsion Technology Co., Ltd., solid concentration: 50% by mass, Tg: −15° C.), and AE 982 (available from Emulsion Technology Co., Ltd., solid concentration: 50% by mass, Tg: 0° C.).

An amount of the acryl-silicone resin particles is preferably 0.5% by mass or more but 5% by mass or less, more preferably 0.8% by mass or more but 2.5% by mass or less relative to the total amount of the ink.

[Mass Ratio (B/A)]

A mass ratio (B/A) of an amount A (% by mass) of the polysiloxane surfactant to an amount B (% by mass) of the acryl-silicone resin particles is preferably 0.6 or more but 1.8 or less, more preferably 0.8 or more but 1.5 or less. When the mass ratio (B/A) is 0.6 or more but 1.8 or less, a temperature at which separation of the polysiloxane surfactant occurs can rise and an ink excellent in image qualities such as gloss level can be provided.

<Other Resin Particles>

Examples of the other resin particles include: additive synthetic resin particles such as polyurethane resin particles, fluororesin particles, vinyl chloride resin particles, polyester resin particles, acryl-styrene copolymer resin particles, polyvinyl alcohol resin particles, epoxy resin particles, polyamide resin particles, polyether resin particles, polyolefin resin particles, polystyrene-based resin particles, polyvinylester resin particles, and unsaturated carboxylic acid-based resins; and natural polymers such as celluloses, rosins, and natural rubbers. These may be used alone or in combination. Among them, polyurethane resin particles, fluororesin particles, vinyl chloride resin particles, polyester resin particles, acryl-styrene copolymer resin particles, and polyvinyl alcohol resin particles are preferable.

<<Polyurethane Resin Particles>>

The polyurethane resin particles can impart high image gloss level and rubfastness to the ink. Surprisingly, when the polysiloxane surfactant, the acryl-silicone resin particles, and the polyurethane resin particles are used in combination, a coated film to be formed after printing can be significantly improved in solvent resistance in addition to rubfastness.

Examples of the polyurethane resin particles include polyether polyurethane resin particles, polycarbonate polyurethane resin particles, and polyester polyurethane resin particles.

The polyurethane resin particles are not particularly limited and may be appropriately selected depending on the intended purpose. Examples of the polyurethane resin particles include polyurethane resin particles obtained by reacting polyol with polyisocyanate.

Polyol

Examples of the polyol include polyether polyols, polycarbonate polyols, and polyester polyols. These may be used alone or in combination.

Polyether Polyols

Examples of the polyether polyols include polyether polyol obtained by allowing at least one of compounds including 2 or more active hydrogen atoms serving as a starting material, to polymerize through addition of alkylene oxide.

Examples of the compounds including 2 or more active hydrogen atoms include ethylene glycol, diethylene glycol, triethylene glycol, propylene glycol, trimethylene glycol, 1,3-butanethol, 1,4-butanediol, 1,6-hexanediol, glycerin, trimethylolethane, and trimethylolpropane. These may be used alone or in combination.

Examples of the alkylene oxide include ethylene oxide, propylene oxide, butylene oxide, styrene oxide, epichlorohydrin, and tetrahydrofuran. These may be used alone or in combination.

The polyether polyols are not particularly limited and may be appropriately selected depending on the intended purpose. Poolyoxytetramethylene glycols and polyoxypropylene glycols are preferable in order to obtain a binder for an ink, which can impart a considerably excellent rubfastness to the ink. These may be used alone or in combination.

Polycarbonate Polyols

Examples of the polycarbonate polyols that can be used for producing the polyurethane resin particles include: polycarbonate polyols obtained by reacting ester carbonate with polyol; and polycarbonate polyols obtained by reacting phosgene with, for example, bisphenol A. These may be used alone or in combination.

Examples of the ester carbonate include methyl carbonate, dimethyl carbonate, ethyl carbonate, diethyl carbonate, cyclocarbonate, and diphenyl carbonate. These may be used alone or in combination.

Examples of the polyol include: dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-hepetanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcin, bisphenol-A, bisphenol-F, and 4,4'-biphenol; polyether polyols such as polyethylene glycols, polypropylene glycols, and polyoxytetramethylene glycols; and polyester polyols such as polyhexamethylene adipates, polyhexamethylene succinates, and polycaprolactones. These may be used alone or in combination.

Polyester Polyols

Examples of the polyester polyols include polyester polyols obtained by allowing a low-molecular-weight polyol and polycarboxylic acid to undergo esterification reaction, polyesters obtained by allowing a cyclic ester compound (e.g., ε-caprolactone) to undergo ring-opening polymerization reaction, and copolymerized polyesters of these polyesters. These may be used alone or in combination.

Examples of the low-molecular-weight polyol include ethylene glycol and propylene glycol. These may be used alone or in combination.

Examples of the polycarboxylic acid include succinic acid, adipic acid, sebacic acid, dodecanedicarboxylic acid, terephthalic acid, isophthalic acid, phthalic acid, and anhydrides or ester-forming derivatives of these acids. These may be used alone or in combination.

Polyisocyanate

Examples of the polyisocyanate include: aromatic diisocyanates such as phenylene diisocyanate, tolylene diisocyanate, diphenylmethane diisocyanate, and naphthalene diisocyanate; and aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, and 2,2,4-trimethylhexamethylene diisocyanate. These may be used alone or in combination. Among them, alicyclic diisocyanates are preferable in terms of weather resistance over a long period of time, because the ink of the present disclosure will be used also for outdoor use such as a poster or a signage, so that the ink needs to form a coating film having a very high weather resistance over a long period of time.

Furthermore, additional use of at least one alicyclic diisocyanate makes it easier to obtain a coating film having an intended strength and an intended rubfastness.

Examples of the alicyclic diisocyanate include isophorone diisocyanate and dicyclohexylmethane diisocyanate.

An amount of the alicyclic diisocyanate is preferably 60% by mass or more relative to the total amount of isocyanate compounds.

[Method for Producing Polyurethane Resin Particles]

The polyurethane resin particles can be obtained according to producing methods hitherto commonly used. One example of the producing methods hitherto commonly used includes the following method.

First, in the absence of a solvent or in the presence of an organic solvent, the polyol is allowed to react with the polyisocyanate in an equivalent ratio so that isocyanate groups are excessively present, to produce an isocyanate-terminated urethane prepolymer.

Next, anionic groups in the isocyanate-terminated urethane prepolymer are optionally neutralized with a neutralizing agent and allowed to react with a chain extender, and, finally, the organic solvent in a system is optically removed. As a result, the polyurethane resin particles are obtained.

Examples of the organic solvent that can be used for producing the polyurethane resin particles include: ketones such as acetone and methyl ethyl ketone; ethers such as tetrahydrofuran and dioxane; ester acetates such as ethyl acetate and butyl acetate; nitriles such as acetonitrile; and amides such as dimethyl formamide, N-methylpyrrolidone, and N-ethylpyrrolidone. These may be used alone or in combination.

Examples of the chain extender include polyamines and other active hydrogen group-containing compounds.

Examples of the polyamines include: diamines such as ethylene diamine, 1,2-propane diamine, 1,6-hexamethylenediamine, piperazine, 2,5-dimethyl piperazine, isophoronediamine, 4,4'-dicyclohexylmethane diamine, and 1,4-cyclohexane diamine; polyamines such as diethylenetriamine, dipropylene triamine, and triethylene tetramine; hydrazines such as hydrazine, N,N'-dimethyl hydrazine, and 1,6-hexamethylene bishydrazine; and dihydrazides such as succinic dihydrazide, adipic dihydrazide, glutaric dihydrazide, sebacic dihydrazide, and isophthalic dihydrazide. These may be used alone or in combination.

Examples of the other active hydrogen group-containing compounds include glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenols such as bisphenol A, 4,4'-dihyroxy diphenyl, 4,4'-dihydroxydiphenyl ether, 4,4'-dihydroxydiphenyl sulfone, hydrogenated bisphenol A, and hydroquinone; and water. These may be used alone or in combination so long as the ink is not deteriorated in storage stability.

As the polyurethane resin particles, polycarbonate polyurethane resin particles are preferable because carbonate groups have high cohesive force, which makes it possible to achieve favorable water resistance, heat resistance, wear resistance, weather resistance, and image rubfastness. Use of the polycarbonate polyurethane resin particles makes it possible to obtain an ink suitable for a printed matter to be used in a severe environment such as outdoor.

The polyurethane resin particles may be commercially available products. Examples of the commercially available products include YUKOTO UX-485 (polycarbonate polyurethane resin particles), YUKOTO UWS-145 (polyester polyurethane resin particles), PAMARIN UA-368T (polycarbonate polyurethane resin particles), and PAMARIN UA-200 (polyether polyurethane resin particles (all available from Sanyo Chemical Industries, Ltd.). These may be used alone or in combination.

<<Fluororesin Particles>>

The fluororesin particles make it possible to improve image gloss level, rubfastness, and weather resistance. Surprisingly, when the olysiloxane surfactant, the acryl-silicone resin particles, and the fluororesin particles are used in combination, a coated film to be formed after printing can be significantly improved in solvent resistance and weather resistance in addition to rubfastness.

The fluororesin particles also mean fluorine-based resin particles so long as a structure of the fluororesin particles includes fluorine.

Examples of the fluororesin particles include: fluororesin particles including a constitutional unit derived from fluoroolefin and fluororesin particles including a fluorine-substituted-group-including structural unit; and fluororesin particles including a constitutional unit derived from fluoroolefin and a constitutional unit derived from vinylether.

Examples of the fluororesin particles including a constitutional unit derived from fluoroolefin and fluororesin particles including a fluorine-substituted-group-including structural unit include 4,5-difluoro-2,2-bis(trifluoromethyl)-1,3-dioxole/fluoroolefin copolymer resin particles.

The constitutional unit derived from fluoroolefin is not particularly limited and may be appropriately selected depending on the intended purpose. Examples of the constitutional unit derived from fluoroolefin include —$CF_2CF_2$—, —$CF_2CF(CF_3)$—, and —$CF_2CFCl$—.

The constitutional unit derived from vinylether is not particularly limited and may be appropriately selected depending on the intended purpose. Specific examples of the constitutional unit derived from vinylether include the following structural units.

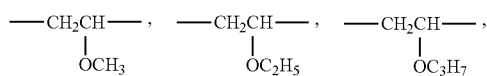

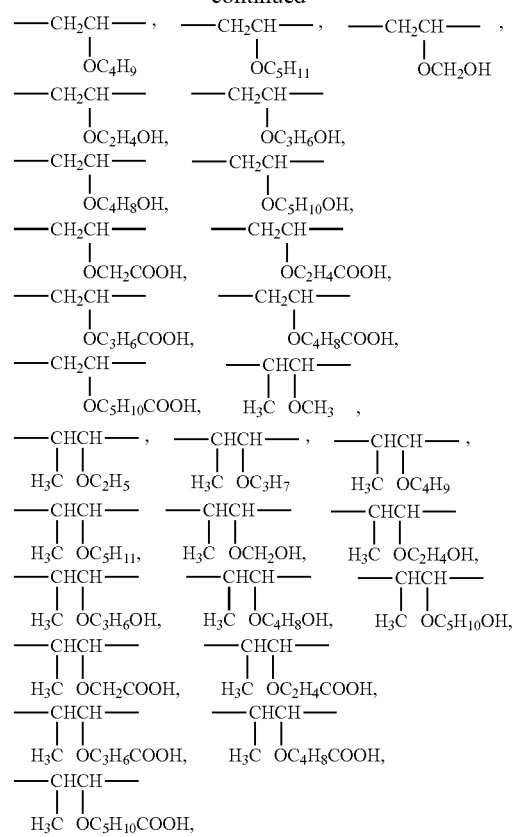

A glass transition temperature (Tg) of the fluororesin particles is preferably 100° C. or more but 300° C. or less, more preferably 150° C. or more but 250° C. or less. When the glass transition temperature is 100° C. or more but 300° C. or less, it is possible to maintain a shape of the fluororesin particles serving as particles even when an image, which has been formed on an impermeable print medium with an ink, is dried within a range of 50° C. or more but 150° C. or less (i.e., a general temperature at which an image is dried), the ink including fluororesin particles and one or more resin particles other than the fluororesin particles. Therefore, a homogeneous film including the one or more resin particles other than the fluororesin particles cannot be prevented. In addition, the fluororesin particles behave just like fillers, and thus a resin formed of the one or more resin particles other than the fluororesin particles can be improved in intensity. From this point of view, a glass transition temperature of the fluororesin particles to be used is preferably higher than a temperature at which the printed matter is dried, more preferably higher than the temperature by 20° C. or more, particularly preferably higher than the temperature by 50° C. or more.

The fluororesin particles may be appropriately synthesized or may be commercially available products.

Examples of the commercially available products include: product name: AF 1600 (Tg: 160° C.) and product name: AF 2400 (Tg: 240° C.) among TEFLON (Registered Trademark) AF series (available from Du Pont-Mitsui Fluorochemicals Company, Ltd.): and product name: LUMIFLON FE 4400 (available from ASAHI GLASS CO., LTD., Tg: 48° C.).

A mass ratio (fluororesin particles/resin particles other than the fluororesin particles) of an amount (% by mass) of the fluororesin particles to a total amount (% by mass) of resin particles other than the fluororesin particles is preferably 0.05 or more but 4.0 or less, more preferably 0.1 or more but 2.0 or less, particularly preferably 0.2 or more but 1.5 or less. When the mass ratio (fluororesin particles/resin particles other than the fluororesin particles) is 0.05 or more but 4.0 or less, favorable properties attributed to the fluororesin particles can be imparted to the image without deteriorating properties of a film formed of the resin particles other than the fluororesin particles.

The fluororesin particles are preferably added to the ink in a form of an emulsion. An emulsion of the fluororesin particles can be obtained through phase-transfer emulsification or suspension polymerization of tetrafluoroethylene (TFE) or through phase-transfer emulsification of polytetrafluoroethylene (PTFE).

The phase-transfer emulsification is performed by mixing water, a surfactant, and a solution of fluororesin particles, where the solution is obtained by dissolving fluororesin particles in an organic solvent such as tetrafluoroethylene (TFE). In the present disclosure, preferably, the surfactant has been added to a solution including the fluororesin particles, and water is gradually charged into the solution to perform dispersion. This method makes it possible to obtain a water dispersion having an average particle diameter of 500 nm or less. Therefore, when the inkjet printing method is used, printing can be performed without causing nozzle clogging due to the fluororesin particles.

Here, the phase-transfer emulsification means that a system is allowed to change from an organic solvent phase to a water phase by adding water to an organic solvent solution of the fluororesin in such an amount that the water is more than an amount of the organic solvent in the organic solvent solution of the fluororesin.

In a solution of the fluororesin particles in which the fluororesin particles are dissolved in an organic solvent such as tetrafluoroethylene (TFE), an amount of the fluororesin particles is preferably 10% by mass or more but 70% by mass or less, more preferably 20% by mass or more but 60% by mass or less, particularly preferably 30% by mass or more but 50% by mass or less, relative to the total amount of the solution of the fluororesin particles. When the amount is 70% by mass or less, it is possible to prevent an increase of viscosity when the fluororesin particles are mixed with water in the subsequent dispersion step and a volume average particle diameter of a water dispersion to be obtained can be reduced, resulting in improvement of storage stability. When the amount is 10% by mass or more, a concentration of the fluororesin can be prevented from being decreased in the subsequent dispersion step. Therefore, the organic solvent needs not to be removed in many amounts in the solvent-removing step.

An apparatus configured to dissolve the fluororesin particles in the organic solvent is not particularly limited and may be appropriately selected depending on the intended purpose so long as the apparatus includes a bath to which liquid can be discharged and can appropriately stir materials.

In addition, when the fluororesin particles are hardly dissolved, heating may be performed.

A temperature in the dispersion step is preferably 40° C. or less, more preferably 30° C. or less, still more preferably 20° C. or less, particularly preferably 15° C. or less. When the temperature is 40° C. or less, it is possible to obtain a water dispersion having an average particle diameter of 500 nm or less even when an amount of the surfactant is low. The temperature in the dispersion step is preferably retained to 40° C. or less throughout this step. However, a solution temperature rises easily through shearing heat generated under stirring and thus a temperature of the system may not be retained. Even in this case, the temperature in the dispersion step is preferably adjusted to 40° C. or less (i.e., so that the temperature does not become more than 40° C.) until water is completely added in an amount 0.8 times the amount of the organic solvent contained in the fluororesin particles solution, more preferably adjusted to 40° C. or less until water is completely added in an amount 1 time the amount of water, particularly preferably adjusted to 40° C. or less until water is completely added in an amount 1.1 times the amount of water.

<<Vinyl Chloride Resin Particles>>

The vinyl chloride resin particles make it possible to improve high image gloss level and rubfastness. Surprisingly, when the polysiloxane surfactant, the acryl-silicone resin particles, and the vinyl chloride resin particles are used in combination, variation in the ink properties during the long-term storage can be greatly prevented and stability of viscosity over time can be improved.

As the vinyl chloride resin particles, vinyl chloride-ethylene copolymer resin particles and vinyl chloride-acryl copolymer resin particles are preferable in terms of securing miscibility with a pigment and any other resin particles contained in the ink. Vinyl chloride-ethylene copolymer resin particles are more preferable because of an excellent close adhesiveness with a non-polar print medium.

The vinyl chloride resin particles are not particularly limited and may be commercially available products. Examples of the commercially available products include commercially available vinyl chloride resin particles, commercially available vinyl chloride-acryl copolymer resin particles, and commercially available vinyl chloride-ethylene copolymer resin particles. These may be used alone or in combination.

Examples of the commercially available vinyl chloride resin particles include product No. 985 (solid content: 40% by mass, anionic) among VINYBLAN (registered trademark) series available from Nissin Chemical Co., Ltd.

Examples of the commercially available vinyl chloride-acryl copolymer resin particles include product Nos. 278 (solid content: 43% by mass, anionic), 700 (solid content: 30% by mass, anionic), 701 (solid content: 30% by mass, anionic), 711 (solid content: 30% by mass, anionic), 721 (solid content: 30% by mass, anionic), 700FS (solid content: 30% by mass, anionic), 701RL35 (solid content: 30% by mass, anionic), 701RL (solid content: 30% by mass, anionic), and 701RL65 (solid content: 30% by mass, anionic) among VINYBLAN (registered trademark) series available from Nissin Chemical Co., Ltd. These may be used alone or in combination.

Examples of the commercially available vinyl chloride-ethylene copolymer resin particles include product Nos. 1010 (solid content: 50+1% by mass, anionic), 1210 (solid content: 50±1% by mass, anionic), and 1320 (solid content: 50±1% by mass, anionic) among SUMIELITE (registered trademark) series available from Sumika Chemtex Co., Ltd. These may be used alone or in combination.

Examples of other commercially available products include product Nos. E15/48A (solid content: 50% by mass, anionic) and E22/48A (solid content: 30% by mass, anionic) among VINNOL series (available from Wacker Chemie AG) that are vinyl chloride copolymer resin particles and are obtained by incorporating a hydroxyl component into a vinyl chloride resin. These may be used alone or in combination.

<<Polyester Resin Particles>>

The polyester resin particles make it possible to improve high image gloss level and rubfastness. Surprisingly, when the polysiloxane surfactant, the acryl-silicone resin particles, and polyester resin particles are used in combination, a printed image can be significantly improved in weather resistance.

In order to obtain an image having weather resistance, it is preferable that the polyester resin particles do not include any hydrophilic components which remain on a coated film after drying, such as sulfonates or the emulsifying agent.

The polyester resin particles are may be appropriately synthesized or may be commercially available products.

Examples of the commercially available products include: product Nos. KZA-1449 (solid content: 30% by mass, anionic), KZA-3556 (solid content: 30% by mass, anionic), and KZA-0134 (solid content: 30% by mass, anionic) among EMULSION ELIETEL (registered trademark) series available from Unitika Ltd.; and product Nos. A-124GP (solid content: 25% by mass), A-125S (solid content: 30% by mass), and A-160P (solid content: 25% by mass) among PESRESIN A series available from Takamatsu Oil & Fat Co., Ltd. These may be used alone or in combination.

<<Acryl-Styrene Copolymer Resin Particles>>

The acryl-styrene copolymer resin particles make it possible to improve high image gloss level and rubfastness. Surprisingly, the polysiloxane surfactant, the acryl-silicone resin particles, and the acryl-styrene copolymer resin particles are used in combination, discharging reliability during recording can be greatly improved.

The acryl-styrene copolymer resin particles make it possible to prevent nozzle from clogging, resulting in improvement of discharging stability.

The acryl-styrene copolymer resin particles may be appropriately synthesized or may be commercially available products.

Examples of the commercially available products include RIKABOND series RIKABOND ET-700 (available from Japan Coating Resin Corporation), POLYMARON series (available from ARAKAWA CHEMICAL INDUSTRIES, LTD.), and J-140A, QE-1042 (available from SEIKO PMC CORPORATION).

<<Polyvinyl Alcohol Resin Particles>>

The polyvinyl alcohol resin particles make it possible to improve water resistance, solvent resistance, and fixability to an impermeable print medium. Surprisingly, when the polysiloxane surfactant, the acryl-silicone resin particles, and the polyvinyl alcohol resin particles are used in combination, the pigment can be improved in stability in a state of dispersion, resulting in further improvement of weather resistance and storage stability.

The polyvinyl alcohol resin particles can be produced by saponifying a polyvinyl acetate resin obtained through polymerization of polyvinyl acetate monomers. In the saponifying step, acetate groups of polyvinyl acetate are substituted with hydroxyl groups using an alkali catalyst in a methanol solvent. At this time, an amount of the hydroxyl groups to be substituted affects water resistance of a coated film including a polyvinyl alcohol resin to be obtained. The parts of the hydroxyl groups are hydrophilic and the part of the acetate groups have hydrophobicity, which results in excellence in surface active ability.

The polyvinyl alcohol resin particles may be appropriately synthesized or may be commercially available products.

Examples of the commercially available products include product name: POVAL JF-04, product name: POVAL JF-05, and product name: POVAL JF-17 (all of the products are available from JAPAN VAM & POVAL CO., LTD.).

The ink is preferably obtained by mixing a resin emulsion with materials such as a colorant and an organic solvent, where the resin emulsion is obtained by dispersing the resin particles in water serving as a dispersion medium.

Considering that operation of adjustment of an aqueous ink obtained by mixing resin particles with an organic solvent, a colorant, and water is easy and the resin particles are homogeneously dispersed in the ink as possible, a resin emulsion, which is a state that the resin particles are stably dispersed in water serving as a dispersion medium, is preferably added to the ink.

The resin particles dissolved in the organic solvent to be added to the ink make it easier to form a film, which results in formation of a film-like print layer. When the organic solvent and water are evaporated, formation of the film of the resin particles is promoted. Therefore, use of the ink of the present disclosure makes it possible to print an image without performing a heating step.

Upon dispersing the resin particles into water serving as a dispersion medium, forced emulsification resin particles utilizing a dispersing agent and self-emulsifying resin particles including an anionic group in a molecular structure, may be used for the resin particles. Among them, self-emulsifying resin particles including an anionic group in a molecular structure are preferable in order to improve the printed matter in intensity.

An acid value of the anionic groups of the self-emulsifying resin particles is preferably 5 mg KOH/g or more but 100 mg KOH/g or less, more preferably 5 mg KOH/mg or more but 50 mg KOH/mg or less in terms of dispersibility in water, rubfastness, and chemical resistance.

Examples of the anionic groups include a carboxyl group, a carboxylate group, a sulfonic group, and a sulfonate group. Among them, a carboxylate group and a sulfonate group that are partially or totally neutralized with, for example, a basic compound are preferable from the viewpoint of maintaining good water-dispersion stability. It is possible to use a monomer containing the anionic groups in order to incorporate the anionic groups into the resin.

Examples of a method for producing a water dispersion of the resin particles containing the anionic groups include a method for adding a basic compound which can be used for neutralizing the anionic groups in the water dispersion.

Examples of the basic compound include: organic amines such as ammonia, trimethyl amine, pyridine, and morpholine; alkanol amines such as monoethanolamine; and metallic base compounds containing, for example, Na, K, Li, or Ca. These may be used alone or in combination.

One exemplary method for producing a water dispersion using the forced-emulsifying resin particles includes a method for producing the water dispersion using a surfactant such as a nonionic surfactant and an anionic surfactant. These may be used alone or in combination. Among them, the method using a nonionic surfactant is preferable in terms of water resistance.

Examples of the nonionic surfactants include polyoxyethylene alkyl ether, polyoxyethylene alkylene alkyl ether, polyoxyethylene derivatives, polyoxyethylene fatty acid esters, polyoxyethylene polyvalent alcohol fatty acid esters, polyoxyethylene propylene polyols, sorbitan fatty acid esters, sorbitan fatty acid esters, polyoxyethylene hydrogenated castor oils, polyoxyalkylene polycyclic phenyl ethers, polyoxyethylene alkylamines, alkylalkanolamides, and polyalkylene glycol (meth)acrylates. Among these nonionic surfactants, preferable are polyoxyethylene alkylethers, polyoxyethylene fatty acid esters, polyoxyethylene sorbitan fatty acid esters, and polyoxyethylene alkylamines. These may be used alone or in combination.

Examples of the anionic surfactants include alkyl sulfuric acid ester salts, polyoxyethylene alkylether sulfates, alkyl benzene sulfonates, alpha-olefin sulfonates, methyl taurate, sulfosuccinate, ether sulfonates, ether carbonates, fatty acid salts, naphthalene sulfonate formalin condensates, alkyl amine salts, quaternary ammonium salts, alkyl betaines, and alkyl amine oxides. Among these anionic surfactants, preferable are polyoxyethylene alkylether sulfates and sulfosuccinate.

When the forced-emulsifying resin particles were used to produce a water dispersion, an amount of the surfactant is not particularly limited and may be appropriately selected depending on the intended purpose. However, the amount is preferably 0.1% by mass or more but 30% by mass or less, more preferably 5% by mass or more but 20% by mass or less, relative to the total amount of the forced-emulsifying resin particles. When the amount falls within a range of 0.1% by mass or more but 30% by mass or less, a film of the resin particles is suitably formed. Therefore, an ink excellent in adhesive property and water resistance can be obtained and can be suitably used without causing blocking of the printed matter.

A volume average particle diameter of the resin particles is preferably 10 nm or more but 1,000 nm or less, more preferably 10 nm or more but 500 nm or less, particularly preferably 10 nm or more but 200 nm or less, considering that the obtained ink is used for an inkjet printing apparatus. When the volume average particle diameter is 10 nm or more but 1,000 nm or less, the number of contact sites between the organic solvent and surfaces of the resin particles will increase. As a result, the resin particles are improved in a film forming performance to form a tough continuous coating film of the resin. This makes it possible to obtain a printed matter having high intensity.

The volume average particle diameter can be measured using, for example, a particle size analyzer (MICROTRAC MODEL UPA 9340 available from Nikkiso Co., Ltd.).

Qualitative and quantitative properties of the resin particles can be confirmed according to a procedure as detailed in Yasuda, Takeo. "Test methods and evaluation results of dynamic characteristics of plastic materials (22)", Plastics: Journal of the Japan Plastics Industry Federation, "Plastics" editors board. Specifically, qualitative and quantitative properties can be confirmed by an analysis according to, for example, infrared spectroscopy (IR), a thermal analysis (DSC, TG/DTA), pyrolysis gas chromatography (PyGC), nuclear magnetic resonance (NMR).

A glass transition temperature of the resin particles can be measured using a differential scanning calorimeter (DSC 6200, available from Seiko Instruments Inc.). Specifically, the measurement is performed under the conditions of the successive temperature programs 1 to 4 as described below. Here, a value measured in the temperature program 3 is defined as "glass transition temperature". In order to secure reproducibility of the measurement values, used is the measurement value obtained in the temperature program 3 among the measurement values obtained under the aforementioned temperature programs.

Temperature Programs:
1. 30° C. or more but 250° C. or less: heating rate of 30° C./min, retaining time of 1 minute
2. 250° C. or more but −100° C. or less: cooling rate of 30° C./min, retaining time of 30 minutes
3. −100° C. or more but 250° C. or less: heating rate of 5° C./min, retaining time of 1 minute
4. 250 or more but 30° C. or less: cooling rate of 30° C./min, retaining time of 2 minutes When the ink of the present disclosure is heated, any residual solvent is reduced to improve the ink in adhesiveness. Particularly, when a minimum filming temperature (hereinafter may also be referred to as "MFT") of the resin particles is higher than 80° C., heating is preferably performed in terms of eliminating a film forming failure of the resin and improving image robustness. In addition, it is preferable that the heating be performed after the ink is applied to a print medium to be printed.

Adjustment of the minimum filming temperature of the resin emulsion for obtaining the ink of the present disclosure can be achieved by controlling a glass transition temperature (hereinafter may also be referred to as "Tg") of the resin particles. When the resin particles are made of a copolymer, the adjustment can be achieved by changing ratios of the monomers forming the copolymer. Here, the minimum filming temperature refers to a lowest possible temperature at which resin particles that are thinly cast over a metal plate such as aluminium forms a transparent continuous film as a result of temperature elevation, and refers to a point at which the emulsion is in a white powder state at a temperature lower than the minimum filming temperature. Specifically, the minimum filming temperature can be measured with a commercially available minimum filming temperature measuring instrument such as "a filming temperature tester" (available from Imoto Machinery Co., Ltd.), "TP-801 MFT TESTER" (available from Tester Sangyo Co., Ltd.).

Moreover, the minimum filming temperature changes also depending on the volume average particle diameter of the resin particles. Therefore, it is possible to obtain an intended minimum filming temperature value based on controllable factors such as the volume average particle diameter of the resin particles.

An amount of the other resin particles is preferably 3% by mass or more but 10% by mass or less, 4% by mass or more but 8% by mass or less relative to the total amount of the ink.

<Organic Solvent>

The organic solvent is not particularly limited and may be appropriately selected depending on the intended purpose. Examples of the organic solvent include water-soluble organic solvents. Note that, "water-soluble" means that 5 g of an organic solvent is dissolved in 100 g of water having a temperature of 25° C.

Examples of the water-soluble organic solvent include: polyvalent alcohols such as ethylene glycol, diethylene glycol, 1,2-propanediol, 1,3-propanediol, 1,2-butanediol, 1,3-butanediol, 2,3-butanediol, 3-methyl-1,3-butanediol, 3-methoxy-3-methylbutanol, triethylene glycol, polyethylene glycol, polypropylene glycol, 1,5-pentanediol, 2-methyl-2,4-pentanediol, 1,6-hexanediol, glycerin, 1,2,6-hexanetriol, 2-ethyl-1,3-hexanediol, ethyl1,2,4-butanetriol, 1,2,3-butanetriol, and 3-methyl-1,3,5-pentanetriol; polyvalent alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, propylene glycol monoethylether, and dipropylene glycol monomethyl ether; polyvalent alcohol arylethers such as ethylene glycol monophenylether and ethylene glycol monobenzylether; nitrogen-including heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethylamine; sulfur-including compounds such as dimethylsulfoxide, sulfolane, and thiodiethanol; propylene carbonate; and ethylene carbonate. These may be used alone or in combination.

When the other resin particles include polyurethane resin particles, the organic solvent preferably includes a compound represented by the following General Formula (1).

The compound represented by the following General Formula (1) has high ability to dissolve resins, and makes it possible to permeate the ink into a print medium under printing, resulting in improvement of drying speed. In addition, the compound makes a film-forming property of the resin particles favorable, resulting in further improvement of drying ability. Therefore, the ink can be suitably used without causing blocking even when a drying time of the ink is short.

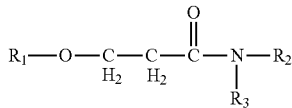

General Formula (1)

where in the Formula (1), $R_1$, $R_2$, and $R_3$ each independently represent a hydrocarbon group including 1 or more but 8 or less carbon atoms and the hydrocarbon group may have an ether bond.

In the General Formula (1), $R_1$, $R_2$, and $R_3$ represent a hydrocarbon group including 1 or more but 8 or less carbon atoms and the hydrocarbon group may have an ether bond.

Examples of the hydrocarbon group including 1 or more but 8 or less carbon atoms include a methyl group, an ethyl group, a butyl group, a pentyl group, a hexyl group, and an octyl group.

Examples of the hydrocarbon group including 1 or more but 8 or less carbon atoms and having an ether bond include a methoxymethyl group, a methoxyethyl group, and an ethoxyethyl group.

Among them, $R_1$ is preferably a pentyl group, a hexyl group, or an octyl group, more preferably a pentyl group or a hexyl group, and $R_2$ and $R_3$ are preferably a methyl group, in terms of discharging stability.

Examples of the compound represented by the following General Formula (1) include N,N-dimethyl-β-butoxy propionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide, and N,N-diethyl-β-octoxypropionamide. These may be used alone or in combination.

An amount of the organic solvent is preferably 10% by mass or more but 60% by mass or less, more preferably 20% by mass or more but 60% by mass or less, relative to the total amount of the ink, in terms of drying ability of discharging reliability of the ink.

An amount of the compound represented by the following General Formula (1) is preferably 5% by mass or more but 30% by mass or less, more preferably 10% by mass or more but 25% by mass or less, relative to the total amount of the ink. When the amount is 5% by mass or more, the ink can be improved in drying ability. The amount is 30% by mass or less, the ink can be improved in storage stability.

<Water>

The water is not particularly limited and may be appropriately selected depending on the intended purpose. Examples of the water include: pure water such as ion-exchanged water, ultrafiltrated water, reverse osmotic water, and distilled water; and ultrapure water. These may be used alone or in combination.

An amount of the water is preferably 15% by mass or more but 60% by mass or less, more preferably 20% by mass or more but 40% by mass or less relative to the total amount of the ink. When the amount is 15% by mass or more, the ink can be prevented from increasing viscosity, which results in improvement of discharging stability. When the amount is 60% by mass or less, wettability to impermeable print medium is favorable, which makes it possible to improve image qualities.

<Other Components>

Examples of the other components include a colorant, a surfactant other than the polysiloxane surfactant, a preservative and fungicide, a corrosion inhibitor, a pH regulator, and a colorless anti-oxidant agent for rubbers and plastics such as hindered phenol and hindered phenol amine.

<Colorant>

The colorant is not particularly limited and may be appropriately selected depending on the intended purpose. Examples of the colorant include pigments and dyes. Among them, pigments are preferable.

Examples of the pigments include inorganic pigments and organic pigments.

Examples of the inorganic pigments include titanium oxide, iron oxide, calcium carbonate, barium sulfate, aluminium hydroxide, barium yellow, cadmium red, and chrome yellow, and in addition, carbon blacks produced by known methods such as a contact method, a furnace method, and a thermal method. These may be used alone or in combination.

Examples of the organic pigments include: azo-pigments (e.g., azo lake, insoluble azo-pigments, condensed azo-pigments, and chelate azo-pigments); polycyclic pigments (e.g., phthalocyanine pigments, perylene pigments, perionone pigments, anthraquinone pigments, quinacridone pigments, dioxazine pigments, indigo pigments, thioindigo pigments, isoindolinone pigments, and quinophthalone pigments); dye chelates (e.g., basic dye chelates and acid dye chelates); nitro pigments; nitroso pigments; and aniline black. These may be used alone or in combination.

Other usable examples of the pigments include hollow resin particles and inorganic hollow particles.

Among the above pigments, pigments having good affinity with a solvent are preferably used.

Specific examples of the pigments for black include: carbon blacks (C.I. Pigment Black 7) such as furnace black, lamp black, acetylene black, and channel black; metals such as copper, iron (C.I. Pigment Black 11), and titanium oxide; and organic pigments such as aniline black (C.I. Pigment Black 1). These may be used alone or in combination.

Specific examples of the pigments for colors include: C. I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C. I. Pigment Orange 5, 13, 16, 17, 36, 43, and 51; C. I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C. I. Pigment Violet 1 (rhodamine lake), 3, 5:1, 16, 19, 23, and 38; C. I. Pigment Blue 1, 2, 15 (Phthalocyanine blue), 15:1, 15:2, 15:3 (Phthalocyanine blue), 16, 17:1, 56, 60, and 63; and C. I. Pigment Green 1, 4, 7, 8, 10, 17, 18, and 36. These may be used alone or in combination.

Specific examples of the dyes include: C. I. Acid Yellow 17, 23, 42, 44, 79, and 142; C. I. Acid Red 52, 80, 82, 249, 254, and 289; C. I. Acid Blue 9, 45, and 249; C. I. Acid Black 1, 2, 24, and 94; C. I. Food Black 1 and 2; C. I. Direct Yellow 1, 12, 24, 33, 50, 55, 58, 86, 132, 142, 144, and 173; C. I. Direct Red 1, 4, 9, 80, 81, 225, and 227; C. I. Direct Blue 1, 2, 15, 71, 86, 87, 98, 165, 199, and 202; C. I. Direct Black 19, 38, 51, 71, 154, 168, 171, and 195; C. I. Reactive Red 14, 32, 55, 79, and 249; C. I. Reactive Black 3, 4, and 35. These may be used alone or in combination.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as a sulfone group and a carboxyl group to the pigment (e.g., carbon) to disperse the pigment in water.

To coat the surface of the pigment with a resin, the pigment is encapsulated by microcapsules to make the pigment dispersible in water. This can be referred to as a resin-coated pigment. In this case, all of the pigments incorporated into the ink are not necessarily coated with resins. Pigments partially or wholly uncovered with resins may be dispersed in the ink unless the pigments adversely influence the effect of the present disclosure.

One exemplary method for dispersing the pigment using a dispersant includes a method for dispersing the pigment using, for example, a known dispersant having a small molecular weight or a high molecular weight represented by a surfactant.

As the dispersant, it is possible to use, for example, anionic surfactants, cationic surfactants, nonionic surfactants, and amphoteric surfactants depending on the pigments.

Also, a nonionic surfactant (RT-100, available from TAKEMOTO OIL & FAT CO., LTD.) and a formalin condensate of naphthalene sodium sulfonate can suitably used as dispersants.

These dispersants can be used alone or in combination.
<Pigment Dispersion>

The ink can be obtained by mixing a pigment with materials such as water and an organic solvent. It is also possible to mix a pigment with water, a dispersant, etc., first to prepare a pigment dispersion and thereafter mix the pigment dispersion with materials such as water and an organic solvent to manufacture ink.

The pigment dispersion is obtained by mixing and dispersing water, a pigment, a pigment dispersant, and, if necessary, other optional components and adjusting the particle size. Use of a dispersing device for dispersion is favorable.

A particle diameter of the pigment in the pigment dispersion is not particularly limited. For example, the maximum frequency in the maximum number conversion is preferably 20 nm or more but 500 nm or less, more preferably 20 nm or more but 150 nm or less to improve dispersion stability of the pigment and ameliorate the discharging stability and image quality such as image density. The particle diameter of the pigment can be measured using a particle size analyzer (NANOTRAC WAVE-UT151, available from MicrotracBEL Corp).

In addition, an amount of the pigment in the pigment dispersion is not particularly limited and may be appropriately selected depending on the intended purpose. The amount is preferably 0.1% by mass or more but 50% by mass or less, more preferably 0.1% by mass or more but 30% by mass or less because discharging stability can be obtained and image density can be improved.

It is preferable that coarse particles be optionally filtered off with, for example, a filter and a centrifuge to be degassed if necessary.

A number average particle diameter of the pigment is not particularly limited and may be appropriately selected depending on the intended purpose, but is preferably 20 nm or more but 150 nm or less in terms of the maximum number conversion. Preferably, the number average particle diameter satisfying 20 nm or more makes it easier to perform the dispersion operation and the classification operation, and the number average particle diameter satisfying 150 nm or less makes it possible to obtain the ink achieving dispersion stability of the pigment, and being excellent in discharging stability, which achieves high image quality such as favorable image density.

The number average particle diameter can be measured using, for example, a particle size analysis apparatus (MICROTRAC MODEL UPA 9340, available from Nikkiso Co., Ltd.).

An amount of the colorant is preferably 0.1% by mass or more but 15% by mass or less, more preferably 1% by mass or more but 10% by mass or less, relative to the total amount of the ink, in terms of image density, fixability, and discharging stability. When the amount is 0.1% by mass or more but 15% by mass or less, it is possible to obtain an image having high discharging reliability and high color saturation.

An amount of the pigment is preferably 0.1% by mass or more but 15% by mass or less, more preferably 0.1% by mass or more but10% by mass or less, particularly preferably 1% by mass or more but 10% by mass or less, relative to the total amount of the ink. When the amount is 0.1% by mass or more but 15% by mass or less, it is possible to improve image density, fixability, and discharging stability.
<Surfactant Other than Polysiloxane Surfactant>

The ink of the present disclosure may include a surfactant other than the polysiloxane surfactant in order to secure wettability to a print medium.

The surfactant other than the polysiloxane surfactant is not particularly limited and may be appropriately selected depending on the intended purpose. Examples of the surfactant other than the polysiloxane surfactant include amphoteric surfactants, nonionic surfactants, and anionic surfactants. These may be used alone or in combination. Among them, nonionic surfactants are preferable in terms of dispersion stability and image qualities.

Fluorosurfactants and silicone-based surfactants may also be used in combination or alone depending on the composition.

Examples of the nonionic surfactants include polyoxyethylene alkylphenylethers, polyoxyethylene alkyl esters, polyoxyethylene alkylamines, polyoxyethylene alkylamides, polyoxyethylene propylene block polymers, sorbitan fatty acid esters, polyoxyethylene sorbitan fatty acid esters, and acetylene alcohol/ethylene oxide adducts. These may be used alone or in combination.

An amount of the surfactant other than the polysiloxane surfactant is preferably 0.1% by mass or more but 5% by mass or less. When the amount is 0.1% by mass or more, wettability to an impermeable print medium can be secured, resulting in improvement of image qualities. When the amount is 5% by mass or less, the ink hardly foams, which makes it possible to obtain the ink excellent in discharging stability.

<Defoaming Agent>

The defoaming agent is not particularly limited. Examples of the deforming agent include silicon-based defoaming agents, polyether-based defoaming agents, and aliphatic acid ester-based defoaming agents. These may be used alone or in combination. Among them, silicone-based defoaming agents are preferable because they have an excellent effect on form destruction.

<Preservative and Fungicide>

The preservative and fungicide are not particularly limited. One specific example is 1,2-benzisothiazolin-3-one.

<Corrosion Inhibitor>

The corrosion inhibitor is not particularly limited. Examples of the corrosion inhibitor include acid sulfites and sodium thiosulfates.

<pH Regulator>

The pH regulator is not particularly limited so long as it can adjust the pH to 7 or more. Specific examples of the pH regulator include amines such as diethanol amine and triethanol amine.

[Method for Producing Ink]

As a method for producing the ink, the ink can be produced by stirring and mixing, for example, the water, the organic solvent, the polysiloxane surfactant, and the acryl-silicone resin particles, and if necessary, the other components. For example, a sand mill, a homogenizer, a ball mill, a paint shaker, an ultrasonic disperser, a stirrer using a typical stirring blade, a magnetic stirrer, and a high-speed disperser may be used for the stirring and mixing.

A property of the ink is not particularly limited and may be appropriately selected depending on the intended purpose. For example, viscosity, surface tension, and pH preferably of the ink satisfy the following ranges.

A viscosity of the ink at 25° C. is preferably 5 mPa·s or more but 30 mPa·s or less, more preferably 5 mPa·s or more but 25 mPa·s or less because print density and text quality can be improved and favorable discharging ability can be obtained. Here, the viscosity can be measured by, for example, a rotatory viscometer (RE-80L, available from TOKI SANGYO CO., LTD.). The measurement conditions are as follows:

Standard cone rotor (1°34'×R24)
Sample liquid amount: 1.2 mL
Number of rotations: 50 rotations per minute (rpm)
Temperature: 25° C.
Measuring time: three minutes A surface tension of the ink is preferably 35 mN/m or less, more preferably 32 mN/m or less at 25° C. because the ink is suitably levelized on a print medium and the drying time of the ink is shortened.

A pH of the ink is preferably from 7 through 12, more preferably from 8 through 11 in order to prevent metal materials to be contacted with the ink from corrosion.

The ink of the present disclosure can be suitably used for inkjet printing.

<Print Medium>

A print medium is not particularly limited. Specific examples of the print medium include plain paper, gloss paper, special paper, and cloth. However, a favorable image can be formed even on an impermeable substrate.

The impermeable substrate is a substrate having a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the impermeable substrate.

Even if a print medium has already been colored (a print medium is a colored print medium), the color of the print medium can be uniformly turned to white by coating the print medium with a white ink before coating the print medium with colored inks during the color printing. This can improve the color inks in color developing.

Specific examples of the colored print medium include colored paper, films, cloths, clothes, and ceramics.

<Ink Accommodating Container>

The ink accommodating container includes a container and a ink of the present disclosure stored in the container.

The ink accommodating container includes a container and the ink stored in the container, further includes other members appropriately selected if necessary.

A shape, a structure, a size, and a material of the container are not particularly limited and may be appropriately selected depending on the intended purpose. Specific examples of the container include containers including an ink bag formed of, for example, an alminium laminate film or a resin film.

<Printing Device and Printing Method>

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices.

In the present disclosure, the printing device represents a device capable of discharging, for example ink and various processing fluids to a print medium and the printing method represents a method printing an image on the print medium using the device. The print medium means an article to which the ink or the various processing fluids can be attached at least temporarily.

The printing device may further optionally include, for example, a device relating to feeding, transferring, and ejecting the print medium and other devices referred to as a pre-processing device, a post-processing device in addition to the head portion configured to discharge the ink.

The printing device and the printing method may further include a heating unit for use in the heating process and a drying unit for use in the drying process. For example, the heating unit and the drying unit include a unit configured to heat/dry a print surface or a back surface of the print medium. The heating unit and the drying unit are not particularly limited. For example, a fan heater and an infra-red heater can be used. The print medium can be heated and dried, for example, before the printing, during the printing, and after the printing.

In addition, the printing device and the printing method are not limited to those producing meaningful visible images such as texts and figures with the ink. Examples of the printing device and the printing method include an article capable of producing patterns such as geometric patterns and 3D an article capable of forming images.

In addition, the printing device includes both a serial type device in which the liquid discharging head is caused to move and a line type device in which the liquid discharging head is not moved, unless otherwise specified.

Furthermore, in addition to the desktop-type device, this printing device includes a wide-type device capable of printing images on a large print medium such as A0 and a continuous feed printer capable of using continuous paper wound up in a roll form as print media.

Figure 2:
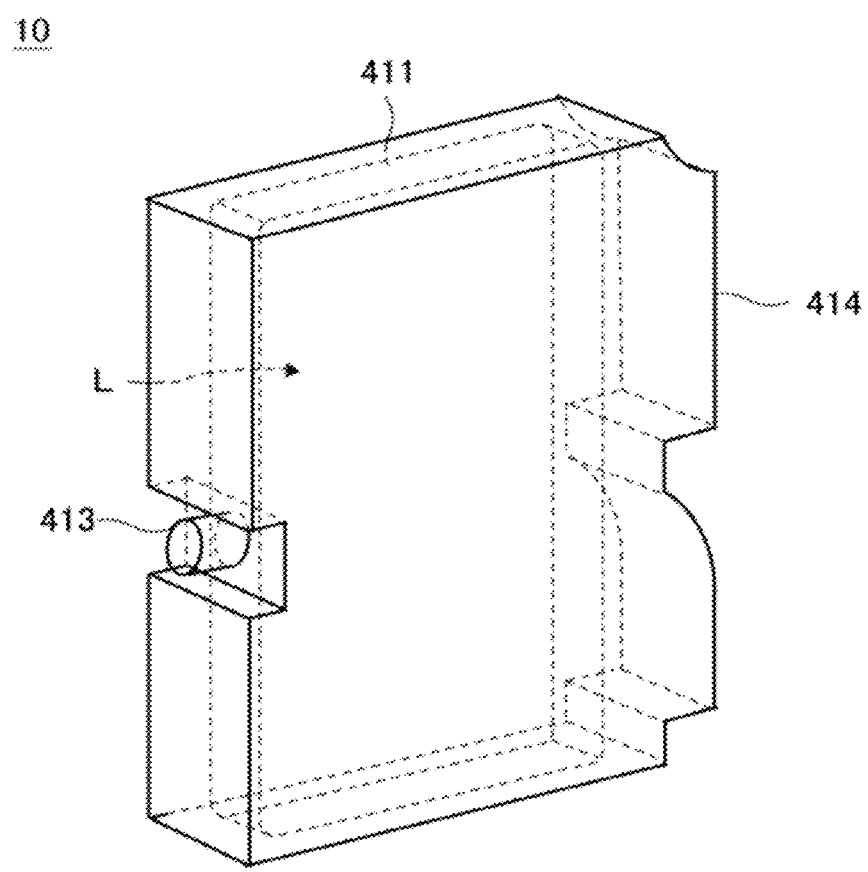
FIG. 2 is an explanatory perspective view illustrating an example of a main tank of the apparatus of FIG. 1.

The printing device of the present disclosure is described using examples with reference to FIG. 1 and FIG. 2. FIG. 1 is a perspective view illustrating the image printing device. FIG. 2 is a perspective view illustrating the main tank. An image forming apparatus 400 as an example of the printing device is a serial type image forming apparatus. A mechanical unit 420 is disposed in an exterior 401 of the image forming apparatus 400. Each ink accommodating section (ink container) 411 of each main tank 410 (410*k*, 410*c*, 410*m*, and 410*y*) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401*c* is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

An inkjet printing method of the present disclosure includes an ink discharging step, preferably includes a heating step, further includes other steps if necessary.

An inkjet printing apparatus includes an ink discharging unit, preferably includes a heating unit and an ink accommodating section including an ink, and further includes other units if necessary.

The inkjet printing method of the present disclosure can be suitably performed by the inkjet printing apparatus. The ink discharging step can be suitably performed by the ink discharging unit. The heating step can be suitably performed by the heating unit. The other steps can be suitably performed by the other units.

In addition, the inkjet printing method preferably includes a printing step of applying a thermal energy or a mechanical energy to the ink and to discharge the ink to print an image.

<<Ink Discharging Step and Ink Discharging Unit>>

The ink discharging step is a step of applying a stimulus to the ink of the present disclosure to discharge the ink to print an image on a print medium.

The ink discharging unit further includes a pressure generating unit configured to apply a stimulus to the ink to apply pressure to the ink.

The ink discharging unit is not particularly limited and may be appropriately selected depending on the intended purpose. Examples of the ink discharging unit include a discharging head.

Examples of the discharging head include an ink discharging head (inkjet head).

Examples of the inkjet head includes a piezo inkjet head (see Japanese Examined Patent Publication No. 02-51734) using a piezoelectric element as a pressure generating unit to pressurize an ink in an ink flow path to deform a vibration plate constituting a wall surface of the ink flow path and change the internal cubic capacity of the ink flow path to discharge ink droplets, a thermal inkjet head (see Japanese Examined Patent Publication No. 61-59911) using a heating resistor to heat an ink in an ink flow path and generate bubbles, and an electrostatic inkjet head (see Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal cubic capacity of the ink flow path to discharge ink droplets.

The stimulus can be generated by, for example, a stimulus generating unit. The stimulus is not particularly limited and may be appropriately selected depending on the intended purpose. Examples of the stimulus include heat (temperature), pressure, vibration, and light. These may be used alone or in combination. Among them, heat and pressure are preferable.

A method for discharging the ink is not particularly limited and is different depending on the kind of the stimulus, etc. For example, when the stimulus is "heat", there is a method using, for example, a thermal head for applying a thermal energy corresponding to a printing signal to the ink in a print head to generate bubbles in the ink by the thermal energy and discharge and jet the ink from nozzle holes of the print head in a form of liquid droplets by a pressure of the bubbles. When the stimulus is "pressure", there is a method for, for example, applying a voltage to a piezoelectric element bonded to a position called a pressure chamber present in an ink flow path in a print head to flex the piezoelectric element and shrink the cubic capacity of the pressure chamber to discharge and jet the ink from nozzle holes of the print head in a form of liquid droplets.

A size of the liquid droplets of the ink to be discharged is preferably 3 pL or more but 40 pL or less. A discharging/jetting speed of the liquid droplets of the ink is preferably 5 m/s or more but 20 m/s or less. A driving frequency for discharging the liquid droplets of the ink is preferably 1 kHz or more. A resolution of the liquid droplets of the ink is preferably 300 dpi or more.

Moreover, the print head preferably includes: a plurality of nozzles configured to discharge the ink; an individual liquid chamber leading to the plurality of nozzles; a common liquid chamber configured to supply the individual liquid chamber with liquid; an inflow path configured to allow the ink to flow into the individual liquid chamber; a circulation flow path leading to the individual liquid chamber; a circulation common liquid chamber leading to the circulation flow path; an outflow path configured to allow the ink to flow out from the individual liquid chamber; and a pressure generating unit configured to apply pressure to the liquid in the individual liquid chamber. In addition, the print head further includes a circulating unit configured to circulate the ink from the inflow path toward the outflow path. Moreover, a circulating step is preferably performed while no printing is performed.

The aforementioned print head makes it possible to circulate the ink in the nozzle parts and to prevent accumulation of the ink that has been degraded in the head, resulting in improvement of discharging stability. Moreover, through the above-described ink circulation, even when an aqueous ink, which is obtained by addition of a surfactant having low HLB value and easily causes phase separation, is used, the ink can be prevented by being stirred from phase separation due to the surfactant.

Hereinafter, one example of an ink discharging head used in an inkjet printing method of the present disclosure will be described.

Figure 4:
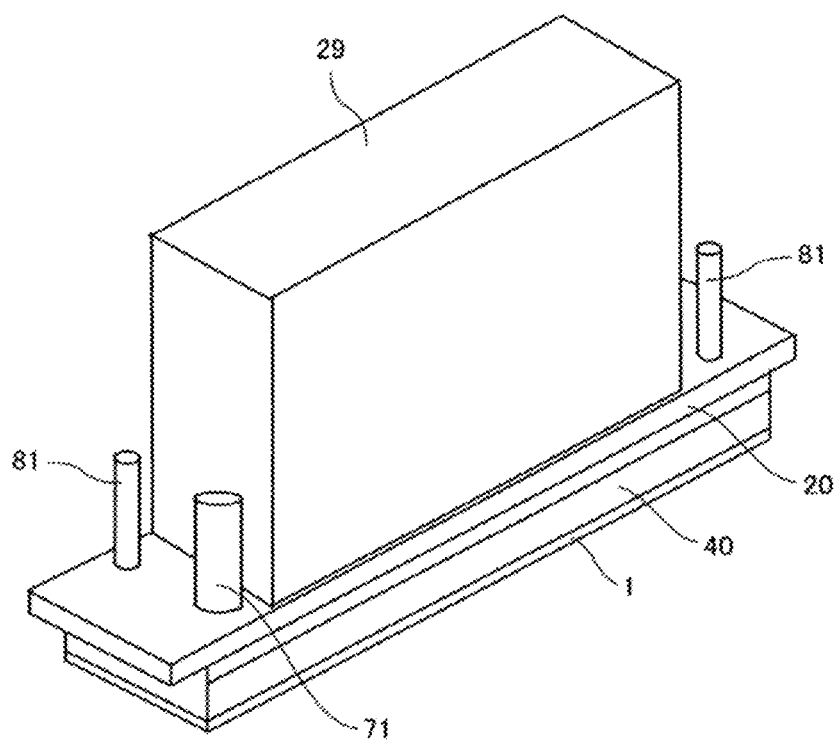
FIG. 4 is an explanatory perspective view illustrating an example of an external appearance of a liquid (ink) discharging head.
Figure 5:
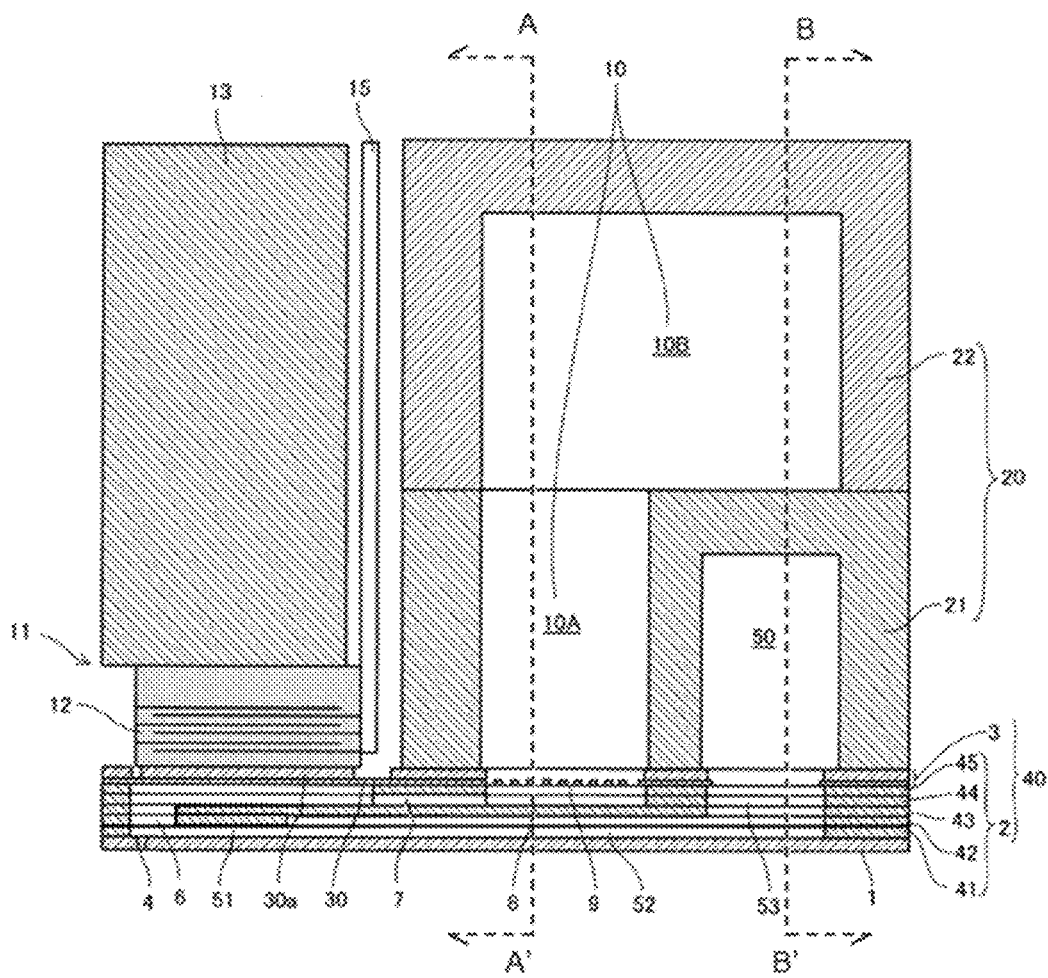
FIG. 5 is an explanatory view of a cross-section in a direction perpendicular to the nozzle arrangement direction of the liquid discharging head presented in FIG. 4.
Figure 6:
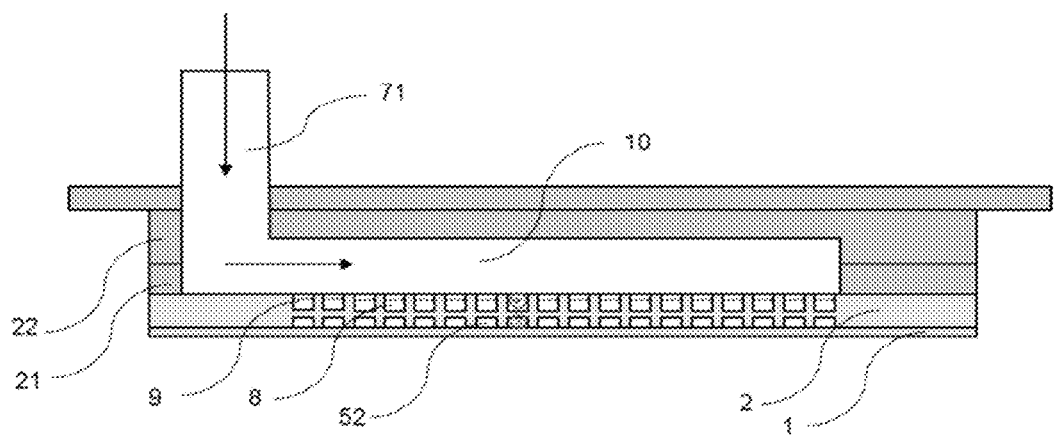
FIG. 6 is an A-A' cross-sectional view of FIG. 5.
Figure 7:
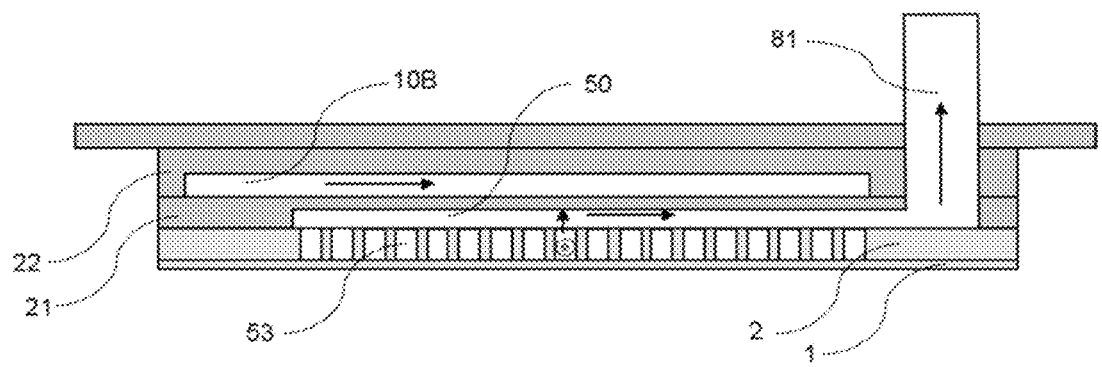
FIG. 7 is a B-B' cross-sectional view of FIG. 5.
Figure 8:
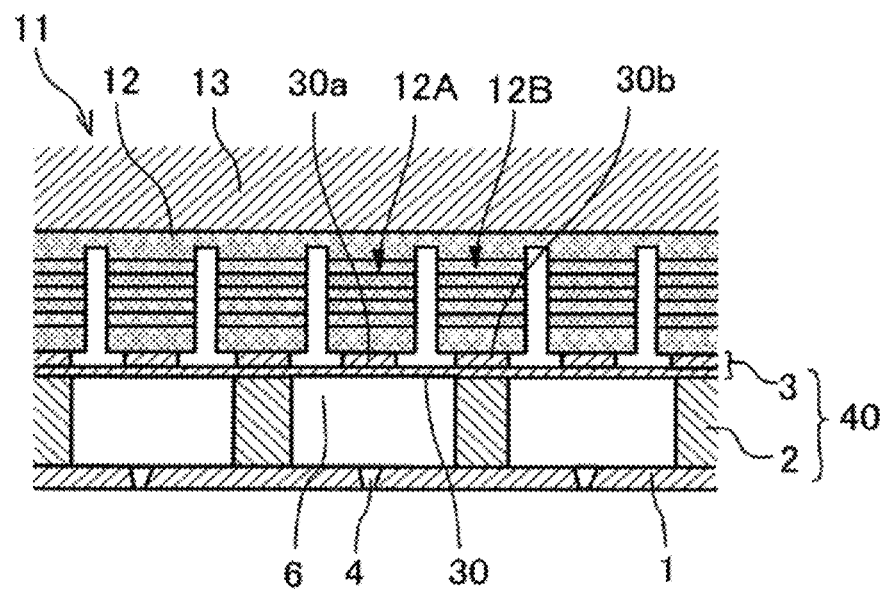
FIG. 8 is an explanatory view of a cross-section in a direction parallel to the nozzle arrangement direction of the liquid discharging head presented in FIG. 4.
Figure 9:
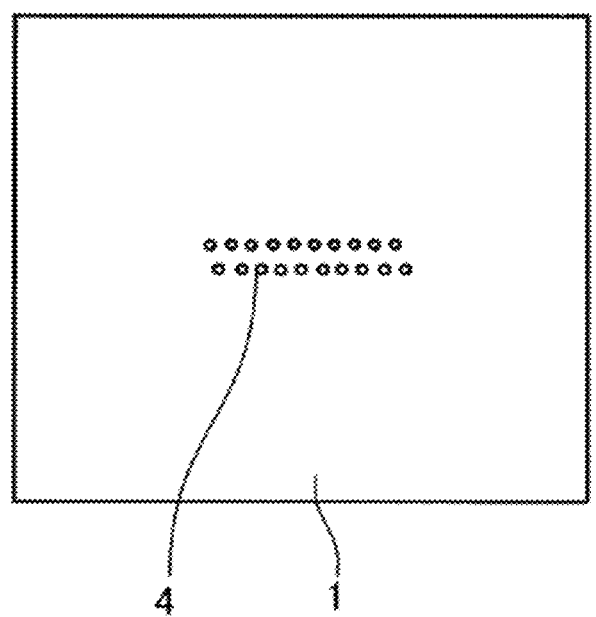
FIG. 9 is an explanatory plan view of a nozzle plate of the liquid discharging head presented in FIG. 4.

Hereinafter, the present embodiments of the present disclosure will be described with reference to the attached figures. One example of the liquid discharging head according to the embodiments of the present disclosure will be described with reference to FIGS. 4 to 11. FIG. 4 is an explanatory perspective view illustrating an example of an external appearance of a liquid discharging head. FIG. 5 is an explanatory view of a cross-section in a direction perpendicular to a nozzle arrangement direction of the liquid discharging head presented in FIG. 4. FIG. 6 is an A-A' cross-sectional view of FIG. 5. FIG. 7 is a B-B' cross-sectional view of FIG. 5. FIG. 8 is an explanatory view of a cross-section in a direction parallel to the nozzle arrangement direction of the liquid discharging head presented in FIG. 4. FIG. 9 is an explanatory plan view of a nozzle plate of the liquid discharging head presented in FIG. 4. FIGS. 10A to 10F are explanatory plan views of each component constituting a flow path member of the liquid discharging head presented in FIG. 4. FIGS. 11A and 11B are explanatory plan views of each component constituting a common liquid chamber member of the liquid discharging head presented in FIG. 4.

The ink discharging head preferably includes an inflow path configured to allow the ink to flow into an individual liquid chamber and an outflow path configured to allow the ink to flow out from the individual liquid chamber.

This liquid discharging head is formed by laminating and joining a nozzle plate 1, a flow path plate 2, and a vibration plate member 3 serving as a wall surface member. Moreover, the liquid discharging head also includes a piezoelectric actuator 11 configured to allow the vibration plate member 3, a common liquid chamber member 20, and a cover 29.

The nozzle plate 1 includes a plurality of nozzles 4 configured to discharge liquid.

The flow path plate 2 is formed of an individual liquid chamber 6 leading to nozzles 4, a fluid resistor section 7 leading to the individual liquid chamber 6, and a liquid introducing section 8 leading to the fluid resistor section 7. Moreover, the flow path plate 2 is formed of a plurality of plate-like members 41 to 45, which are laminated/joined in this order from a side of the nozzle plate 1. The plurality of plate-like members 41 to 45 and a vibration plate member 3 are laminated/joined to constitute a flow path member 40.

The vibration plate member 3 includes a filter part 9, which serves as an opening leading a liquid introducing section 8 to a common liquid chamber 10 formed of the common liquid chamber member 20.

The vibration plate member 3 is a wall surface member that forms a wall surface of the individual liquid chamber 6 of the flow path plate 2. A structure of the vibration plate member 3 is a two-layer structure, but is not limited thereto. The vibration plate member 3 includes a first layer forming a thin part and a second layer forming a thick part, where the first layer and the second layer are laminated in this order from a side of the flow path plate 2. A vibration region 30 that is deformable is provided at a part of the first layer, the part corresponding to the individual liquid chamber 6.

Here, as presented in FIG. 9, a plurality of nozzles 4 are arranged in a zigzag manner on the nozzle plate 1.

Figure 10A:
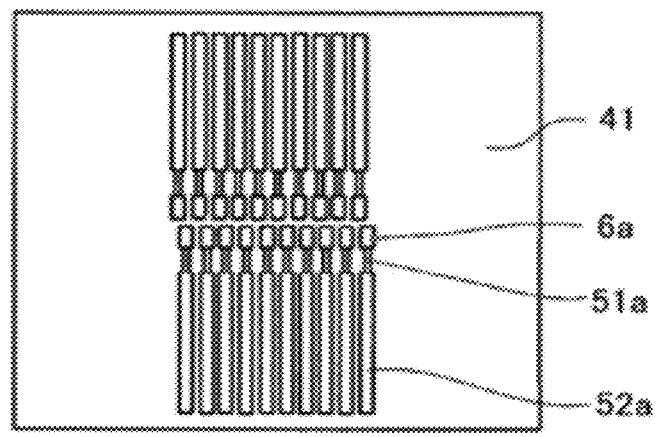
FIG. 10A is an explanatory plan view of a component constituting a flow path member of the liquid discharging head presented in FIG. 4.
Figure 11A:
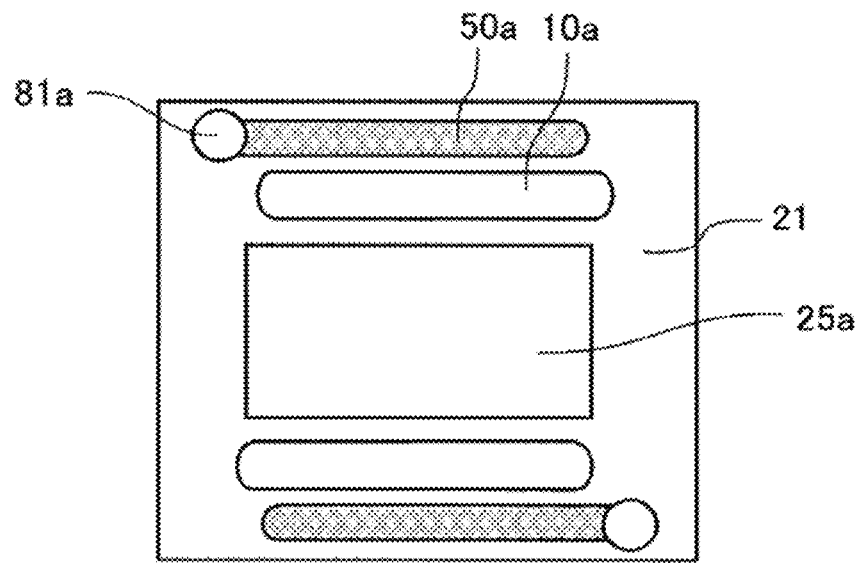
FIG. 11A is an explanatory plan view of a component constituting a common liquid chamber member of the liquid discharging head presented in FIG. 4.
Figure 11B:
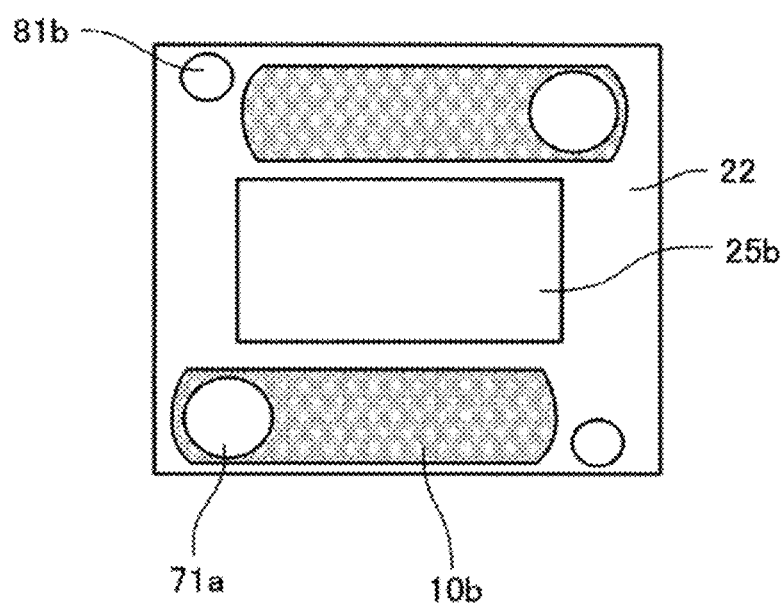
FIG. 11B is an explanatory plan view of a component constituting a common liquid chamber member of the liquid discharging head presented in FIG. 4.

As presented in FIG. 10A, a plate-like member 41 constituting the flow path plate 2 includes: a penetrated groove (which means a groove-shaped penetrated hole) 6a constituting the individual liquid chamber 6; a penetrated groove 51a constituting the fluid resistor section 51; and a penetrated groove 52a constituting the circulation flow path 52.

Figure 10B:
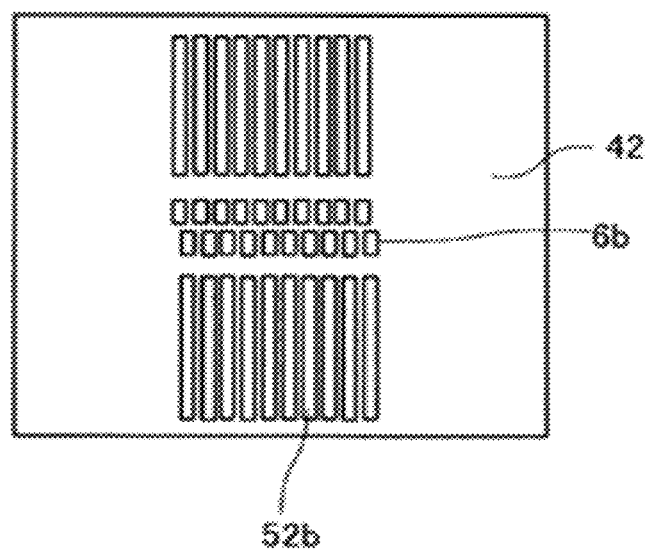
FIG. 10B is an explanatory plan view of a component constituting a flow path member of the liquid discharging head presented in FIG. 4.

Similarly, a plate-like member 42, as illustrated in FIG. 10B, includes: a penetrated groove 6b constituting the individual liquid chamber 6; and a penetrated groove 52b constituting the circulation flow path 52.

Figure 10C:
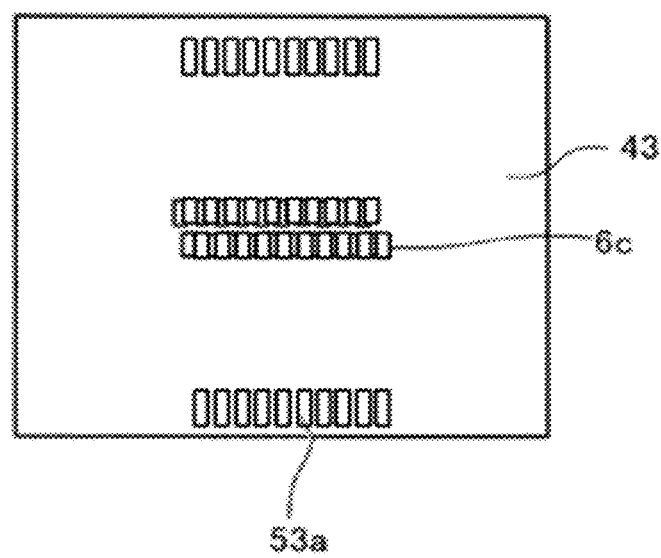
FIG. 10C is an explanatory plan view of a component constituting a flow path member of the liquid discharging head presented in FIG. 4.

Similarly, a plate-like member 43, as presented in FIG. 10C, includes: a penetrated groove 6c constituting the individual liquid chamber 6; and a penetrated groove 53a constituting the circulation flow path 53 and having a nozzle arrangement direction as a longitudinal direction.

Figure 10D:
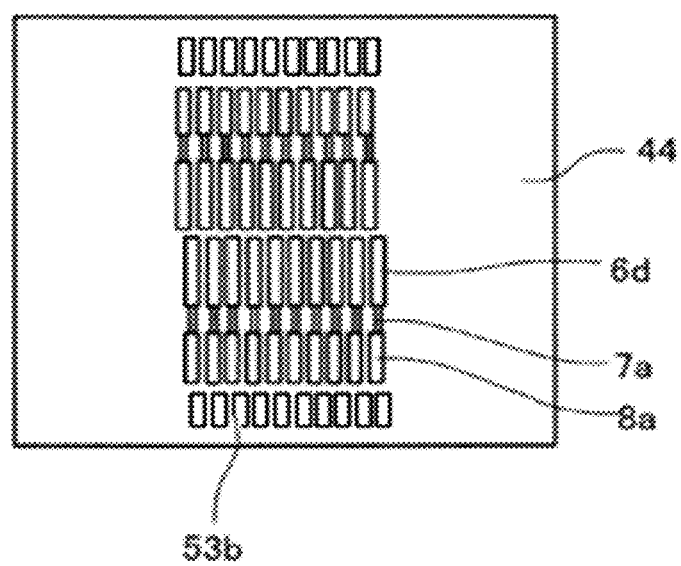
FIG. 10D is an explanatory plan view of a component constituting a flow path member of the liquid discharging head presented in FIG. 4.

Similarly, a plate-like member 44, as presented in FIG. 10D, includes: a penetrated groove 6d constituting the individual liquid chamber 6; a penetrated groove 7a which is a fluid resistor section 7; a penetrated groove 8a constituting a liquid introducing section 8; and a penetrated groove 53b constituting a circulation flow path 53 and having a nozzle arrangement direction as a longitudinal direction.

Figure 10E:
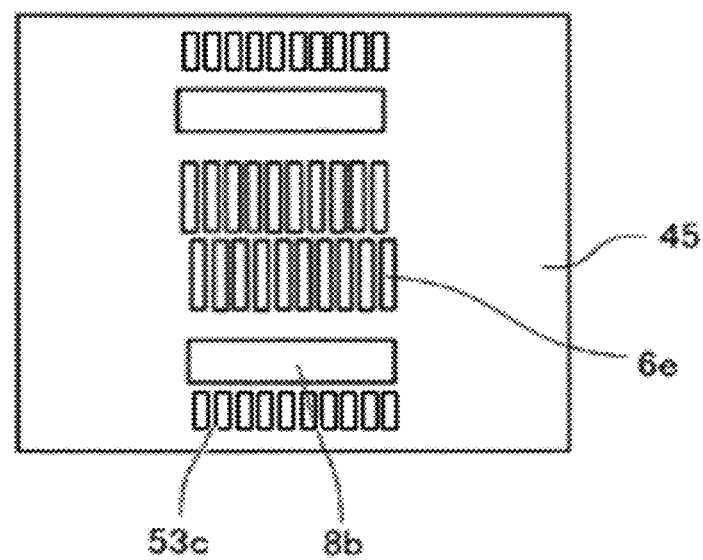
FIG. 10E is an explanatory plan view of a component constituting a flow path member of the liquid discharging head presented in FIG. 4.

Similarly, a plate-like member 45, as presented in FIG. 10E, includes; a penetrated groove 6e constituting the individual liquid chamber 6; a penetrated groove 8b (which is to be a liquid chamber at a side downstream of the filter) constituting a liquid introducing section 8 and having a nozzle arrangement direction as a longitudinal direction; and a penetrated groove 53c constituting a circulation flow path 53 and having a nozzle arrangement direction as a longitudinal direction.

Figure 10F:
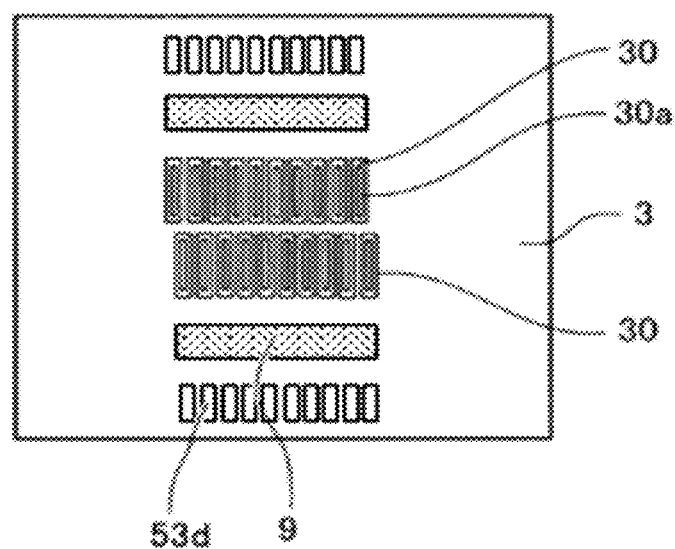
FIG. 10F is an explanatory plan view of a component constituting a flow path member of the liquid discharging head presented in FIG. 4.

The vibration plate member 3, as presented in FIG. 10F, includes a vibration region 30, a filter part 9, and a penetrated groove 53d constituting a circulation flow path 53 and having a nozzle arrangement direction as a longitudinal direction.

When a plurality of plate-like members are laminated and joined in this manner, it is possible to form a complicated flow path with a simple configuration.

In the above configuration, the flow path member 40 including the flow path plate 2 and the vibration plate member 3 is provided with: a fluid resistor section 51, which is along a plane direction of the flow path plate 2 leading to each individual liquid chamber 6; a circulation flow path 52; and a circulation flow path 53, which is along a thickness direction of the flow path member 40 leading to the circulation flow path 52. Note that, the circulation flow path 53 leads to a circulation common liquid chamber 50 described below.

Meanwhile, the common liquid chamber member 20 is provided with: a common liquid chamber 10, to which liquid is supplied from a supplying/circulating mechanism 494; and a circulation common liquid chamber 50.

A first common liquid chamber member 21 constituting the common liquid chamber member 20, as presented in FIG. 11A, includes: a through hole 25a for a piezoelectric actuator; a penetrated groove 10a, which is to be a downstream-side common liquid chamber 10A; and a bottomed groove 50a, which is to be a circulation common liquid chamber 50.

Similarly, a second common liquid chamber member 22, as presented in FIG. 11B, includes: a through hole 25b for a piezoelectric actuator; and a groove 10b, which is to be an upstream-side common liquid chamber 10B.

Referring to FIG. 4 as well, the second common liquid chamber member 22 is provided with a through hole 71a, which is to be a supply port leading to a supply port 71, one end of the common liquid chamber 10 in the nozzle arrangement direction.

Similarly, the first common liquid chamber member 21 and the second common liquid chamber member 22 are respectively provided with through holes 81*a* and 81*b* leading to a circulation port 81, the other end of the circulation common liquid chamber 50 in the nozzle arrangement direction (the end at the opposite side to the through hole 71*a*).

Note that, in FIGS. 11A and 11B, the bottomed groves are illustrated as being painted (the same applies to the following figures).

In this manner, the common liquid chamber member 20 is formed of the first common liquid chamber member 21 and the second common liquid chamber member 22, and the first common liquid chamber member 21 is joined to the flow path member 40 at a side of the vibration plate member 3 and the second common liquid chamber member 22 is laminated on and joined to the first common liquid chamber member 21.

Here, the first common liquid chamber member 21 forms: a downstream-side common liquid chamber 10A, which is a part of the common liquid chamber 10 leading to the liquid introducing section 8; and the circulation common liquid chamber 50 leading to the circulation flow path 53. Also, the second common liquid chamber member 22 forms an upstream-side common liquid chamber 10B, which is the remaining part of the common liquid chamber 10.

Here, the downstream-side common liquid chamber 10A, which is a part of the common liquid chamber 10, and the circulation common liquid chamber 50 are arranged side by side in a direction perpendicular to the nozzle arrangement direction. The circulation common liquid chamber 50 is arranged at such a position that the circulation common liquid chamber 50 is projected within the common liquid chamber 10.

With this configuration, the dimension of the circulation common liquid chamber 50 does not receive any restriction due to the dimensions necessary for the individual liquid chamber 6 formed with the flow path member 40 and the flow path including the fluid resistor section 7 and the liquid introducing section 8.

When the circulation common liquid chamber 50 and a part of the common liquid chamber 10 are arranged side by side and the circulation common liquid chamber 50 is arranged at such a position that the circulation common liquid chamber 50 is projected within the common liquid chamber 10, it is possible to control the width of the head in the direction perpendicular to the nozzle arrangement direction, to suppress enlargement of the head. The common liquid chamber member 20 forms the common liquid chamber 10, to which liquid is supplied from a head tank and a liquid cartridge, and the circulation common liquid chamber 50.

Meanwhile, at a side of the vibration plate member 3 opposite to the individual liquid chamber 6, a piezoelectric actuator 11 including an electromechanical transducer is disposed, the piezoelectric actuator 11 serving as a driving unit configured to deform the vibration region 30 of the vibration plate member 3.

This piezoelectric actuator 11, as presented in FIG. 8, includes a piezoelectric member 12 joined onto a base member 13. The piezoelectric member 12 is processed by half-cut dicing so as to have grooves, to form a required number of columnar piezoelectric elements 12A and 12B at predetermined intervals in a comb shape per one piezoelectric member 12.

Here, the piezoelectric element 12A of the piezoelectric member 12 is a piezoelectric element configured to be driven by application of a driving waveform, and the piezoelectric element 12B is used only as a fulcrum without application of a driving waveform. However, all of the piezoelectric elements 12A and 12B may be used as piezoelectric elements configured to be driven.

The piezoelectric element 12A is joined to a convex portion 30*a*, which is an island-like thick portion formed on the vibration region 30 of the vibration plate member 3. The piezoelectric element 12B is joined to a convex portion 30*b*, which is a thick portion of the vibration plate member 3.

This piezoelectric member 12 is a laminate where piezoelectric layers and inner electrodes are alternatingly laminated. Each of the inner electrodes is drawn to the end surface to provide an external electrode. A flexible wiring member 15 is coupled to the external electrode.

In the liquid discharging head formed in this manner, for example, by decreasing voltage applied to the piezoelectric element 12A from reference voltage, the piezoelectric element 12A shrinks and the vibration region 30 of the vibration plate member 3 descends. As a result, the volume of the individual liquid chamber 6 increases and liquid flows into the individual liquid chamber 6.

After that, by increasing voltage applied to the piezoelectric element 12A to elongate the piezoelectric element 12A in the laminated direction and deform the vibration region 30 of the plate member 3 toward the nozzle 4 to decrease the volume of the individual liquid chamber 6, the liquid in the individual liquid chamber 6 is pressed and discharged from the nozzle 4.

By returning voltage applied to the piezoelectric element 12A to the reference voltage, the vibration region 30 of the vibration plate member 3 is returned to the initial position, and the individual liquid chamber 6 swells to generate a negative pressure. At this time, therefore, liquid is charged into the individual liquid chamber 6 from the common liquid chamber 10. After the vibration on the meniscus surface of the nozzle 4 attenuates and is stabilized, the status is transferred to an operation for the next event of discharging.

Note that, the driving method of this head is not limited to the above example (pull-push ejection). Depending on how to apply a driving waveform, pull ejection, push ejection, or others can be performed. Also, the above embodiment has been described using a laminated piezoelectric element as a pressure generating unit configured to apply pressure fluctuation to the individual liquid chamber 6. However, without being limited to the laminated piezoelectric element, a thin-film piezoelectric element can also be used. Another usable method is disposing a heating resistor in the individual liquid chamber 6 and applying pressure fluctuation by bubbles formed through heat generation from the heating resistor. Still another usable method is generating pressure fluctuation using electrostatic force.

Next, one example of a liquid circulation system using the liquid discharging head according to the present embodiment will be described with reference to FIG. 12.

Figure 12:
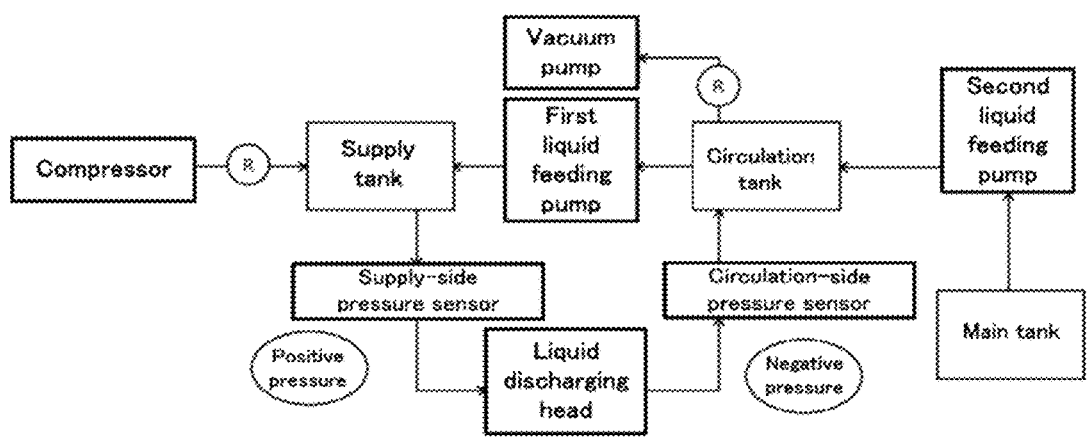
FIG. 12 is a block diagram illustrating a liquid circulation system according to the present embodiment.

FIG. 12 is a block diagram illustrating a liquid circulation system according to the present embodiment.

As presented in FIG. 12, the liquid circulation system includes, for example, a main tank, a liquid discharging head, a supply tank, a circulation tank, a compressor, a vacuum pump, a liquid feeding pump, a regulator (R), a supply-side pressure sensor, and a circulation-side pressure sensor. The supply-side pressure sensor is disposed between the supply tank and the liquid discharging head and is coupled at a side of the supply flow path, which is coupled to a supply port 71 (see FIG. 4) of the liquid discharging head. The circulation-side pressure sensor is disposed between the liquid discharging head and the circulation tank and is coupled at a side of the circulation flow path, which is coupled to a circulation port 81 (see FIG. 4) of the liquid discharging head.

One side of the circulation tank is coupled to the supply tank via the first liquid feeding pump, and the other side of the circulation tank is coupled to the main tank via the second liquid feeding pump. With this configuration, liquid flows into the liquid discharging head through the supply port 71 from the supply tank, and is discharged from the circulation port to the circulation tank. Further, the liquid is sent from the circulation tank to the supply tank by the first liquid feeding pump. The liquid is circulated in this manner.

Also, the compressor is coupled to the supply tank and is controlled so that a predetermined positive pressure is sensed at the supply-side pressure sensor. Meanwhile, the vacuum pump is coupled to the circulation tank and is controlled so that a predetermined negative pressure is sensed at the circulation-side pressure sensor. This configuration makes it possible to circulate the liquid through the liquid discharging head and maintain the negative pressure of the meniscus constant.

As liquid droplets are discharged from the nozzle of the liquid discharging head, the amounts of the liquid in the supply tank and the circulation tank decrease. Therefore, it is desirable to appropriately replenish the circulation tank with liquid from the main tank using the second liquid feeding pump. The timing of replenishing the circulation tank with liquid from the main tank can be controlled based on the sensing result given by, for example, a liquid surface sensor provided in the circulation tank. For example, the liquid is replenished at a timing when the height of the liquid surface of the ink in the circulation tank becomes below a predetermined height.

Next, circulation of liquid in the liquid discharging head will be described. As presented in FIG. 4, the supply port 71 in communication with the common liquid chamber and the circulation port 81 in communication with the circulation common liquid chamber 50 are formed on the ends of the common liquid chamber member 20. The supply port 71 and the circulation port 81 are coupled via respective tubes to the supply tank/circulation tank (see FIG. 12) configured to store liquid. The liquid stored in the supply tank is supplied to the individual liquid chamber 6 through the supply port 71, the common liquid chamber 10, the liquid introducing section 8, and the fluid resistor section 7.

The liquid in the individual liquid chamber 6 is discharged from the nozzle 4 by driving the piezoelectric element 12, whereas part or all of the liquid accumulated in the individual liquid chamber 6 without being discharged is circulated to the circulation tank through the fluid resistor section 51, the circulation flow paths 52 and 53, the circulation common liquid chamber 50, and the circulation port 81.

Note that, circulation of liquid can performed not only during operation of the liquid discharging head but also during suspension of the operation. It is preferable to circulate the liquid during suspension of the operation because the liquid in the individual liquid chamber is constantly refreshed and ingredients contained in the liquid can be prevented from aggregation and sedimentation.

Moreover, one example of a printing device using the discharging head will be described.

Figure 13:
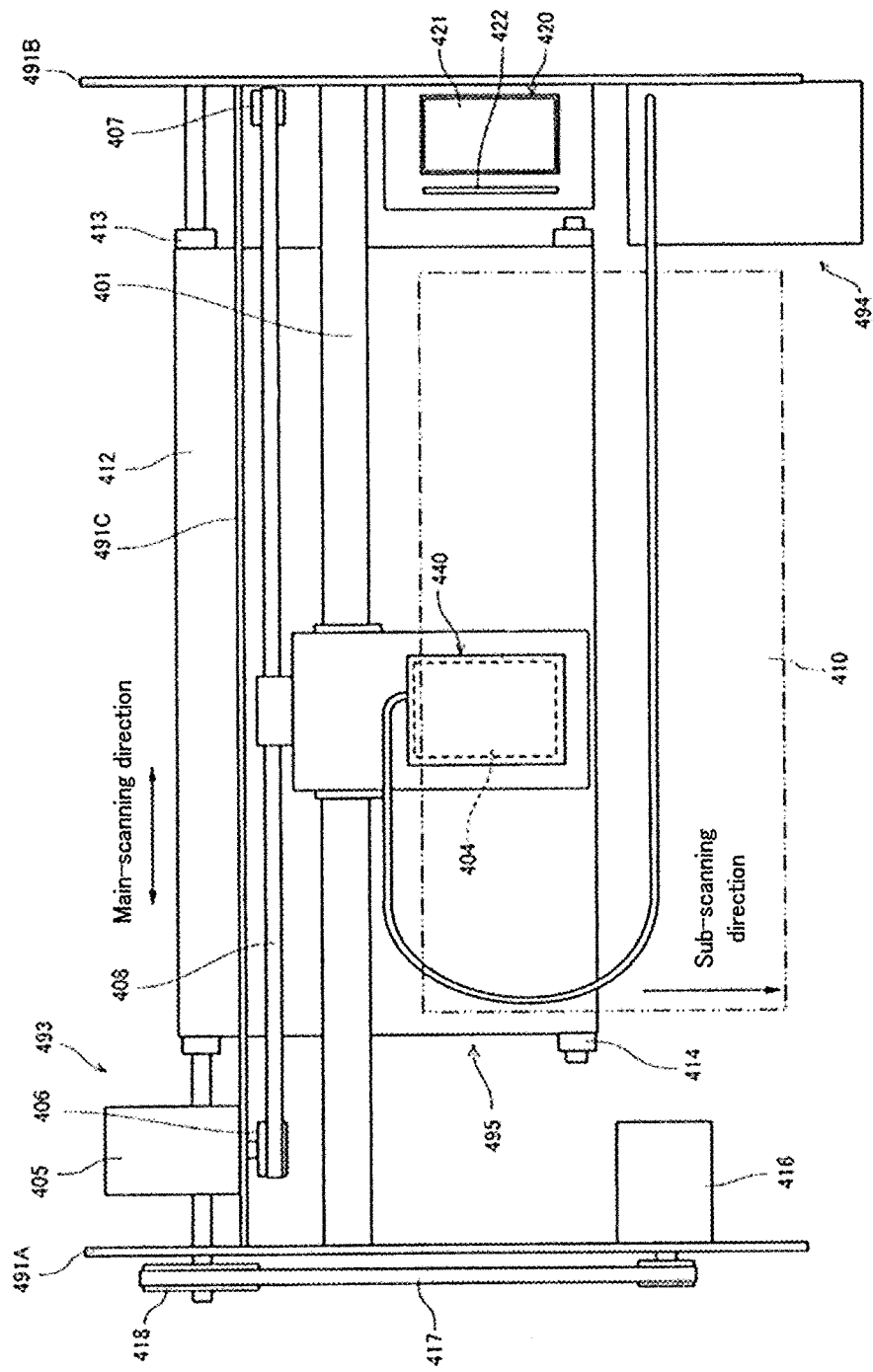
FIG. 13 is an explanatory plan view illustrating main components of one example of an apparatus configured to discharge liquid.
Figure 14:
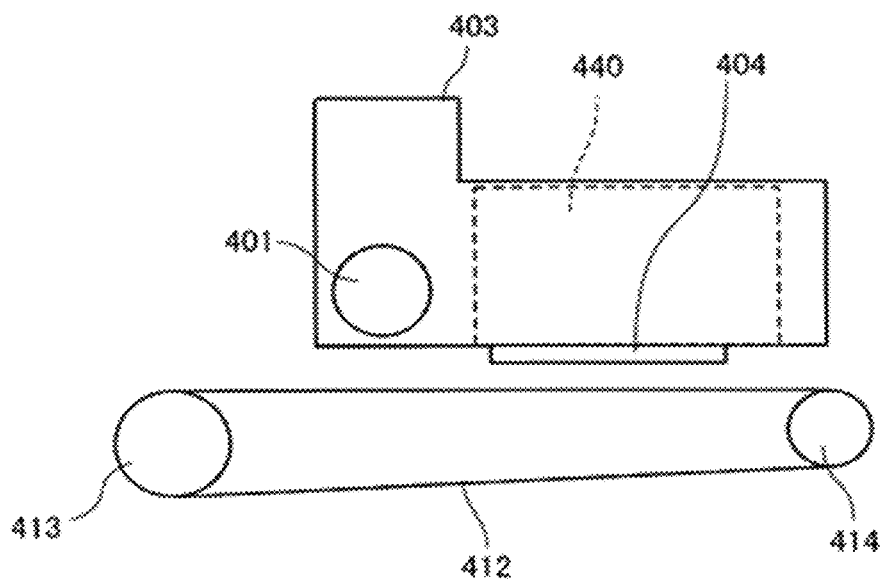
FIG. 14 is an explanatory side view illustrating main components of one example of an apparatus configured to discharge liquid.

Next, one example of an apparatus configured to discharge liquid according to the present disclosure will be described with reference to FIGS. 13 and 14. FIG. 13 is an explanatory plan view illustrating main components of one example of an apparatus configured to discharge liquid. FIG. 14 is an explanatory side view illustrating main components of one example of an apparatus configured to discharge liquid.

This apparatus is a serial type apparatus in which a carriage 403 moves in a reciprocating manner in the main-scanning direction by means of a main-scanning moving mechanism 493. The main-scanning moving mechanism 493 includes a guide member 401, a main-scanning motor 405, a timing belt 408, a drive pulley 406, and a following pulley 407. The guide member 401 is passed over between left and right side panels 491A and 491B and supports the carriage 403 in a manner that the carriage 403 can move. Via the timing belt 408 passed over between a drive pulley 406 and a driven pulley 407, the main-scanning motor 405 drives the carriage 403 to move in a reciprocating manner in the main-scanning direction.

This carriage 403 includes a liquid discharging unit 440 including a liquid discharging head 440 according to the present disclosure. The liquid discharging head 404 of the liquid discharging unit 440 is configured to discharge liquids having, for example, yellow (Y), cyan (C), magenta (M), and black (K) colors. The liquid discharging head 404 is mounted in a state that a nozzle line including a plurality of nozzles is provided in a sub-scanning direction orthogonal to the main-scanning direction and a discharging direction is downward.

By the supplying/circulating mechanism 494 configured to supply the liquid discharging head 404 with liquid stored outside the liquid discharging head 404, the liquid is supplied/circulated into the liquid discharging head 404. Here, in the present example, the supplying/circulating mechanism 494 is formed of, for example, a supply tank, a circulation tank, a compressor, a vacuum pump, a liquid feeding pump, and a regulator (R). The supply-side pressure sensor is disposed between the supply tank and the liquid discharging head and is coupled at a side of the supply flow path, which is coupled to a supply tube port 71 of the liquid discharging head. The circulation-side pressure sensor is disposed between the liquid discharging head and the circulation tank and is coupled at a side of the circulation flow path, which is coupled to a circulation port 81 of the liquid discharging head.

This apparatus includes a conveying mechanism 495 configured to convey a paper sheet 410. The conveying mechanism 495 includes a conveying belt 412, which is a conveying unit, and a sub-scanning motor 416 configured to drive the conveying belt 412.

The conveying belt 412 attracts a paper sheet 410 and conveys the paper sheet 410 at a position counter to the liquid discharging head 404. The conveying belt 412 is an endless belt and is passed over between a conveying roller 413 and a tension roller 414. The paper sheet 410 can be attracted by, for example, electrostatic attraction and air suctioning.

The conveying belt 412 moves in the sub-scanning direction in a rotating manner by the conveying roller 413 being driven to rotate by the sub-scanning motor 416 via a timing belt 417 and a timing pulley 418.

The maintenance/recovery mechanism 420 configured to maintain or recover the liquid discharging head 404 is disposed on a side of the conveying belt 412 on one side in the main-scanning direction of the carriage 403.

The maintenance/recovery mechanism 420 includes a capping member 421 configured to cap a nozzle surface (a surface in which nozzles are formed) of the liquid discharging head 404, a wiper member 422 configured to wipe the nozzle surface, and others.

The main-scanning moving mechanism 493, the supplying/circulating mechanism 494, the maintenance/recovery mechanism 420, and the conveying mechanism 495 are attached on the housing including the side panels 491A and 491B and the back panel 491C.

In this apparatus having this configuration, a paper sheet 410 is fed onto and attracted to the conveying belt 412 and conveyed in the sub-scanning direction by rotational moving of the conveying belt 412.

Here, by the liquid discharging head 404 being driven in accordance with an image signal along with moving of the carriage 403 in the main-scanning direction, the liquids are discharged onto the paper sheet 410 that is being stopped to form an image on the paper sheet 410.

In this way, the inkjet printing apparatus includes the liquid discharging head used in the present disclosure. Therefore, the inkjet printing apparatus can stably form a high-quality image.

Figure 15:
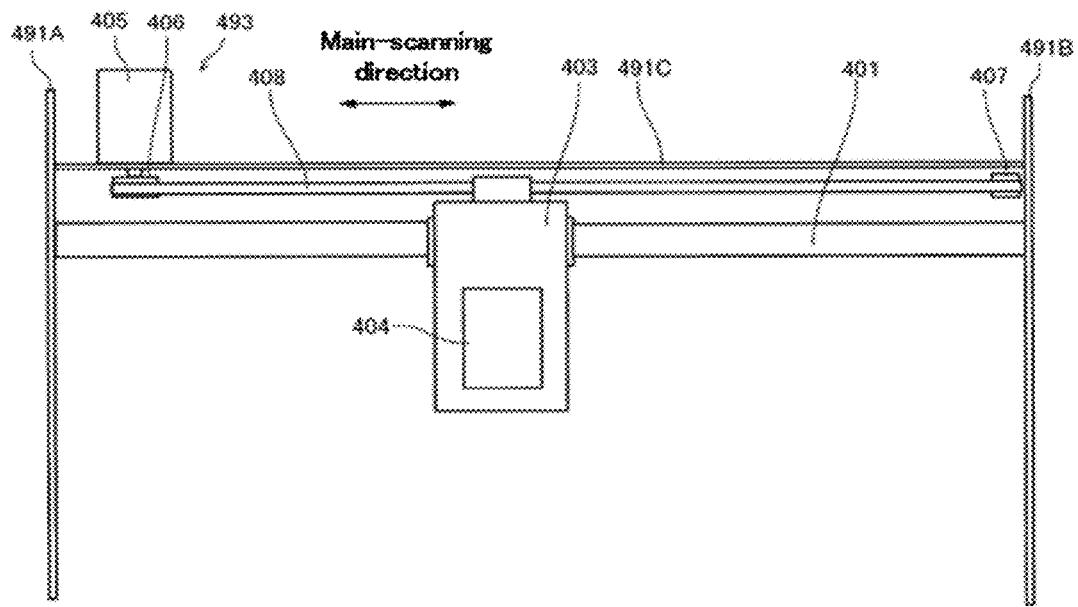
FIG. 15 is an explanatory plan view illustrating main components of another example of a liquid discharging unit.

Next, another example of the liquid discharging unit used in the present disclosure will be described with reference to FIG. 15. FIG. 15 is an explanatory plan view illustrating main components of another example of a liquid discharging unit.

This liquid discharging unit is formed of a housing portion including the side panels 491A and 491B and a back panel 491C, the main-scanning moving mechanism 493, the carriage 403, and the liquid discharging head 404, which are among members constituting the apparatus configured to discharge the liquid.

At least one selected from the group consisting of the maintenance/recovery mechanism 420 and the supplying/circulating mechanism 494 may be additionally attached on, for example, the side panel 491B of the liquid discharging unit described above to constitute another liquid discharging unit.

In the present disclosure, the "liquid discharging head" is a functional component that discharge/jet liquid from nozzles.

Examples of an energy generating source that discharges liquid include articles using, for example, piezoelectric actuators (e.g., laminated piezoelectric element and thin-film piezoelectric element), thermal actuators using electro-thermal conversion elements such as heating resistors, and electrostatic actuators including a vibration plate and a counter electrode.

The "liquid discharging unit" is obtained by integrating the liquid discharging head with a functional component/mechanism and is an aggregation of components related to discharging of liquid. For example, the "liquid discharging unit" includes a liquid discharging unit obtained by combining the liquid discharging head with at least one selected from the group consisting of a supply/circulation mechanism, a carriage, a maintenance/recovery mechanism, and a main-scanning moving mechanism as a configuration.

Here, the term "integrate" means an article obtained by fixing the liquid discharging head with the functional component/mechanism each other through fastening, adhesion, and engaging, an article obtained by retaining one part so as to be capable of moving relative to the other part. Moreover, each of the liquid discharging head and the functional component/mechanism may be removable as a configuration.

For example, there is a liquid discharging unit obtained by integrating the liquid discharging head with the supply/circulation mechanism. Moreover, there is a liquid discharging unit obtained by integrating the liquid discharging head with the supply/circulation mechanism, the liquid discharging head and the supply/circulation mechanism being coupled through, for example, a tube. Here, in the liquid discharging unit, a unit including a filter can be added between the supply/circulation mechanism and the liquid discharging head.

Moreover, the liquid discharging unit may be obtained by integrating the liquid discharging head with the carriage.

There is still another liquid discharging unit obtained by integrating a liquid discharging head and a scanning moving mechanism in a manner that the liquid discharging head is supported in a movable manner on a guide member constituting a part of the scanning moving mechanism.

There is yet another liquid discharging unit obtained by fixing a carriage to which a liquid discharging head is attached with a cap member, which is a part of a maintenance/recovery mechanism, to integrate the liquid discharging head, the carriage, and the maintenance/recovery mechanism.

There is a liquid discharging unit obtained by coupling, to a tube, a supply/circulation mechanism or a liquid discharging head to which a flow path component is attached to integrate the liquid discharging head with the supply mechanism. Via this tube, liquid in a liquid storing source is supplied to the liquid discharging head.

Examples of the main-scanning moving mechanism include a mechanism formed only of a guide member. Examples of the supplying mechanism include a mechanism formed only of a tube and a mechanism formed only of a loading section.

In the present disclosure, the "apparatus configured to discharge liquid" includes a liquid discharging head or a liquid discharging unit, and is an apparatus configured to drive the liquid discharging head to discharge liquid. Specific examples of the apparatus configured to discharge liquid include apparatuses configured to discharge liquid into air or liquid in addition to apparatuses capable of discharging liquid to a medium on which liquid can be attached.

The "apparatus configured to discharge liquid" may further include, for example, a unit configured to feed, transfer, and eject a medium on which liquid can be attached and other units such as a pre-processing device and a post-processing device.

In addition, the "apparatus configured to discharge liquid" is not limited to those producing meaningful visible images such as texts and figures with the liquid discharged. Examples of the apparatus configured to discharge liquid include apparatuses capable of producing patterns such as geometric patterns, which have no meaning, and apparatuses capable of forming 3D images.

Examples of the aforementioned "medium on which liquid can be attached" include media on which liquid can at least temporarily be attached to be adhered and media on which liquid can at least temporarily be attached to be permeated. Specific examples of the aforementioned "medium on which liquid can be attached" include: print media to be coated such as paper, printing paper, paper for printing, films, and cloths; and media such as electronic components (e.g., electronic substrates and powder layers (dust layers)), internal organ models, and cells for inspection. The "medium on which liquid can be attached" includes all the media on which liquid can be attached unless otherwise specified.

A material of the "medium on which liquid can be attached" is not particularly limited so long as liquid can be attached even temporarily. Examples of the material include paper, threads, fibers, cloths, leathers, metals, plastics, glasses, wood materials, and ceramics.

Moreover, the "apparatus configured to discharge liquid", but is not limited to, an apparatus in which the liquid discharging head moves relative to the medium on which liquid can be attached. Specific examples of the "apparatus configured to discharge liquid" include serial type apparatuses that allow the liquid discharging head to move and line type apparatus that do not allow the liquid discharging head to move.

In the present disclosure, the "liquid discharging head" is a functional component that discharge/jet liquid from nozzles.

The liquid to be discharged is not particularly limited so long as the liquid has such a viscosity and a surface tension that the liquid can be discharged from the head. The liquid preferably has a viscosity of 30 m Pa·s or less under normal temperature/normal pressure or under heating/cooling. Specific examples of the liquid include solutions, suspensions, and emulsions that contain, for example, solvents (e.g., water and organic solvents), colorants (e.g., dyes and pigments), function-providing materials (e.g., polymerizable compounds, resins, and surfactants), biocompatible materials (e.g., DNA, amino acids, proteins, and calcium), and edible materials (e.g., natural pigments). These can be used in applications of, for example, inkjet inks, surface-treatment liquids, configuration elements of electronic elements and light emitters, liquids for forming electron circuit resist patterns, and three-dimensional shaping material liquids.

All of the terms "image formation", "recording", "print typing", "imaging", "printing", "modeling", etc. used in the present disclosure are synonyms.

<<Heating Step and Heating Unit>>

The heating step is a step of heating a print medium on which an image has been printed and can be performed by the heating unit.

The inkjet printing method is capable of printing a high-quality image over an impermeable print medium, which serves as the print medium. However, in order to form an image with higher image qualities, a higher rubfastness, and a higher close adhesiveness to the print medium, and accommodate high-speed printing conditions, it is preferable that the impermeable print medium be heated after the printing. The heating step, if provided after the printing, promotes the resin incorporated into the ink to form a film. This can improve an image hardness of a printed matter.

The temperature for the heating is preferably high, more preferably 40° C. or more but 100° C. or less, particularly preferably 50° C. or more but 90° C. or less in terms of drying ability and a filming temperature. When the temperature for the heating is 40° C. or more but 120° C. or less, it is possible to prevent the impermeable print medium from being damaged by heat and to suppress blank discharging due to warming of an ink head.

Figure 3:
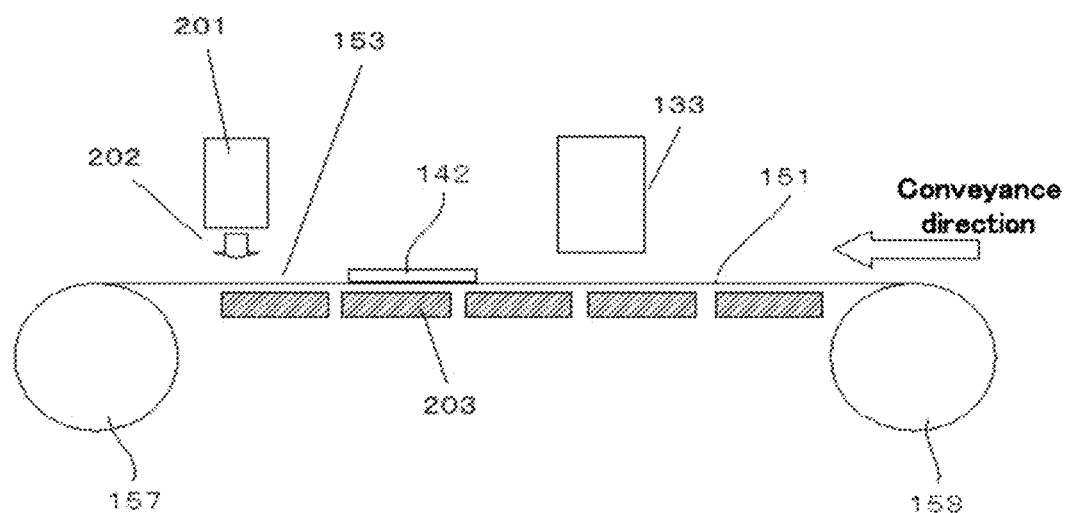
FIG. 3 is a schematic view illustrating an example of a heating unit of the apparatus of FIG. 1.

FIG. 3 is a schematic view illustrating an example of a heating unit of the apparatus of FIG. 1. As presented in FIG. 3, a print head is driven according to an image signal while a carriage 133 is moved, and then ink droplets are discharged onto a print medium 142, which has kept stationary, to print an image. A conveyance belt 151 is provided on a guide member 153 supporting the print medium and is stretched between a conveyance roller 157 and a tension roller 158. The image formed on the print medium 142, which is conveyed on the conveyance belt 151, is dried by spraying hot air 202 by a heating fan 201.

Here, a group of heaters 203 are provided at a side opposite to the side at which the print medium 142 is provided on the conveyance belt 151, and can heat the print medium 142 on which the image is formed.

<Other Steps and Other Units>

Examples of the other steps include a stimulus generating step and a controlling step.

Examples of the other units include a stimulus generating unit and a controlling unit.

Examples of the stimulus generating unit include heating devices, pressure devices, piezoelectric elements, vibration generating devices, ultrasonic oscillators, and lights. Specific examples of the stimulus generating unit include: a piezoelectric actuator such as a piezoelectric element; a thermal actuator that uses a thermoelectric transducer such as a heat element and utilizes phase change caused by film boiling of a liquid; a shape memory alloy actuator that utilizes a metal phase change caused by a temperature change; and an electrostatic actuator that utilizes electrostatic force.

The controlling unit is not particularly limited and may be appropriately selected depending on the intended purpose so long as the controlling unit is capable of controlling the operations of each unit. Examples of the controlling unit include devices such as a sequencer and a computer.

An example of the inkjet printing method of the present disclosure may be a printing method including a step of coating a clear ink free of a colorant or an ink (white ink) containing a white-color (white) pigment as a colorant over a print medium and a printing step of performing printing using an ink containing a pigment. The clear ink or the white ink may be coated over a full surface of a print medium or may be applied over a part of the print medium. In coating the ink over a part of the print medium, for example, the clear ink or the white ink may be coated over the same portion to which printing will be coated, or may be coated over a portion that partially overlaps with a portion to which printing will be coated.

In using the white ink, a printing method described below may be effective. The white ink is coated over a print medium, and an ink having any color other than white is printed over the white ink. This method can ensure visibility of the printing even over a transparent film, because the white ink of the present disclosure is attached over the surface of the print medium. The ink of the present disclosure has, for example, a favorable drying ability, a high gloss, and rubfastness even over impermeable print media. This allows for coating the white ink over impermeable print media such as transparent films to improve visibility.

Coating the white ink after performing printing over a transparent film also makes it possible to obtain an image likewise excellent in visibility. The clear ink coated instead of the white ink can function as a protective layer.

The ink of the present disclosure is not limited to an inkjet printing method, but may be used for a broad range of methods. Examples of printing methods other than the inkjet printing method include a blade coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a 4- or 5-roll coating method, a clip coating method, a curtain coating method, a slide coating method, a die coating method, and a spray coating method.

One example of the embodiments is described as follows. When the white ink is coated over a full surface of a print medium, the ink is coated through a coating method other than an inkjet printing method. Another possible embodiment is described as follows. An inkjet printing method is performed when a coating method other than an inkjet printing method is used and an ink having any color other than white is used for printing.

Another possible mode may be performed by using an inkjet printing method for performing both of printing with a white ink and printing with an ink having any color other than white.

A case where the clear ink is used instead of the white ink is performed in the same manner as described above.

(Printed Matter)

A printed matter of the present disclosure includes: a print medium; and an image on the print medium, the image including a polysiloxane surfactant and an acryl-silicone resin, and further includes other members if necessary. Here, the polysiloxane surfactant has an HLB value of 8 or less.

The printed matter can be suitably obtained by an inkjet printing apparatus and an inkjet printing method.

EXAMPLES

The present disclosure will be described in more detail by way of the following Examples. However, the present disclosure should not be construed as being limited to these Examples.

Preparation Example 1 of Pigment Dispersion

<Preparation of Self-Dispersible Black Pigment Dispersion>

A mixture having the following formulation was premixed and was subjected to circulation dispersion using a disk-type bead mill (available from SHINMARU ENTERPRISES CORPORATION, KDL model, media used: zirconia balls having a diameter of 0.3 mm) for 7 hours to obtain a self-dispersible black pigment dispersion (pigment solid concentration: 15% by mass).

Carbon black pigment (product name: Monarch 800, available from CABOT) . . . 15 parts by mass
Anionic surfactant (product name: PIONIN A-51-B, available from TAKEMOTO OIL & FAT CO., LTD) . . . 2 parts by mass
Ion exchanged water . . . 83 parts by mass Preparation Example 2 of Pigment Dispersion <Preparation of Self-Dispersible Cyan Pigment Dispersion>

A self-dispersible cyan pigment dispersion (pigment solid concentration: 15% by mass) was obtained in the same manner as in the Preparation Example 1 of pigment dispersion except that the carbon black pigment was changed to Pigment Blue 15:3 (product name: LIONOL BLUE FG-7351, available from TOYO INK CO., LTD.).

Preparation Example 3 of Pigment Dispersion

<Preparation of Self-Dispersible Magenta Pigment Dispersion>

A self-dispersible magenta pigment dispersion (pigment solid concentration: 15% by mass) was obtained in the same manner as in the Preparation Example 1 of pigment dispersion except that the carbon black pigment was changed to Pigment Red 122 (product name: Toner Magenta E02, available from Clariant (Japan) K.K.).

Preparation Example 4 of Pigment Dispersion

<Preparation of Self-Dispersible Yellow Pigment Dispersion>

A self-dispersible yellow pigment dispersion (pigment solid concentration: 15% by mass) was obtained in the same manner as in the Preparation Example 1 of pigment dispersion except that the carbon black pigment was changed to Pigment Yellow 74 (product name: Fast Yellow 531, available from Dainichiseika Color & Chemicals Mfg. Co., Ltd.).

Preparation Example 5 of Pigment Dispersion

<Preparation of Resin Dispersion-Type Black Pigment Dispersion>

Preparation of Polymer Solution A

A flask (1 L) equipped with a mechanical stirrer, a thermometer, a nitrogen gas introducing tube, a reflux tube, and a dropping funnel was sufficiently purged with nitrogen gas. Then, styrene (11.2 g), acrylic acid (2.8 g), lauryl methacrylate (12.0 g), polyethylene glycol methacrylate (4.0 g), styrene macromer (product name: AS-6, available from Toagosei Company, Limited) (4.0 g), and mercaptoethanol (0.4 g) were mixed and were heated to 65° C. Next, a mixture solution of styrene (100.8 g), acrylic acid (25.2 g), lauryl methacrylate (108.0 g), polyethylene glycol methacrylate (36.0 g), hydroxyethyl methacrylate (60.0 g), the styrene macromer (36.0 g), mercaptoethanol (3.6 g), azobis methylvaleronitrile (2.4 g), and methyl ethyl ketone (18.0 g) was added dropwise to the flask for 2.5 hours. After that, a mixture solution of azobis methylvaleronitrile (0.8 g) and methyl ethyl ketone (18.0 g) was added dropwise to the flask for 0.5 hours. The resultant mixture was aged for 1 hour at 65° C. Azobis methylvaleronitrile (0.8 g) was added to the resultant mixture and was further aged for 1 hour. After completion of the reaction, methyl ethyl ketone (364.0 g) was added to the flask to obtain 800 g of polymer solution A having a concentration of 50% by mass.

Preparation of Resin Dispersion-Type Black Pigment Dispersion

The polymer solution A (28 g), carbon black (product name: FW100, available from Degussa) (42 g), a 1 mol/L potassium hydroxide solution (13.6 g), methyl ethyl ketone (20 g), and water (13.6 g) were sufficiently stirred and were kneaded using a roll mill. The obtained paste was charged into pure water (200 g) and was sufficiently stirred. Then, methyl ethyl ketone and water were removed from the resultant mixture using an evaporator. Furthermore, in order to remove coarse particles, the obtained dispersion liquid was subjected to pressure filtration using a polyvinylidenfluoride membrane filter (product name: DURAPORE SVLP 04700, available from Merck) having an average pore diameter of 5.0 μm to obtain a resin dispersion-type black pigment dispersion (pigment solid concentration: 15% by mass, solid concentration: 20% by mass).

Preparation Example 1 of Polyurethane Resin Particles

<Preparation of Polycarbonate Polyurethane Resin Emulsion>

A reaction vessel equipped with a stirrer, a reflux condenser, and a thermometer was charged with 1,500 parts by mass of polycarbonate diol (reaction product of 1,6-hexanediol and dimethyl carbonate (number average molecular weight (Mn): 1,200)), 220 parts by mass of 2,2-dimethylolpropionic acid (hereinafter may be referred to as "DMPA"), and 1,347 parts by mass of N-methylpyrrolidone (hereinafter may be referred to as "NMP") under a nitrogen gas stream. The resultant mixture was heated to 60° C. to dissolve DMPA.

Next, 1,445 parts by mass of 4,4'-diclohexylmethane diisocyanate and 2.6 parts by mass of dibutyl tin dilaurate (catalyst) were added to the resultant mixture. The obtained mixture was heated to 90° C. and was allowed to undergo urethanization reaction for 5 hours to obtain an isocyanate-terminated urethane prepolymer. This reaction mixture was cooled to 80° C. and 149 parts by mass of triethylamine was added to the mixture. Then, 4,340 parts by mass of the resultant mixture was taken out and was added to a solution obtained by mixing 5,400 parts by mass of water and 15 parts by mass of triethylamine under strong stirring.

Next, 1,500 parts by mass of ice was charged into the obtained mixture. Then, 626 parts by mass of a 35% by mass 2-methyl-1,5-pentanediamine solution was added to the resultant mixture. The mixture was allowed to undergo chain elongation reaction. The solvent was removed so that a solid concentration of the mixture was 30% by mass to obtain a polycarbonate polyurethane resin emulsion.

When the obtained polycarbonate polyurethane resin emulsion was measured for a minimum film forming temperature using "a filming temperature tester" (available from Imoto machinery Co., LTD), the minimum film forming temperature was found to be 55° C.

Preparation Example 2 of Polyurethane Resin Particles

<Preparation of Polyether Polyurethane Resin Emulsion>

In a vessel that was purged with nitrogen and was equipped with a thermometer, a nitrogen gas introducing tube, and a stirrer, 100.2 parts by mass of polyether polyol ("PTMG 1000", available from Mitsubishi Chemical Corporation, weight average molecular weight: 1,000), 15.7 parts by mass of 2,2-dimethylolpropionic acid, 48.0 parts by mass of isophorone diisocyanate, 77.1 parts by mass of methyl ethyl ketone serving as an organic solvent, and 0.06 parts by mass of dibutyl tin dilaurate (hereinafter may be referred to as "DMTDL") serving as a catalyst were allowed to react.

The above reaction was continued for 4 hours. Then, 30.7 parts by mass of methyl ethyl ketone serving as a dilution solvent was supplied to the resultant mixture and the reaction was further continued.

At a time when a weight average molecular weight of a product obtained through the reaction reached a range of from 20,000 or more but 60,000 or less, 1.4 parts by mass of methanol was charged thereinto so that the reaction was terminated to obtain an organic solvent solution of urethane resin.

To the organic solvent solution of urethane resin, 13.4 parts by mass of 48% by mass aqueous potassium hydroxide solution was added to neutralize carboxyl groups incorporated into the urethane resin. Next, 715.3 parts by mass of water was added to the resultant mixture. The obtained mixture was sufficiently stirred and was subjected to aging and solvent removal to obtain a polyether polyurethane resin emulsion having a solid concentration of 30% by mass.

The obtained polyether polyurethane resin emulsion was measured for a minimum film forming temperature in the same manner as in the Preparation Example 1 of polycarbonate polyurethane resin emulsion. As a result, the minimum film forming temperature was found to be 43° C.

Preparation Example 3 of Polyurethane Resin Particles

<Preparation of Polyester Polyurethane Resin Emulsion>

A polyester polyurethane resin emulsion having a solid concentration of 30% by mass was obtained in the same manner as in the Preparation Example 2 of polyurethane resin particles except that polyether polyol ("PTMG 1000", available from Mitsubishi Chemical Corporation, weight average molecular weight: 1,000) was changed to polyester polyol ("POLYLITE OD-X-2251", DIC Corporation, weight average molecular weight: 2,000).

The obtained polyester polyurethane resin emulsion was measured for a minimum film forming temperature in the same manner as in the Preparation Example 1 of polycarbonate polyurethane resin emulsion. As a result, the minimum film forming temperature was found to be 74° C.

Example A1

A self-dispersible black pigment dispersion (20.0% by mass), polyether-modified silicone 2 (polysiloxane surfactant, product name: KF-6017, available from Shin-Etsu Chemical Co., Ltd., HLB value: 4.5) (1.0% by mass), acryl-silicone resin emulsion 4 (product name: AE 980, available from Emulsion Technology Co., Ltd., solid concentration: 50% by mass, glass transition temperature (Tg): −14° C.) (2.0% by mass), a polycarbonate polyurethane resin emulsion (solid concentration: 30% by mass) (23.3% by mass), 1,2-propanediol (12.0% by mass), 1,3-propanediol (10.0% by mass), 1,2-butanediol (3.0% by mass), 2,3-butanediol (3.0% by mass), 3-methoxy-3-methylbutanol (3.0% by mass), 2-methyl-2,4-pentanediol (3.0% by mass), dipropylene glycol monomethyl ether (4.0% by mass), product name: PROXEL LV (available from Avecia) (0.1% by mass) serving as an antiseptic agent, and highly purified water serving as a balance were added, and were mixed and stirred. The resultant mixture was filtered through a polypropylene filter (product name: BETAFINE, polypropylene pleat filter PPG series, available from 3M) having an average pore diameter of 0.2 μm to prepare ink A1.

Examples A2 to A12 and Comparative Examples A1 and A2

Inks A2 to A14 of Examples A2 to A12 and Comparative Examples A1 and A2 were prepared in the same manner as in Example A1 except that the formulation and the amounts in Example A1 were changed to formulations and amounts described in the following Tables A-1-1, A-1-2, A-2-1, A-2-2, and A-3.

TABLE A-1-1

| | | Examples | | |
|---|---|---|---|---|
| | | A1 | A2 | A3 |
| Colorants | Self-dispersible black pigment dispersion liquid | 20.0 | 20.0 | — |
| | Self-dispersible cyan pigment dispersion liquid | — | — | — |
| | Self-dispersible magenta pigment dispersion liquid | — | — | 20.0 |
| | Self-dispersible yellow pigment dispersion liquid | — | — | — |
| | Resin dispersion-type black pigment dispersion liquid | — | — | — |
| Polysiloxane surfactant A | Polyoxyalkylene group-including silicone compound 1 (HLB value: 1.0) | — | — | — |
| | Polyether-modified silicone 1 (HLB value: 4.0) | — | — | — |
| | Polyether-modified silicone 2 (HLB value: 4.5) | 1.0 | — | — |
| | Polyether-modified silicone 3 (HLB value: 5.0) | — | — | — |
| | Polyoxyalkylene group-including silicone compound 2 (HLB value: 5.8) | — | — | — |
| | Polyether-modified silicone 4 (HLB value: 6.0) | — | — | — |
| | Polyether-modified silicone 5 (HLB value: 7.0) | — | 2.0 | — |
| | Polyether-modified silicone 6 (HLB value: 7.4) | — | — | 1.2 |
| | Polyether-modified silicone 7 (HLB value: 8.0) | — | — | — |
| | Polyether-modified silicone 8 (HLB value: 10.0) | — | — | — |
| Acryl-silicone resin particles B | Acryl-silicone resin emulsion 1 (Tg: 50° C.) | — | — | — |
| | Acryl-silicone resin emulsion 2 (Tg: 21° C.) | — | — | — |
| | Acryl-silicone resin emulsion 3 (Tg: 0° C.) | — | — | — |
| | Acryl-silicone resin emulsion 4 (Tg: −14° C.) | 2.0 | 4.8 | — |
| | Acryl-silicone resin emulsion 5 (Tg: −15° C.) | — | — | 2.8 |
| | Acryl-silicone resin emulsion 6 (Tg: 0° C.) | — | — | — |
| Polyurethane resin particles | Polycarbonate polyurethane resin emulsion | 23.3 | 18.3 | — |
| | Polyether polyurethane resin emulsion | — | — | 13.3 |
| | Polyester polyurethane resin emulsion | — | — | — |
| Organic solvents | 1,2-Propanediol | 12.0 | 18.0 | 14.0 |
| | 1,3-Propanediol | 10.0 | 4.0 | 2.0 |
| | 1,2-Butanediol | 3.0 | 2.0 | 3.0 |
| | 2,3-Butanediol | 3.0 | 5.0 | 3.0 |
| | 3-Methoxy-3-methylbutanol | 3.0 | 6.0 | 8.0 |
| | 2-Methyl-2,4-pentanediol | 3.0 | — | 2.0 |
| | Dipropylene glycol monomethyl ether | 4.0 | 2.0 | — |
| Antiseptic agent | PROXEL LV | 0.1 | 0.1 | 0.1 |
| Water | Highly purified water | Balance | Balance | Balance |
| | Total (% by mass) | 100 | 100 | 100 |
| | Mass ratio (B/A) (in terms of solid content) | 1.0 | 1.2 | 1.2 |

TABLE A-1-2

| | | Examples | | |
|---|---|---|---|---|
| | | A4 | A5 | A6 |
| Colorants | Self-dispersible black pigment dispersion liquid | — | — | — |
| | Self-dispersible cyan pigment dispersion liquid | — | 20.0 | — |
| | Self-dispersible magenta pigment dispersion liquid | — | — | — |
| | Self-dispersible yellow pigment dispersion liquid | 20.0 | — | — |
| | Resin dispersion-type black pigment dispersion liquid | — | — | 20.0 |
| Polysiloxane surfactant A | Polyoxyalkylene group-including silicone compound 1 (HLB value: 1.0) | — | — | 1.6 |
| | Polyether-modified silicone 1 (HLB value: 4.0) | — | 1.6 | — |
| | Polyether-modified silicone 2 (HLB value: 4.5) | — | — | — |
| | Polyether-modified silicone 3 (HLB value: 5.0) | — | — | — |
| | Polyoxyalkylene group-including silicone compound 2 (HLB value: 5.8) | — | — | — |
| | Polyether-modified silicone 4 (HLB value: 6.0) | — | — | — |
| | Polyether-modified silicone 5 (HLB value: 7.0) | — | — | — |
| | Polyether-modified silicone 6 (HLB value: 7.4) | — | — | — |
| | Polyether-modified silicone 7 (HLB value: 8.0) | 1.2 | — | — |
| | Polyether-modified silicone 8 (HLB value: 10.0) | — | — | — |
| Acryl-silicone resin particles B | Acryl-silicone resin emulsion 1 (Tg: 50° C.) | — | — | — |
| | Acryl-silicone resin emulsion 2 (Tg: 21° C.) | — | — | — |
| | Acryl-silicone resin emulsion 3 (Tg: 0° C.) | 4.7 | — | — |
| | Acryl-silicone resin emulsion 4 (Tg: −14° C.) | — | — | — |
| | Acryl-silicone resin emulsion 5 (Tg: −15° C.) | — | 4.8 | 4.8 |
| | Acryl-silicone resin emulsion 6 (Tg: 0° C.) | — | — | — |
| Polyurethane resin particles | Polycarbonate polyurethane resin emulsion | — | — | 25.3 |
| | Polyether polyurethane resin emulsion | — | — | — |
| | Polyester polyurethane resin emulsion | 13.3 | 18.3 | — |

TABLE A-1-2-continued

|  |  | Examples | | |
|---|---|---|---|---|
|  |  | A4 | A5 | A6 |
| Organic solvents | 1,2-Propanediol | 15.0 | 16.0 | 20.0 |
|  | 1,3-Propanediol | 2.0 | 2.0 | 5.0 |
|  | 1,2-Butanediol | 2.0 | 2.0 | 2.0 |
|  | 2,3-Butanediol | 3.0 | 5.0 | 4.0 |
|  | 3-Methoxy-3-methylbutanol | 5.0 | 4.0 | 3.0 |
|  | 2-Methyl-2,4-pentanediol | 2.0 | 5.0 | — |
|  | Dipropylene glycol monomethyl ether | 2.0 | 3.0 | 2.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 1.5 | 1.5 |

TABLE A-2-1

|  |  | Examples | | |
|---|---|---|---|---|
|  |  | A7 | A8 | A9 |
| Colorants | Self-dispersible black pigment dispersion liquid | 20.0 | — | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | 20.0 | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | 0.8 | — | — |
|  | Polyether-modified silicone 4 (HLB value: 6.0) | — | 2.4 | — |
|  | Polyether-modified silicone 5 (HLB value: 7.0) | — | — | 1.4 |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | 2.8 |
|  | Acryl-silicone resin emulsion 3 (Tg: 0° C.) | — | 6.3 | — |
|  | Acryl-silicone resin emulsion 4 (Tg: −14° C.) | — | — | — |
|  | Acryl-silicone resin emulsion 5 (Tg: −15° C.) | — | — | — |
|  | Acryl-silicone resin emulsion 6 (Tg: 0° C.) | 2.0 | — | — |
| Polyurethane resin particles | Polycarbonate polyurethane resin emulsion | 13.3 | — | 23.3 |
|  | Polyether polyurethane resin emulsion | — | 13.3 | — |
|  | Polyester polyurethane resin emulsion | — | — | — |
| Organic solvents | 1,2-Propanediol | 13.0 | 12.0 | 8.0 |
|  | 1,3-Propanediol | — | 4.0 | 5.0 |
|  | 1,2-Butanediol | 3.0 | 4.0 | 3.0 |
|  | 2,3-Butanediol | 3.0 | 1.0 | 4.0 |
|  | 3-Methoxy-3-methylbutanol | 3.0 | 4.0 | 6.0 |
|  | 2-Methyl-2,4-pentanediol | 5.0 | 4.0 | 3.0 |
|  | Dipropylene glycol monomethyl ether | 6.0 | 4.0 | 5.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.3 | 0.8 | 1.0 |

TABLE A-2-2

|  |  | Examples | | |
|---|---|---|---|---|
|  |  | A10 | A11 | A12 |
| Colorants | Self-dispersible black pigment dispersion liquid | 20.0 | 20.0 | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | — | — |

TABLE A-2-2-continued

|  |  | Examples | | |
|---|---|---|---|---|
|  |  | A10 | A11 | A12 |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | 1.2 | — | — |
|  | Polyoxyalkylene group-including silicone compound 2 (HLB value: 5.8) | — | — | 1.0 |
|  | Polyether-modified silicone 4 (HLB value: 6.0) | — | 1.5 | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | 5.8 | — | — |
|  | Acryl-silicone resin emulsion 2 (Tg: 21° C.) | — | — | — |
|  | Acryl-silicone resin emulsion 3 (Tg: 0° C.) | — | — | 6.0 |
|  | Acryl-silicone resin emulsion 4 (Tg: −14° C.) | — | 1.8 | — |
|  | Acryl-silicone resin emulsion 5 (Tg: −15° C.) | — | — | — |
|  | Acryl-silicone resin emulsion 6 (Tg: 0° C.) | — | — | — |
| Polyurethane resin particles | Polycarbonate polyurethane resin emulsion | — | — | — |
|  | Polyether polyurethane resin emulsion | 25.0 | — | 25.0 |
|  | Polyester polyurethane resin emulsion | — | 25.0 | — |
| Organic solvents | 1,2-Propanediol | 4.0 | 10.0 | 13.0 |
|  | 1,3-Propanediol | 5.0 | 2.0 | 5.0 |
|  | 1,2-Butanediol | 5.0 | 5.0 | 5.0 |
|  | 2,3-Butanediol | 4.0 | 6.0 | 5.0 |
|  | 3-Methoxy-3-methylbutanol | 5.0 | 4.0 | 5.0 |
|  | 2-Methyl-2,4-pentanediol | 5.0 | 3.0 | 1.0 |
|  | Dipropylene glycol monomethyl ether | 5.0 | 3.0 | 1.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 0.6 | 1.8 |

TABLE A-3

|  |  | Comparative Examples | |
|---|---|---|---|
|  |  | A1 | A2 |
| Colorants | Self-dispersible black pigment dispersion liquid | 20.0 | 20.0 |
|  | Self-dispersible cyan pigment dispersion liquid | — | — |
|  | Self-dispersible magenta pigment dispersion liquid | — | — |
|  | Self-dispersible yellow pigment dispersion liquid | — | — |
|  | Resin dispersion-type black pigment dispersion liquid | — | — |
| Polysiloxane surfactant A | Polyoxyalkylene group-including silicone compound 1 (HLB value: 1.0) | — | — |
|  | Polyether-modified silicone 1 (HLB value: 4.0) | — | — |
|  | Polyether-modified silicone 2 (HLB value: 4.5) | — | — |
|  | Polyether-modified silicone 3 (HLB value: 5.0) | — | — |
|  | Polyoxyalkylene group-including silicone compound 2 (HLB value: 5.8) | — | — |
|  | Polyether-modified silicone 4 (HLB value: 6.0) | — | — |
|  | Polyether-modified silicone 5 (HLB value: 7.0) | — | 1.0 |
|  | Polyether-modified silicone 6 (HLB value: 7.4) | — | — |
|  | Polyether-modified silicone 7 (HLB value: 8.0) | — | — |
|  | Polyether-modified silicone 8 (HLB value: 10.0) | 1.0 | — |
| Acryl-silicone resin particles B | Acryl-silicone resin emulsion 1 (Tg: 50° C.) | — | — |
|  | Acryl-silicone resin emulsion 2 (Tg: 21° C.) | — | — |
|  | Acryl-silicone resin emulsion 3 (Tg: 0° C.) | — | — |
|  | Acryl-silicone resin emulsion 4 (Tg: −14° C.) | 2.0 | — |
|  | Acryl-silicone resin emulsion 5 (Tg: −15° C.) | — | — |
|  | Acryl-silicone resin emulsion 6 (Tg: 0° C.) | — | — |
| Polyurethane resin particles | Polycarbonate polyurethane resin emulsion | 23.3 | 23.3 |
|  | Polyether polyurethane resin emulsion | — | — |
|  | Polyester polyurethane resin emulsion | — | — |
| Organic solvents | 1,2-Propanediol | 12.0 | 15.0 |
|  | 1,3-Propanediol | 10.0 | 2.0 |
|  | 1,2-Butanediol | 5.0 | 5.0 |
|  | 2,3-Butanediol | 5.0 | — |

TABLE A-3-continued

|  |  | Comparative Examples | |
|---|---|---|---|
|  |  | A1 | A2 |
|  | 3-Methoxy-3-methylbutanol | — | 2.0 |
|  | 2-Methyl-2,4-pentanediol | 3.0 | 5.0 |
|  | Dipropylene glycol monomethyl ether | 2.0 | 5.0 |
| Antiseptic agent | PROXEL LV | 0.1 | 0.1 |
| Water | Highly purified water | Balance | Balance |
|  | Total (% by mass) | 100 | 100 |
|  | Mass ratio (B/A) (in terms of solid content) | 1.0 | 0.0 |

Here, product names and manufacturing companies of the components in Tables A-1-1, A-1-2, A-2-1, A-2-2, and A-3 are as follows.

Polyoxyalkylene group-including silicone compound 1: available from Dow Corning Toray Co., Ltd., product name: FZ 2110, HLB value: 1.0

Polyether-modified silicone 1: available from Shin-Etsu Chemical Co., Ltd., product name: KF-945, HLB value: 4.0

Polyether-modified silicone 2: available from Shin-Etsu Chemical Co., Ltd., product name: KF-6017, HLB value: 4.5

Polyether-modified silicone 3: available from Ultra Addives Inc., product name: FormBan MS-575, HLB value: 5.0

Polyoxyalkylene group-including silicone compound 2: available from Dow Corning Toray Co.,Ltd., product name: FZ 2166, HLB value: 5.8

Polyether-modified silicone 4: available from Dow Corning Toray Co., Ltd., product name: SH-3772M, HLB value: 6.0

Polyether-modified silicone 5: available from Nissin Chemical Industry Co., Ltd., product name: SILFACE SAG 005, HLB value: 7.0

Polyether-modified silicone 6: available from Dow Corning Toray Co., Ltd., product name: L7001, HLB value: 7.4

Polyether-modified silicone 7: available from Dow Corning Toray Co., Ltd., product name: SH-3773M, HLB value: 8.0

Polyether-modified silicone 8: available from Shin-Etsu Chemical Co., Ltd., product name: KF-353, HLB value: 10.0

Acryl-silicone resin emulsion 1: available from Daicel FineChem Ltd., product name: AQ 914, solid concentration: 24% by mass, Tg: 50° C.

Acryl-silicone resin emulsion 2: available from DIC Corporation, product name: SA-6360, solid concentration: 50% by mass, Tg: 21° C.

Acryl-silicone resin emulsion 3: available from Toagosei Company, Limited, product name: SYMAC 480, solid concentration: 30% by mass, Tg: 0° C.

Acryl-silicone resin emulsion 4: product name: AE 980, available from Emulsion Technology Co., Ltd., solid concentration: 50% by mass, Tg: −14° C.

Acryl-silicone resin emulsion 5: product name: AE 981A, available from Emulsion Technology Co., Ltd., solid concentration: 50% by mass, Tg: −15° C.

Acryl-silicone resin emulsion 6: product name: AE 982, available from Emulsion Technology Co., Ltd., solid concentration: 50% by mass, Tg: 0° C.

Antiseptic agent: available from Avecia, product name: PROXEL LV

Next, "storage stability", "fixability (beading)", "rubfastness", "solvent resistance", "image gloss level", and "close adhesiveness" were evaluated in the following manners. The results are presented in Table A-4.

Here, the evaluation criteria for "fixability (beading)" and "rubfastness" were much stricter than criteria for printing on commonly-used paper considering that the ink is used for outdoor applications.

<Storage Stability (Appearance Evaluation)>

Each of the obtained inks A1 to A14 of Example A1 to A12 and Comparative Example A1 and A2 was stored in a vessel (volume: 30 mL) (product name: glass vial SV-30, available from NICHIDEN-RIKA GLASS CO., LTD.) at 50° C., 60° C., or 70° C. for 7 days. The ink was visually observed and was evaluated for "storage stability" based on the following evaluation criteria. The obtained evaluation result achieving B or greater is desirable in terms of practical applications.

[Evaluation Criteria]

A: Phase separation is not caused even when the ink is stored at 70° C.

B: Phase separation is not caused when the ink is stored at 60° C. However, phase separation is caused when the ink is stored at 70° C.

C: Phase separation is not caused when the ink is stored at 50° C. However, phase separation is caused when the ink is stored at 60° C.

D: Phase separation is caused when the ink is stored at 50° C.

[Formation of Solid Image]

Next, each of the obtained inks A1 to A14 of Examples A1 to A12 and Comparative Examples A1 and A2 was loaded into an inkjet printer (apparatus name: remodeled apparatus of IPSIO GXE 5500, available from Ricoh Co., Ltd.) and a solid image was printed on a polyvinyl chloride film (CP-PVWP 1300, available from SAKURAI CO., LTD., hereinafter may be referred to as "PVC film") print medium so that an amount of the ink deposited was 0.6 g/cm$^2$. After the printing, the solid image was dried for 1 hour on a hot plate (NINOS ND-1, available from AS ONE Corporation.) that had been set to 80° C.

The remodeled apparatus of IPSIO GXE 5500 was obtained by remodeling an apparatus of IPSIO GXE 5500 to be capable of reproducing a print corresponding to a printing speed of 30 m$^2$/hr at a printing width of 150 cm over an A4-size print medium. In addition, the hot plate was provided on the remodeled apparatus of IPSIO GXE 5500 so that heating conditions (e.g., heating temperature and heating time) after the printing can be changed.

<Fixability (Beading)>
The printing unevenness of the solid image formed on a PVC film print medium was visually observed and was used for the evaluation of "fixability (beading)" based on the following evaluation criteria. The obtained evaluation result achieving B or greater is desirable in terms of practical applications.
[Evaluation Criteria]
  A: Considerably excellent (there was no beading)
  B: Good (there was a little beading)
  C: Normal (there was some beading)
  D: Bad (there was a lot of beading)
<Rubfastness>
A solid image that had been formed on a PVC film print medium was scratched with dry cotton (calico No. 3) under application of a load (400 g). A state of the image was visually observed and was used for the evaluation of "rubfastness" based on the following evaluation criteria. The obtained evaluation result achieving B or greater is desirable in terms of practical applications.
[Evaluation Criteria]
  AA: The image was not changed even after the image was scratched 50 times or more.
  A: At a time when the image was scratched 50 times, there were some scratches on the image, which was not problematic.
  B: The image was not changed even after the image was scratched 31 times or more but 49 times or less.
  C: The image was not changed after the image was scratched 30 times or less.
<Solvent Resistance>
A solid image formed on a PVC film print medium was immersed in a 60% by mass aqueous ethanol solution at normal temperature (25° C.) for 24 hours and was subjected to air drying at normal temperature (25° C.) for 24 hours. Then, the solid image was measured for image density using an X-RITE 938 (available from X-Rite). The percentage of reduction in an image density value after the immersion relative to an initial image density value before the immersion was calculated and was used for the evaluation of "solvent resistance" based on the following evaluation criteria. The obtained evaluation result achieving B or greater is desirable in terms of practical applications.
[Evaluation Criteria]
  AA: The percentage of reduction in the image density value is less than 10%.
  A: The percentage of reduction in the image density value is 10% or more but less than 20%.
  B: The percentage of reduction in the image density value is 20% or more but less than 30%.
  C: The percentage of reduction in the image density value is 30% or more.
<Image Gloss Level>
A solid image formed on a PVC film print medium was measured for 60° gloss level using a gloss meter (available from BYK Gardener, 4501) 4 times to obtain values of gloss level. The values were used to determine an average value of gloss level. The average value was used for the evaluation of the "image gloss level" based on the following evaluation criteria. The obtained evaluation result achieving B or greater is desirable in terms of practical applications.
[Evaluation Criteria]
  AA: The value of gloss level is 100 or more.
  A: The value of gloss level is 90 or more but less than 100.
  B: The value of gloss level is 80 or more but less than 90.
  C: The value of gloss level is less than 80.
<Close Adhesiveness>
A solid image formed on a PVC film print medium was subjected to the cross-cut peel test using a piece of the close adhesive tape (available from Nichiban Co., Ltd., 123LW-50). The number of squares remaining in 100 squares for the test was counted and was used for the evaluation of "close adhesiveness" to a print medium based on the following evaluation criteria. The obtained evaluation result achieving B or greater is desirable in terms of practical applications.
[Evaluation Criteria]
  AA: The number of the squares remaining was 98 or more.
  A: The number of the squares remaining was 90 or more but less than 98.
  B: The number of the squares remaining was 70 or more but less than 90.
  C: The number of the squares remaining was less than 70.

TABLE A-4

|  |  | Evaluation results | | | | | |
|---|---|---|---|---|---|---|---|
|  |  | Fixability (beading) | Storage stability | Rubfastness | Solvent resistance | Image gloss level | Close adhesiveness |
| Examples | A1 | A | A | AA | A | AA | A |
|  | A2 | A | A | AA | A | AA | A |
|  | A3 | B | A | AA | A | AA | A |
|  | A4 | B | A | AA | A | AA | A |
|  | A5 | A | B | AA | A | AA | A |
|  | A6 | A | B | A | A | A | A |
|  | A7 | B | A | AA | B | A | A |
|  | A8 | A | B | A | A | A | A |
|  | A9 | A | A | A | A | AA | B |
|  | A10 | A | A | AA | A | AA | B |
|  | A11 | A | B | AA | A | AA | A |
|  | A12 | A | A | A | A | B | A |
| Comparative | A1 | C | A | A | C | B | B |
| Examples | A2 | A | D | A | B | A | C |

Example A1 and Example A2 are preferable Examples of the present disclosure. It is found that the inks of Example A1 and Example A2 are excellent in close adhesiveness to a PVC film print medium. In addition, it is found that use of the inks makes it possible to obtain images having high image gloss level and having rubfastness and solvent resistance even when an image is printed on an impermeable print medium.

Example A3 and Example A4 are examples where the polysiloxane surfactants have somewhat high HLB values. The inks of Example A3 and Example A4 were deteriorated in fixability compared to the ink of Example A1.

Example A5 and Example A6 are examples where the polysiloxane surfactants have somewhat low HLB values. The inks of Example A5 and Example A6 were deteriorated in storage stability compared to the ink of Example A1.

Example A7 is an example where the amount of the polysiloxane surfactant added is somewhat low. The ink of Example A7 was deteriorated in fixability and solvent resistance compared to the ink of Example A1.

Example A8 is an example where the amount of the polysiloxane surfactant added is somewhat high. The ink of Example A8 was deteriorated in storage stability compared to the ink of Example A1.

Example A9 and Example A10 are examples where the glass transition temperatures (Tg) of the acryl-silicone resin emulsions are higher than 0° C. The inks of Example A9 and Example A10 were deteriorated in close adhesiveness compared to the ink of Example A1.

Example A11 is an example where the amount of the acryl-silicone resin particles is somewhat insufficient compared to the amount of the polysiloxane surfactant. The ink of Example A11 was deteriorated in storage stability compared to the ink of Example A1.

Example A12 is an example where the amount of the acryl-silicone resin particles is somewhat higher compared to the amount of the polysiloxane surfactant. The ink of Example A12 was deteriorated in image gloss level compared to the ink of Example A1.

Meanwhile, Comparative Example A1 is an example where the ink includes no polysiloxane surfactant having an HLB value of 8 or less. Comparative Example A2 is an example where the ink includes no acryl-silicone resin particles. The ink of Comparative Examples A1 was particularly deteriorated in fixability and solvent resistance compared to the ink of Example A1. The ink of Comparative Example A2 was particularly deteriorated in storage stability and close adhesiveness compared to the ink of Example A1.

From the results of the Table A-4, it is found that the ink of the present disclosure is suitably used for outdoor applications. In addition, the inks of Examples A1 to A12 were excellent in fixability, storage stability, rubfastness, solvent resistance, image gloss level, and close adhesiveness.

(Evaluation of Influence by Difference in Printing Apparatus)

Test Example 1

The ink A6 of Example A6 was loaded into a printing apparatus (remolded apparatus of IPSIO GXE 5500 (available from Ricoh Co., Ltd.)) and was left to stand for 24 hours under the environments of temperature: 35° C. and humidity 30% RH. During the time when the ink was left to stand, a circulation mechanism was allowed to work for 2 minutes once per 1 hour.

Next, after the ink was left to stand, under the environments of temperature: 35° C. and humidity: 30% RH, an image was printed on a polyvinyl chloride film (CPPVWP 1300, available from SAKURAI CO., LTD., may be referred to as "PVC film") print medium to form a solid image so that an amount of the ink deposited was 0.6 g/cm$^2$. After printing, the solid image was dried for 1 hour on a hot plate (apparatus name: NINOS ND-1, available from AS ONE Corporation.) that had been set to 80° C. Here, the remodeled apparatus of IPSIO GXE 5500 is an apparatus including a head part capable of circulating the ink and a mechanism capable of circulating the ink through remodeling as presented in FIGS. 4 to 15.

The obtained solid image was used for evaluating "image density", "density uniformity of solid image", and "single dot diameter". The results are presented in the following Table A-5.

(Image Density)

Any 4 portions on the obtained solid image were measured for an OD value using a apparatus name: X-RITE 938 (available from X-Rite) to calculate an average value obtained by using the measured values and a differential value (Max–Min) obtained by subtracting the minimum value (Min) from the maximum value (Max).

(Density Uniformity of Solid Image)

The obtained solid image was evaluated for "density uniformity of solid image" based on the evaluation criteria. The obtained evaluation result achieving B or greater is not problematic level in terms of practical applications.

[Evaluation Criteria]

A: The solid image is uniform.

B: A little unevenness of the density is found when the solid image is closely observed.

C: The solid image has much unevenness of the density.

D: The solid image has much unevenness of the density and a white part of the print medium is partially found on the solid image.

(Single Dot Diameter)

The ink A6 of Example A6 was used to print a nozzle check pattern using the same apparatus and under the same conditions as described above. For measurement of the single dot diameter, an image to be observed was photographed by a digital microscope at a magnification of ×450. The obtained image was binarized using an image processing software to calculate a diameter of a single dot. Note that, the number of the single dot diameter in the image to be observed was 28 dots.

Test Example 2

A solid image was obtained in the same manner as in the Test Example 1 except that the printing apparatus (remolded apparatus of IPSIO GXE 5500 (available from Ricoh Co., Ltd.)) was changed to IPSIO GXE 5500 (available from Ricoh Co., Ltd.). Here, the IPSIO GXE 5500 has no mechanism capable of circulating the ink and thus does not circulate the ink.

The obtained image was evaluated for "image density", "density uniformity of solid image", and "single dot diameter" in the same manner as in the Test Example 1. The results are presented in the following Table A-5.

TABLE A-5

| | | Inks | Presence or absence of ink circulating mechanism of printing apparatus | Evaluation results | | | | | |
|---|---|---|---|---|---|---|---|---|---|
| | | | | Image density | | | | Density uniformity of solid image | Single dot diameter (μm) |
| | | | | Average value | Maximum value | Minimum value | Difference between maximum value and minimum value (Max − Min) | | |
| Examination Examples | 1 | Example A6 | Presence | 2.35 | 2.42 | 2.30 | 0.12 | A | 98 |
| | 2 | Example A6 | Absence | 2.18 | 2.30 | 1.95 | 0.35 | C | 87 |

From the results of the Table A-5, it is found that use of the printing apparatus incorporating the mechanism configured to circulate the ink into the head in Test Example 1 makes it possible to achieve high image density, little evenness of density on any portion of the solid image, and large single dot diameter compared to the printing apparatus incorporating no mechanism configured to circulate the ink into the head in Test Example 2. It is believed that even when the ink including the surfactant having low HLB value is left to stand at high temperature, phase separation of the surfactant can be prevented by circulating the ink A6 used in Test Example 1 to be stirred.

Example B1

A self-dispersible black pigment dispersion (20.0% by mass), polyether-modified silicone 2 (polysiloxane surfactant, product name: KF-6017, available from Shin-Etsu Chemical Co., Ltd., HLB value: 4.5) (1.0% by mass), acryl-silicone resin emulsion 4 (product name: AE 980, available from Emulsion Technology Co., Ltd., solid concentration: 50% by mass, glass transition temperature (Tg): −14° C.) (2.0% by mass), fluororesin emulsion 1 (available from Du Pont-Mitsui Fluorochemicals Company, Ltd., product name: TEFLON (Registered Trademark) AF 1600, solid concentration: 30% by mass, Tg: 160° C.) (23.3% by mass), 1,2-propanediol (12.0% by mass), 1,3-propanediol (10.0% by mass), 1,2-butanediol (3.0% by mass), 2,3-butanediol (3.0% by mass), 3-methoxy-3-methylbutanol (3.0% by mass), 2-methyl-2,4-pentanediol (3.0% by mass), dipropylene glycol monomethyl ether (4.0% by mass), product name: PROXEL LV (available from Avecia) (0.1% by mass) serving as an antiseptic agent, and highly purified water serving as a balance were added, and were mixed and stirred. The resultant mixture was filtered through a polypropylene filter (product name: BETAFINE, polypropylene pleat filter PPG series, available from 3M) having an average pore diameter of 0.2 μm to prepare ink B1.

Examples B2 to B12 and Comparative Examples B1 and B2

Inks B2 to B14 of Examples B2 to B12 and Comparative Examples B1 and B2 were prepared in the same manner as in Example B1 except that the formulation and the amounts in Example B1 were changed to formulations and amounts described in the following Tables B-1-1, B-1-2, B-2-1, B-2-2, and B-3.

TABLE B-1-1

| | | Examples | | |
|---|---|---|---|---|
| | | B1 | B2 | B3 |
| Colorants | Self-dispersible black pigment dispersion liquid | 20.0 | 20.0 | — |
| | Self-dispersible cyan pigment dispersion liquid | — | — | — |
| | Self-dispersible magenta pigment dispersion liquid | — | — | 20.0 |
| | Self-dispersible yellow pigment dispersion liquid | — | — | — |
| | Resin dispersion-type black pigment dispersion liquid | — | — | — |
| Polysiloxane surfactant A | Polyoxyalkylene group-including silicone compound 1 (HLB value: 1.0) | — | — | — |
| | Polyether-modified silicone 1 (HLB value: 4.0) | — | — | — |
| | Polyether-modified silicone 2 (HLB value: 4.5) | 1.0 | — | — |
| | Polyether-modified silicone 3 (HLB value: 5.0) | — | — | — |
| | Polyoxyalkylene group-including silicone compound 2 (HLB value: 5.8) | — | — | — |
| | Polyether-modified silicone 4 (HLB value: 6.0) | — | — | — |
| | Polyether-modified silicone 5 (HLB value: 7.0) | — | 2.0 | — |
| | Polyether-modified silicone 6 (HLB value: 7.4) | — | — | 1.2 |
| | Polyether-modified silicone 7 (HLB value: 8.0) | — | — | — |
| | Polyether-modified silicone 8 (HLB value: 10.0) | — | — | — |
| Acryl-silicone resin particles B | Acryl-silicone resin emulsion 1 (Tg: 50° C.) | — | — | — |
| | Acryl-silicone resin emulsion 2 (Tg: 21° C.) | — | — | — |
| | Acryl-silicone resin emulsion 3 (Tg: 0° C.) | — | — | — |
| | Acryl-silicone resin emulsion 4 (Tg: −14° C.) | 2.0 | 4.8 | — |
| | Acryl-silicone resin emulsion 5 (Tg: −15° C.) | — | — | 2.8 |
| | Acryl-silicone resin emulsion 6 (Tg: 0° C.) | — | — | — |
| Fluororesin particles | Fluororesin emulsion 1 (Tg: 160° C.) | 23.3 | 18.3 | — |
| | Fluororesin emulsion 2 (Tg: 240° C.) | — | — | 13.3 |
| | Fluororesin emulsion 3 (Tg: 48° C.) | — | — | — |
| Organic solvents | 1,2-Propanediol | 12.0 | 18.0 | 14.0 |
| | 1,3-Propanediol | 10.0 | 4.0 | 2.0 |
| | 1,2-Butanediol | 3.0 | 2.0 | 3.0 |

TABLE B-1-1-continued

|  |  | Examples | | |
|---|---|---|---|---|
|  |  | B1 | B2 | B3 |
|  | 2,3-Butanediol | 3.0 | 5.0 | 3.0 |
|  | 3-Methoxy-3-methylbutanol | 3.0 | 6.0 | 8.0 |
|  | 2-Methyl-2,4-pentanediol | 3.0 | — | 2.0 |
|  | Dipropylene glycol monomethyl ether | 4.0 | 2.0 | — |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.0 | 1.2 | 1.2 |

15

TABLE B-1-2

|  |  | Examples | | |
|---|---|---|---|---|
|  |  | B4 | B5 | B6 |
| Colorants | Self-dispersible black pigment dispersion liquid | — | — | — |
|  | Self-dispersible cyan pigment dispersion liquid | — | 20.0 | — |
|  | Self-dispersible magenta pigment dispersion liquid | — | — | — |
|  | Self-dispersible yellow pigment dispersion liquid | 20.0 | — | — |
|  | Resin dispersion-type black pigment dispersion liquid | — | — | 20.0 |
| Polysiloxane surfactant A | Polyoxyalkylene group-including silicone compound 1 (HLB value: 1.0) | — | — | 1.6 |
|  | Polyether-modified silicone 1 (HLB value: 4.0) | — | 1.6 | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | 1.2 | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | 4.7 | — | — |
|  | Acryl-silicone resin emulsion 4 (Tg: −14° C.) | — | — | — |
|  | Acryl-silicone resin emulsion 5 (Tg: −15° C.) | — | 4.8 | 4.8 |
|  | Acryl-silicone resin emulsion 6 (Tg: 0° C.) | — | — | — |
| Fluororesin particles | Fluororesin emulsion 1 (Tg: 160° C.) | — | — | 25.3 |
|  | Fluororesin emulsion 2 (Tg: 240° C.) | — | — | — |
|  | Fluororesin emulsion 3 (Tg: 48° C.) | 13.3 | 18.3 | — |
| Organic solvents | 1,2-Propanediol | 15.0 | 16.0 | 20.0 |
|  | 1,3-Propanediol | 2.0 | 2.0 | 5.0 |
|  | 1,2-Butanediol | 2.0 | 2.0 | 2.0 |
|  | 2,3-Butanediol | 3.0 | 5.0 | 4.0 |
|  | 3-Methoxy-3-methylbutanol | 5.0 | 4.0 | 3.0 |
|  | 2-Methyl-2,4-pentanediol | 2.0 | 5.0 | — |
|  | Dipropylene glycol monomethyl ether | 2.0 | 3.0 | 2.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 1.5 | 1.5 |

TABLE B-2-1

|  |  | Examples | | |
|---|---|---|---|---|
|  |  | B7 | B8 | B9 |
| Colorants | Self-dispersible black pigment dispersion liquid | 20.0 | — | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | 20.0 | — |

TABLE B-2-1-continued

| | | Examples | | |
|---|---|---|---|---|
| | | B7 | B8 | B9 |
| Polysiloxane surfactant A | Polyoxyalkylene group-including silicone compound 1 (HLB value: 1.0) | — | — | — |
| | Polyether-modified silicone 1 (HLB value: 4.0) | — | — | — |
| | Polyether-modified silicone 2 (HLB value: 4.5) | — | — | — |
| | Polyether-modified silicone 3 (HLB value: 5.0) | — | — | — |
| | Polyoxyalkylene group-including silicone compound 2 (HLB value: 5.8) | 0.8 | — | — |
| | Polyether-modified silicone 4 (HLB value: 6.0) | — | 2.4 | — |
| | Polyether-modified silicone 5 (HLB value: 7.0) | — | — | 1.4 |
| | Polyether-modified silicone 6 (HLB value: 7.4) | — | — | — |
| | Polyether-modified silicone 7 (HLB value: 8.0) | — | — | — |
| | Polyether-modified silicone 8 (HLB value: 10.0) | — | — | — |
| Acryl-silicone resin particles B | Acryl-silicone resin emulsion 1 (Tg: 50° C.) | — | — | — |
| | Acryl-silicone resin emulsion 2 (Tg: 21° C.) | — | — | 2.8 |
| | Acryl-silicone resin emulsion 3 (Tg: 0° C.) | — | 6.3 | — |
| | Acryl-silicone resin emulsion 4 (Tg: −14° C.) | — | — | — |
| | Acryl-silicone resin emulsion 5 (Tg: −15° C.) | — | — | — |
| | Acryl-silicone resin emulsion 6 (Tg: 0° C.) | 2.0 | — | — |
| Fluororesin particles | Fluororesin emulsion 1 (Tg: 160° C.) | 13.3 | — | 23.3 |
| | Fluororesin emulsion 2 (Tg: 240° C.) | — | 13.3 | — |
| | Fluororesin emulsion 3 (Tg: 48° C.) | — | — | — |
| Organic solvents | 1,2-Propanediol | 13.0 | 12.0 | 8.0 |
| | 1,3-Propanediol | — | 4.0 | 5.0 |
| | 1,2-Butanediol | 3.0 | 4.0 | 3.0 |
| | 2,3-Butanediol | 3.0 | 1.0 | 4.0 |
| | 3-Methoxy-3-methylbutanol | 3.0 | 4.0 | 6.0 |
| | 2-Methyl-2,4-pentanediol | 5.0 | 4.0 | 3.0 |
| | Dipropylene glycol monomethyl ether | 6.0 | 4.0 | 5.0 |
| Antiseptic agent | PROXEL LV | 0.1 | 0.1 | 0.1 |
| Water | Highly purified water | Balance | Balance | Balance |
| | Total (% by mass) | 100 | 100 | 100 |
| | Mass ratio (B/A) (in terms of solid content) | 1.3 | 0.8 | 1.0 |

TABLE B-2-2

| | | Examples | | |
|---|---|---|---|---|
| | | B10 | B11 | B12 |
| Colorants | Self-dispersible black pigment dispersion liquid | 20.0 | 20.0 | — |
| | Self-dispersible cyan pigment dispersion liquid | — | — | 20.0 |
| | Self-dispersible magenta pigment dispersion liquid | — | — | — |
| | Self-dispersible yellow pigment dispersion liquid | — | — | — |
| | Resin dispersion-type black pigment dispersion liquid | — | — | — |
| Polysiloxane surfactant A | Polyoxyalkylene group-including silicone compound 1 (HLB value: 1.0) | — | — | — |
| | Polyether-modified silicone 1 (HLB value: 4.0) | — | — | — |
| | Polyether-modified silicone 2 (HLB value: 4.5) | — | — | — |
| | Polyether-modified silicone 3 (HLB value: 5.0) | 1.2 | — | — |
| | Polyoxyalkylene group-including silicone compound 2 (HLB value: 5.8) | — | — | 1.0 |
| | Polyether-modified silicone 4 (HLB value: 6.0) | — | 1.5 | — |
| | Polyether-modified silicone 5 (HLB value: 7.0) | — | — | — |
| | Polyether-modified silicone 6 (HLB value: 7.4) | — | — | — |
| | Polyether-modified silicone 7 (HLB value: 8.0) | — | — | — |
| | Polyether-modified silicone 8 (HLB value: 10.0) | — | — | — |
| Acryl-silicone resin particles B | Acryl-silicone resin emulsion 1 (Tg: 50° C.) | 5.8 | — | — |
| | Acryl-silicone resin emulsion 2 (Tg: 21° C.) | — | — | — |
| | Acryl-silicone resin emulsion 3 (Tg: 0° C.) | — | — | 6.0 |
| | Acryl-silicone resin emulsion 4 (Tg: −14° C.) | — | 1.8 | — |
| | Acryl-silicone resin emulsion 5 (Tg: −15° C.) | — | — | — |
| | Acryl-silicone resin emulsion 6 (Tg: 0° C.) | — | — | — |
| Fluororesin particles | Fluororesin emulsion 1 (Tg: 160° C.) | — | — | — |
| | Fluororesin emulsion 2 (Tg: 240° C.) | 25.0 | — | 25.0 |
| | Fluororesin emulsion 3 (Tg: 48° C.) | — | 25.0 | — |
| Organic solvents | 1,2-Propanediol | 4.0 | 10.0 | 13.0 |
| | 1,3-Propanediol | 5.0 | 2.0 | 5.0 |
| | 1,2-Butanediol | 5.0 | 5.0 | 5.0 |
| | 2,3-Butanediol | 4.0 | 6.0 | 5.0 |
| | 3-Methoxy-3-methylbutanol | 5.0 | 4.0 | 5.0 |

TABLE B-2-2-continued

|  |  | Examples | | |
|---|---|---|---|---|
|  |  | B10 | B11 | B12 |
|  | 2-Methyl-2,4-pentanediol | 5.0 | 3.0 | 1.0 |
|  | Dipropylene glycol monomethyl ether | 5.0 | 3.0 | 1.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 0.6 | 1.8 |

TABLE B-3

|  |  | Comparative Examples | |
|---|---|---|---|
|  |  | B1 | B2 |
| Colorants | Self-dispersible black pigment dispersion liquid | 20.0 | 20.0 |
|  | Self-dispersible cyan pigment dispersion liquid | — | — |
|  | Self-dispersible magenta pigment dispersion liquid | — | — |
|  | Self-dispersible yellow pigment dispersion liquid | — | — |
|  | Resin dispersion-type black pigment dispersion liquid | — | — |
| Polysiloxane surfactant A | Polyoxyalkylene group-including silicone compound 1 (HLB value: 1.0) | — | — |
|  | Polyether-modified silicone 1 (HLB value 4.0) | — | — |
|  | Polyether-modified silicone 2 (HLB value: 4.5) | — | — |
|  | Polyether-modified silicone 3 (HLB value: 5.0) | — | — |
|  | Polyoxyalkylene group-including silicone compound 2 (HLB value: 5.8) | — | — |
|  | Polyether-modified silicone 4 (HLB value: 6.0) | — | — |
|  | Polyether-modified silicone 5 (HLB value: 7.0) | — | 1.0 |
|  | Polyether-modified silicone 6 (HLB value: 7.4) | — | — |
|  | Polyether-modified silicone 7 (HLB value: 8.0) | — | — |
|  | Polyether-modified silicone 8 (HLB value: 10.0) | 1.0 | — |
| Acryl-silicone resin particles B | Acryl-silicone resin emulsion 1 (Tg: 50° C.) | — | — |
|  | Acryl-silicone resin emulsion 2 (Tg: 21° C.) | — | — |
|  | Acryl-silicone resin emulsion 3 (Tg: 0° C.) | — | — |
|  | Acryl-silicone resin emulsion 4 (Tg: −14° C.) | 2.0 | — |
|  | Acryl-silicone resin emulsion 5 (Tg: −15° C.) | — | — |
|  | Acryl-silicone resin emulsion 6 (Tg: 0° C.) | — | — |
| Fluororesin particles | Fluororesin emulsion 1 (Tg: 160° C.) | 23.3 | 23.3 |
|  | Fluororesin emulsion 2 (Tg: 240° C.) | — | — |
|  | Fluororesin emulsion 3 (Tg: 48° C.) | — | — |
| Organic solvents | 1,2-Propanediol | 12.0 | 15.0 |
|  | 1,3-Propanediol | 10.0 | 2.0 |
|  | 1,2-Butanediol | 5.0 | 5.0 |
|  | 2,3-Butanediol | 5.0 | — |
|  | 3-Methoxy-3-methylbutanol | — | 2.0 |
|  | 2-Methyl-2,4-pentanediol | 3.0 | 5.0 |
|  | Dipropylene glycol monomethyl ether | 2.0 | 5.0 |
| Antiseptic agent | PROXEL LV | 0.1 | 0.1 |
| Water | Highly purified water | Balance | Balance |
|  | Total (% by mass) | 100 | 100 |
|  | Mass ratio (B/A) (in terms of solid content) | 1.0 | — |

Here, product names and manufacturing companies of the components in Tables B-1-1, B-1-2, B-2-1, B-2-2, and B-3 are as follows.

Fluororesin emulsion 1: available from Du Pont-Mitsui Fluorochemicals Company, Ltd., product name: TEFLON (Registered Trademark) AF 160, solid concentration: 30% by mass, Tg: 160° C.

Fluororesin emulsion 2: available from Du Pont-Mitsui Fluorochemicals Company, Ltd., product name: TEFLON (Registered Trademark) AF 2400, solid concentration: 30% by mass, Tg: 240° C.

Fluororesin emulsion 3: available from ASAHI GLASS CO., LTD., product name: LUMIFLON FE 4400, solid concentration: 30% by mass, Tg: 48° C.

The colorants, the polysiloxane surfactants, the styrene-acryl resin particles, the organic solvents, and the antiseptic agent of Tables B-1-1, B-1-2, B-2-1, B-2-2, and B-3 were the same colorants, polysiloxane surfactants, styrene-acryl resin particles, organic solvents, and antiseptic agent of Tables A-1-1, A-1-2, A-2-1, A-2-2, and A-3.

Next, "storage stability", "fixability (beading)", "rubfastness", "solvent resistance", "image gloss level", "close adhesiveness", and "weather resistance" were evaluated in the following manners. The results are presented in Table B-4. The results are presented in Table B-4. Here, "storage stability", "fixability (beading)", "rubfastness", "solvent resistance", "image gloss level", and "close adhesiveness" were evaluated in the same manners as in Example A1.

[Formation of Solid Image]

Solid images were formed in the same manner as in Examples A1 to A12 and Comparative Examples A1 and A2 except that the inks A1 to A14 of Examples A1 to A12 and Comparative Examples A1 and A2 were each changed to the inks B1 to B14.

<Weather Resistance>

The weather resistance (xenon lamp method) was measured by performing the fading test based on the JIS K5600-7-7: 2008. A super accelerated weathering test instrument (apparatus name: super Xenon weather meter SX75, available from Suga Test Instruments Co., Ltd.) was used to irradiate a solid part of the prepared solid image with ultraviolet rays using a xenon lamp for 500 hours at an irradiation luminance of 180 W/m$^2$ to measure image density after the exposure. Then, a color difference ($\Delta E$) of the image density after the exposure relative to the image density before the exposure was calculated to evaluate "weather resistance" based on the following evaluation criteria. The obtained evaluation result achieving B or greater is desirable in terms of practical applications.

[Evaluation Criteria]

AA: $\Delta E$ is less than 35.
A: $\Delta E$ is 35 or more but less than 40.
B: $\Delta E$ is 40 or more but less than 50.
C: $\Delta E$ is 50 or more.

Example B7 is an example where the amount of the polysiloxane surfactant added is somewhat low. The ink of Example B7 was deteriorated in fixability and solvent resistance compared to the ink of Example B1.

Example B8 is an example where the amount of the polysiloxane surfactant added is somewhat high. The ink of Example B8 was deteriorated in storage stability compared to the ink of Example B1.

Example B9 and Example B10 are examples where the glass transition temperatures (Tg) of the acryl-silicone resin emulsions are higher than 0° C. The inks of Example B9 and Example B10 were deteriorated in close adhesiveness and weather resistance compared to the ink of Example B1.

Example B11 is an example where the amount of the acryl-silicone resin particles is somewhat insufficient compared to the amount of the polysiloxane surfactant. The ink of Example B11 was deteriorated in storage stability compared to the ink of Example B1.

Example B12 is an example where the amount of the acryl-silicone resin particles is somewhat higher compared to the amount of the polysiloxane surfactant. The ink of Example B12 was deteriorated in image gloss level and weather resistance compared to the ink of Example B1.

Meanwhile, Comparative Example B1 is an example where the ink includes no polysiloxane surfactant having an HLB value of 8 or less. Comparative Example B2 is an example where the ink includes no acryl-silicone resin particles. The ink of Comparative Example B1 was particularly deteriorated in fixability and solvent resistance compared to the ink of Example B1. The ink of Comparative

TABLE B-4

| | | Evaluation results | | | | | | |
|---|---|---|---|---|---|---|---|---|
| | | Fixability (beading) | Storage stability | Rubfastness | Solvent resistance | Image gloss level | Close adhesiveness | Weather resistance |
| Examples | B1 | A | A | AA | A | AA | A | AA |
| | B2 | A | A | AA | A | AA | A | AA |
| | B3 | B | A | AA | A | AA | A | AA |
| | B4 | B | A | AA | A | AA | A | AA |
| | B5 | A | B | AA | A | AA | A | AA |
| | B6 | A | B | A | A | A | A | A |
| | B7 | B | A | AA | B | A | A | AA |
| | B8 | A | B | A | A | A | A | AA |
| | B9 | A | A | A | A | AA | B | A |
| | B10 | A | A | AA | A | AA | B | A |
| | B11 | A | B | AA | A | AA | A | AA |
| | B12 | A | A | A | A | B | A | A |
| Comparative Examples | B1 | C | A | A | C | B | B | A |
| | B2 | A | D | A | B | A | C | A |

Example B1 and Example B2 are preferable Examples of the present disclosure. It is found that the inks of Example B1 and Example B2 are excellent in close adhesiveness to a PVC film print medium. In addition, it is found that use of the inks makes it possible to obtain images having high image gloss level and having rubfastness, solvent resistance, and weather resistance even when an image is printed on an impermeable print medium.

Example B3 and Example B4 are examples where the polysiloxane surfactants have somewhat high HLB values. The inks of Example B3 and Example B4 were deteriorated in fixability compared to the ink of Example B1.

Example B5 and Example B6 are examples where the polysiloxane surfactants have somewhat low HLB values. The inks of Example B5 and Example B6 were deteriorated in storage stability compared to the ink of Example B1.

Example B2 was particularly deteriorated in storage stability and close adhesiveness compared to the ink of Example B1.

From the results of the Table B-4, it is found that the ink of the present disclosure is suitably used for outdoor applications. In addition, the inks of Examples B1 to B12 were excellent in fixability, storage stability, rubfastness, solvent resistance, image gloss level, close adhesiveness, and weather resistance.

Example C1

A self-dispersible black pigment dispersion (20.0% by mass), polyether-modified silicone 2 (polysiloxane surfactant, product name: KF-6017, available from Shin-Etsu Chemical Co., Ltd., HLB value: 4.5) (1.0% by mass), acryl-silicone resin emulsion 4 (product name: AE 980, available from Emulsion Technology Co., Ltd., solid concentration: 50% by mass, glass transition temperature (Tg): −14° C.) (2.0% by mass), vinyl chloride-ethylene copolymer resin emulsion (available from Sumika Chemtex Company, Limited, product name: SUMIELITE 1210, solid concentration: 50% by mass) (14.0% by mass), 1,2-propanediol (12.0% by mass), 1,3-propanediol (10.0% by mass), 1,2-butanediol (3.0% by mass), 2,3-butanediol (3.0% by mass), 3-methoxy-3-methylbutanol (3.0% by mass), 2-methyl-2,4-pentanediol (3.0% by mass), dipropylene glycol monomethyl ether (4.0% by mass), product name: PROXEL LV (available from Avecia) (0.1% by mass) serving as an antiseptic agent, and highly purified water serving as a balance were added, and were mixed and stirred. The resultant mixture was filtered through a polypropylene filter (product name: BETAFINE, polypropylene pleat filter PPG series, available from 3M) having an average pore diameter of 0.2 μm to prepare ink C1.

Examples C2 to C12 and Comparative Examples C1 and C2

Inks C2 to C14 of Examples C2 to C12 and Comparative Examples C1 and C2 were prepared in the same manner as in Example C1 except that the formulation and the amounts in Example C1 were changed to formulations and amounts described in the following Tables C-1-1, C-1-2, C-2-1, C-2-2, and C-3.

TABLE C-1-1

|  |  | Examples | | |
|---|---|---|---|---|
|  |  | C1 | C2 | C3 |
| Colorants | Self-dispersible block pigment dispersion liquid | 20.0 | 20.0 | — |
|  | Self-dispersible cyan pigment dispersion liquid | — | — | — |
|  | Self-dispersible magenta pigment dispersion liquid | — | — | 20.0 |
|  | Self-dispersible yellow pigment dispersion liquid | — | — | — |
|  | Resin dispersion-type black pigment dispersion liquid | — | — | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | 1.0 | — | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | 2.0 | — |
|  | Polyether-modified silicone 6 (HLB value: 7.4) | — | — | 1.2 |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | — | — | — |
|  | Acryl-silicone resin emulsion 4 (Tg: −14° C.) | 2.0 | 4.8 | — |
|  | Acryl-silicone resin emulsion 5 (Tg: −15° C.) | — | — | 2.8 |
|  | Acryl-silicone resin emulsion 6 (Tg: 0° C.) | — | — | — |
| Vinyl chloride resin particles | Vinyl chloride-ethylene copolymer resin emulsion | 14.0 | 11.0 | — |
|  | Vinyl chloride-acryl copolymer resin emulsion | — | — | 13.3 |
|  | Vinyl chloride resin emulsion | — | — | — |
| Organic solvents | 1,2-Propanediol | 12.0 | 18.0 | 14.0 |
|  | 1,3-Propanediol | 10.0 | 4.0 | 2.0 |
|  | 1,2-Butanediol | 3.0 | 2.0 | 3.0 |
|  | 2,3-Butanediol | 3.0 | 5.0 | 3.0 |
|  | 3-Methoxy-3-methylbutanol | 3.0 | 6.0 | 8.0 |
|  | 2-Methyl-2,4-pentanediol | 3.0 | — | 2.0 |
|  | Dipropylene glycol monomethyl ether | 4.0 | 2.0 | — |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.0 | 1.2 | 1.2 |

TABLE C-1-2

|  |  | Examples | | |
|---|---|---|---|---|
|  |  | C4 | C5 | C6 |
| Colorants | Self-dispersible black pigment dispersion liquid | — | — | — |
|  | Self-dispersible cyan pigment dispersion liquid | — | 20.0 | — |
|  | Self-dispersible magenta pigment dispersion liquid | — | — | — |
|  | Self-dispersible yellow pigment dispersion liquid | 20.0 | — | — |
|  | Resin dispersion-type black pigment dispersion liquid | — | — | 20.0 |

TABLE C-1-2-continued

|  |  | Examples | | |
|---|---|---|---|---|
|  |  | C4 | C5 | C6 |
| Polysiloxane surfactant A | Polyoxyalkylane group-including silicone compound 1 (HLB value: 1.0) | — | — | 1.6 |
|  | Polyether-modified silicone 1 (HLB value: 4.0) | — | 1.6 | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | 1.2 | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | 4.7 | — | — |
|  | Acryl-silicone resin emulsion 4 (Tg: −14° C.) | — | — | — |
|  | Acryl-silicone resin emulsion 5 (Tg: −15° C.) | — | 4.8 | 4.8 |
|  | Acryl-silicone resin emulsion 6 (Tg: 0° C.) | — | — | — |
| Vinyl chloride resin particles | Vinyl chloride-ethylene copolymer resin emulsion | — | — | 15.2 |
|  | Vinyl chloride-acryl copolymer resin emulsion | — | — | — |
|  | Vinyl chloride resin emulsion | 8.0 | 11.0 | — |
| Organic solvents | 1,2-Propanediol | 15.0 | 16.0 | 20.0 |
|  | 1,3-Propanediol | 2.0 | 2.0 | 5.0 |
|  | 1,2-Butanediol | 2.0 | 2.0 | 2.0 |
|  | 2,3-Butanediol | 3.0 | 5.0 | 4.0 |
|  | 3-Methoxy-3-methylbutanol | 5.0 | 4.0 | 3.0 |
|  | 2-Methyl-2,4-pentanediol | 2.0 | 5.0 | — |
|  | Dipropylene glycol monomethyl ether | 2.0 | 3.0 | 2.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 1.5 | 1.5 |

TABLE C-2-1

|  |  | Examples | | |
|---|---|---|---|---|
|  |  | C7 | C8 | C9 |
| Colorants | Self-dispersible block pigment dispersion liquid | 20.0 | — | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | 20.0 | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | 0.8 | — | — |
|  | Polyether-modified silicone 4 (HLB value: 6.0) | — | 2.4 | — |
|  | Polyether-modified silicone 5 (HLB value: 7.0) | — | — | 1.4 |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | 2.8 |
|  | Acryl-silicone resin emulsion 3 (Tg: 0° C.) | — | 6.3 | — |
|  | Acryl-silicone resin emulsion 4 (Tg: −14° C.) | — | — | — |
|  | Acryl-silicone resin emulsion 5 (Tg: −15° C.) | — | — | — |
|  | Acryl-silicone resin emulsion 6 (Tg: 0° C.) | 2.0 | — | — |
| Vinyl chloride resin particles | Vinyl chloride-ethylene copolymer resin emulsion | 8.0 | — | 14.0 |
|  | Vinyl chloride-acryl copolymer resin emulsion | — | 13.3 | — |
|  | Vinyl chloride resin emulsion | — | — | — |
| Organic solvents | 1,2-Propanediol | 13.0 | 12.0 | 8.0 |
|  | 1,3-Propanediol | — | 4.0 | 5.0 |
|  | 1,2-Butanediol | 3.0 | 4.0 | 3.0 |
|  | 2,3-Butanediol | 3.0 | 1.0 | 4.0 |

TABLE C-2-1-continued

|  |  | Examples | | |
|---|---|---|---|---|
|  |  | C7 | C8 | C9 |
|  | 3-Methoxy-3-methylbutanol | 3.0 | 4.0 | 6.0 |
|  | 2-Methyl-2,4-pentanediol | 5.0 | 4.0 | 3.0 |
|  | Dipropylene glycol monomethyl ether | 6.0 | 4.0 | 5.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.3 | 0.8 | 1.0 |

TABLE C-2-2

|  |  | Examples | | |
|---|---|---|---|---|
|  |  | C10 | C11 | C12 |
| Colorants | Self-dispersible block pigment dispersion liquid | 20.0 | 20.0 | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | — | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | 1.2 | — | — |
|  | Polyoxyalkylene group-including silicone compound 2 (HLB value: 5.8) | — | — | 1.0 |
|  | Polyether-modified silicone 4 (HLB value: 6.0) | — | 1.5 | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | 5.8 | — | — |
|  | Acryl-silicone resin emulsion 2 (Tg: 21° C.) | — | — | — |
|  | Acryl-silicone resin emulsion 3 (Tg: 0° C.) | — | — | 6.0 |
|  | Acryl-silicone resin emulsion 4 (Tg: −14° C.) | — | 1.8 | — |
|  | Acryl-silicone resin emulsion 5 (Tg: −15° C.) | — | — | — |
|  | Acryl-silicone resin emulsion 6 (Tg: 0° C.) | — | — | — |
| Vinyl chloride resin particles | Vinyl chloride-ethylene copolymer resin emulsion | — | — | 25.0 |
|  | Vinyl chloride-acryl copolymer resin emulsion | 25.0 | — | — |
|  | Vinyl chloride resin emulsion | — | 15.0 | — |
| Organic solvents | 1,2-Propanediol | 4.0 | 10.0 | 13.0 |
|  | 1,3-Propanediol | 5.0 | 2.0 | 5.0 |
|  | 1,2-Butanediol | 5.0 | 5.0 | 5.0 |
|  | 2,3-Butanediol | 4.0 | 6.0 | 5.0 |
|  | 3-Methoxy-3-methylbutanol | 5.0 | 4.0 | 5.0 |
|  | 2-Methyl-2,4-pentanediol | 5.0 | 3.0 | 1.0 |
|  | Dipropylene glycol monomethyl ether | 5.0 | 3.0 | 1.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 0.6 | 1.8 |

TABLE C-3

|  |  | Comparative Examples | |
|---|---|---|---|
|  |  | C1 | C2 |
| Colorants | Self-dispersible black pigment dispersion liquid | 20.0 | 20.0 |
|  | Self-dispersible cyan pigment dispersion liquid | — | — |
|  | Self-dispersible magenta pigment dispersion liquid | — | — |
|  | Self-dispersible yellow pigment dispersion liquid | — | — |
|  | Resin dispersion-type black pigment dispersion liquid | — | — |

TABLE C-3-continued

|  |  | Comparative Examples | |
|---|---|---|---|
|  |  | C1 | C2 |
| Polysiloxane surfactant A | Polyoxyalkylene group-including silicone compound 1 (HLB value: 1.0) | — | — |
|  | Polyether-modified silicone 1 (HLB value: 4.0) | — | — |
|  | Polyether-modified silicone 2 (HLB value: 4.5) | — | — |
|  | Polyether-modified silicone 3 (HLB value: 5.0) | — | — |
|  | Polyoxyalkylene group-including silicone compound 2 (HLB value: 5.8) | — | — |
|  | Polyether-modified silicone 4 (HLB value: 6.0) | — | — |
|  | Polyether-modified silicone 5 (HLB value: 7.0) | — | 1.0 |
|  | Polyether-modified silicone 6 (HLB value: 7.4) | — | — |
|  | Polyether-modified silicone 7 (HLB value 8.0) | — | — |
|  | Polyether-modified silicone 8 (HLB value: 10.0) | 1.0 | — |
| Acryl-silicone resin particles B | Acryl-silicone resin emulsion 1 (Tg: 50° C.) | — | — |
|  | Acryl-silicone resin emulsion 2 (Tg: 21° C.) | — | — |
|  | Acryl-silicone resin emulsion 3 (Tg: 0° C.) | — | — |
|  | Acryl-silicone resin emulsion 4 (Tg: −14° C.) | 2.0 | — |
|  | Acryl-silicone resin emulsion 5 (Tg: −15° C.) | — | — |
|  | Acryl-silicone resin emulsion 6 (Tg: 0° C.) | — | — |
| Vinyl chloride resin particles | Vinyl chloride-ethylene copolymer resin emulsion | 14.0 | 14.0 |
|  | Vinyl chloride-acryl copolymer resin emulsion | — | — |
|  | Vinyl chloride resin emulsion | — | — |
| Organic solvents | 1,2-Propanediol | 12.0 | 15.0 |
|  | 1,3-Propanediol | 10.0 | 2.0 |
|  | 1,2-Butanediol | 5.0 | 5.0 |
|  | 2,3-Butanediol | 5.0 | — |
|  | 3-Methoxy-3-methylbutanol | — | 2.0 |
|  | 2-Methyl-2,4-pentanediol | 3.0 | 5.0 |
|  | Dipropylene glycol monomethyl ether | 2.0 | 5.0 |
| Antiseptic agent | PROXEL LV | 0.1 | 0.1 |
| Water | Highly purified water | Balance | Balance |
|  | Total (% by mass) | 100 | 100 |
|  | Mass ratio (B/A) (in terms of solid content) | 1.0 | — |

Here, product names and manufacturing companies of the components in Tables C-1-1, C-1-2, C-2-1, C-2-2, and C-3 are as follows.

Vinyl chloride-ethylene copolymer resin emulsion: available from Sumika Chemtex Company, Limited, product name: SUMIELITE 1210, solid concentration: 50% by mass Vinyl chloride-acryl copolymer resin emulsion: available from Nissin Chemical Industry Co., Ltd., product name: VINYBLAN 711, solid concentration: 30% by mass Vinyl chloride resin emulsion: available from Wacker Chemie AG, product name: VINNOL E15/48A, solid concentration: 50% by mass The colorants, the polysiloxane surfactants, the styrene-acryl resin particles, the organic solvents, and the antiseptic agent of Tables C-1-1, C-1-2, C-2-1, C-2-2, and C-3 were the same colorants, polysiloxane surfactants, styrene-acryl resin particles, organic solvents, and antiseptic agent of Tables A-1-1, A-1-2, A-2-1, A-2-2, and A-3.

Next, "storage stability", "stability of viscosity over time", "fixability (beading)", "rubfastness", "image gloss level", and "close adhesiveness" were evaluated in the following manners. The results are presented in Table C-4. Here, "storage stability", "fixability (beading)", "rubfastness", "image gloss level", and "close adhesiveness" were evaluated in the same manners as in Example A1.

<Stability of Viscosity Over Time>

Each of the inks of Examples C2 to C12 and Comparative Examples C1 and C2 was charged into a 50 mL-glass vial (available from NICHIDEN-RIKA GLASS CO., LTD.) and was stored in a thermostatic bath set to 70° C. for 14 days to measure the ink for viscosity. The percentage of change in viscosity of the viscosity of the ink after the storage relative to the viscosity of the ink before storage was calculated to evaluate the ink for "stability of viscosity over time" based on the following evaluation criteria. The obtained evaluation result achieving B or greater is desirable in terms of practical applications.

[Evaluation Criteria]
A: Percentage of change in viscosity was less than 5%
B: Percentage of change in viscosity was 5% or more but less than 10%
C: Percentage of change in viscosity was 10% or more

TABLE C-4

|  |  | Evaluation results | | | | | |
|---|---|---|---|---|---|---|---|
|  |  | Fixability (beading) | Storage stability | Rubfastness | Stability of viscosity over time | Image gloss level | Close adhesiveness |
| Examples | C1 | A | A | AA | A | AA | A |
|  | C2 | A | A | AA | A | AA | A |

TABLE C-4-continued

| | | Evaluation results | | | | | |
|---|---|---|---|---|---|---|---|
| | | Fixability (beading) | Storage stability | Rubfastness | Stability of viscosity over time | Image gloss level | Close adhesiveness |
| | C3 | B | A | AA | A | AA | A |
| | C4 | B | A | AA | A | AA | A |
| | C5 | A | B | AA | A | AA | A |
| | C6 | A | B | A | A | A | A |
| | C7 | B | A | AA | A | A | A |
| | C8 | A | B | A | B | A | A |
| | C9 | A | A | A | A | AA | B |
| | C10 | A | A | AA | A | AA | B |
| | C11 | A | B | AA | B | AA | A |
| | C12 | A | A | A | A | B | A |
| Comparative | C1 | C | A | A | C | B | B |
| Examples | C2 | A | D | A | B | A | C |

Example C1 and Example C2 are preferable Examples of the present disclosure. It is found that the inks of Example C1 and Example C2 are excellent in close adhesiveness to a PVC film print medium. In addition, it is found that use of the inks makes it possible to obtain images having high image gloss level and having rubfastness, solvent resistance, and stability of viscosity over time even when an image is printed on an impermeable print medium.

Example C3 and Example C4 are examples where the polysiloxane surfactants have somewhat high HLB values. The inks of Example C3 and Example C4 were deteriorated in fixability compared to the ink of Example C1.

Example C5 and Example C6 are examples where the polysiloxane surfactants have somewhat low HLB values. The inks of Example C5 and Example C6 were deteriorated in storage stability compared to the ink of Example C1.

Example C7 is an example where the amount of the polysiloxane surfactant added is somewhat low. The ink of Example C7 was deteriorated in fixability and solvent resistance compared to the ink of Example C1.

Example C8 is an example where the amount of the polysiloxane surfactant added is somewhat high. The ink of Example C8 was deteriorated in storage stability and stability of viscosity over time compared to the ink of Example C1.

Example C9 and Example C10 are examples where the glass transition temperatures (Tg) of the acryl-silicone resin emulsions are higher than 0° C. The inks of Example C9 and Example C10 were deteriorated in close adhesiveness compared to the ink of Example C1.

Example C11 is an example where the amount of the acryl-silicone resin particles is somewhat insufficient compared to the amount of the polysiloxane surfactant. The ink of Example C11 was deteriorated in storage stability and stability of viscosity over time compared to the ink of Example C1.

Example C12 is an example where the amount of the acryl-silicone resin particles is somewhat higher compared to the amount of the polysiloxane surfactant. The ink of Example C12 was deteriorated in image gloss level compared to the ink of Example C1.

Meanwhile, Comparative Example C1 is an example where the ink includes no polysiloxane surfactant having an HLB value of 8 or less. Comparative Example C2 is an example where the ink includes no acryl-silicone resin particles. The ink of Comparative Examples C1 was particularly deteriorated in fixability and stability of viscosity over time compared to the ink of Example C1. The ink of Comparative Example C2 was particularly deteriorated in storage stability and close adhesiveness compared to the ink of Example C1.

From the results of the Table C-4, it is found that the ink of the present disclosure is suitably used for outdoor applications. In addition, the inks of Examples C1 to C12 were excellent in fixability, storage stability, rubfastness, stability of viscosity over time, image gloss level, and close adhesiveness.

Example D1

A self-dispersible black pigment dispersion (20.0% by mass), polyether-modified silicone 2 (polysiloxane surfactant, product name: KF-6017, available from Shin-Etsu Chemical Co., Ltd., HLB value: 4.5) (1.0% by mass), acryl-silicone resin emulsion 4 (product name: AE 980, available from Emulsion Technology Co., Ltd., solid concentration: 50% by mass, glass transition temperature (Tg): −14° C.) (2.0% by mass), polyester resin emulsion 1 (available from Unitika Limited., product name: KZA-1449, solid concentration: 30% by mass) (23.3% by mass), 1,2-propanediol (12.0% by mass), 1,3-propanediol (10.0% by mass), 1,2-butanediol (3.0% by mass), 2,3-butanediol (3.0% by mass), 3-methoxy-3-methylbutanol (3.0% by mass), 2-methyl-2,4-pentanediol (3.0% by mass), dipropylene glycol monomethyl ether (4.0% by mass), product name: PROXEL LV (available from Avecia) (0.1% by mass) serving as an antiseptic agent, and highly purified water as a balance were added, and were mixed and stirred. The resultant mixture was filtered through a polypropylene filter (product name: BETAFINE, polypropylene pleat filter PPG series, available from 3M) having an average pore diameter of 0.2 μm to prepare ink D1.

Examples D2 to D12 and Comparative Examples D1 and D2

Inks D2 to D14 of Examples D2 to D12 and Comparative Examples D1 and D2 were prepared in the same manner as in Example D1 except that the formulation and the amounts in Example D1 were changed to formulations and amounts described in the following Tables D-1-1, D-1-2, D-2-1, D-2-2, and D-3.

TABLE D-1-1

|  |  | Examples | | |
|---|---|---|---|---|
|  |  | D1 | D2 | D3 |
| Colorants | Self-dispersible black pigment dispersion liquid | 20.0 | 20.0 | — |
|  | Self-dispersible cyan pigment dispersion liquid | — | — | — |
|  | Self-dispersible magenta pigment dispersion liquid | — | — | 20.0 |
|  | Self-dispersible yellow pigment dispersion liquid | — | — | — |
|  | Resin dispersion-type black pigment dispersion liquid | — | — | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | 1.0 | — | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | 2.0 | — |
|  | Polyether-modified silicone 6 (HLB value: 7.4) | — | — | 1.2 |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | — | — | — |
|  | Acryl-silicone resin emulsion 4 (Tg: −14° C.) | 2.0 | 4.8 | — |
|  | Acryl-silicone resin emulsion 5 (Tg: −15° C.) | — | — | 2.8 |
|  | Acryl-silicone resin emulsion 6 (Tg: 0° C.) | — | — | — |
| Polyester resin particles | Polyester resin emulsion 1 | 23.3 | 18.3 | — |
|  | Polyester resin emulsion 2 | — | — | 13.3 |
|  | Polyester resin emulsion 3 | — | — | — |
| Organic solvents | 1,2-Propanediol | 12.0 | 18.0 | 14.0 |
|  | 1,3-Propanediol | 10.0 | 4.0 | 2.0 |
|  | 1,2-Butanediol | 3.0 | 2.0 | 3.0 |
|  | 2,3-Butanediol | 3.0 | 5.0 | 3.0 |
|  | 3-Methoxy-3-methylbutanol | 3.0 | 6.0 | 8.0 |
|  | 2-Methyl-2,4-pentanediol | 3.0 | — | 2.0 |
|  | Dipropylene glycol monomethyl ether | 4.0 | 2.0 | — |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.0 | 1.2 | 1.2 |

TABLE D-1-2

|  |  | Examples | | |
|---|---|---|---|---|
|  |  | D4 | D5 | D6 |
| Colorants | Self-dispersible black pigment dispersion liquid | — | — | — |
|  | Self-dispersible cyan pigment dispersion liquid | — | 20.0 | — |
|  | Self-dispersible magenta pigment dispersion liquid | — | — | — |
|  | Self-dispersible yellow pigment dispersion liquid | 20.0 | — | — |
|  | Resin dispersion-type black pigment dispersion liquid | — | — | 20.0 |
| Polysiloxane surfactant A | Polyoxyalkylene group-including silicone compound 1 (HLB value: 1.0) | — | — | 1.6 |
|  | Polyether-modified silicone 1 (HLB value: 4.0) | — | 1.6 | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | 1.2 | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | 4.7 | — | — |
|  | Acryl-silicone resin emulsion 4 (Tg: −14° C.) | — | — | — |
|  | Acryl-silicone resin emulsion 5 (Tg: −15° C.) | — | 4.8 | 4.8 |
|  | Acryl-silicone resin emulsion 6 (Tg: 0° C.) | — | — | — |
| Polyester resin particles | Polyester resin emulsion 1 | — | — | 25.3 |
|  | Polyester resin emulsion 2 | — | — | — |
|  | Polyester resin emulsion 3 | 16.0 | 22.0 | — |

TABLE D-1-2-continued

|  |  | Examples | | |
|---|---|---|---|---|
|  |  | D4 | D5 | D6 |
| Organic solvents | 1,2-Propanediol | 15.0 | 16.0 | 20.0 |
|  | 1,3-Propanediol | 2.0 | 2.0 | 5.0 |
|  | 1,2-Butanediol | 2.0 | 2.0 | 2.0 |
|  | 2,3-Butanediol | 3.0 | 5.0 | 4.0 |
|  | 3-Methoxy-3-methylbutanol | 5.0 | 4.0 | 3.0 |
|  | 2-Methyl-2,4-pentanediol | 2.0 | 5.0 | — |
|  | Dipropylene glycol monomethyl ether | 2.0 | 3.0 | 2.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 1.5 | 1.5 |

TABLE D-2-1

|  |  | Examples | | |
|---|---|---|---|---|
|  |  | D7 | D8 | D9 |
| Colorants | Self-dispersible black pigment dispersion liquid | 20.0 | — | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | 20.0 | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | 0.8 | — | — |
|  | Polyether-modified silicone 4 (HLB value: 6.0) | — | 2.4 | — |
|  | Polyether-modified silicone 5 (HLB value: 7.0) | — | — | 1.4 |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | 2.8 |
|  | Acryl-silicone resin emulsion 3 (Tg: 0° C.) | — | 6.3 | — |
|  | Acryl-silicone resin emulsion 4 (Tg: −14° C.) | — | — | — |
|  | Acryl-silicone resin emulsion 5 (Tg: −15° C.) | — | — | — |
|  | Acryl-silicone resin emulsion 6 (Tg: 0° C.) | 2.0 | — | — |
| Polyester resin particles | Polyester resin emulsion 1 | 13.3 | — | 23.3 |
|  | Polyester resin emulsion 2 | — | 13.3 | — |
|  | Polyester resin emulsion 3 | — | — | — |
| Organic solvents | 1,2-Propanediol | 13.0 | 12.0 | 8.0 |
|  | 1,3-Propanediol | — | 4.0 | 5.0 |
|  | 1,2-Butanediol | 3.0 | 4.0 | 3.0 |
|  | 2,3-Butanediol | 3.0 | 1.0 | 4.0 |
|  | 3-Methoxy-3-methylbutanol | 3.0 | 4.0 | 6.0 |
|  | 2-Methyl-2,4-pentanediol | 5.0 | 4.0 | 3.0 |
|  | Dipropylene glycol monomethyl ether | 6.0 | 4.0 | 5.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.3 | 0.8 | 1.0 |

TABLE D-2-2

|  |  | Examples | | |
|---|---|---|---|---|
|  |  | D10 | D11 | D12 |
| Colorants | Self-dispersible black pigment dispersion liquid | 20.0 | 20.0 | — |
|  | Self-dispersible cyan pigment dispersion liquid | — | — | 20.0 |
|  | Self-dispersible magenta pigment dispersion liquid | — | — | — |

TABLE D-2-2-continued

|  |  | Examples | | |
|---|---|---|---|---|
|  |  | D10 | D11 | D12 |
|  | Self-dispersible yellow pigment dispersion liquid | — | — | — |
|  | Resin dispersion-type black pigment dispersion liquid | — | — | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | 1.2 | — | — |
|  | Polyoxyalkylene group-including silicone compound 2 (HLB value: 5.8) | — | — | 1.0 |
|  | Polyether-modified silicone 4 (HLB value: 6.0) | — | 1.5 | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | 5.8 | — | — |
|  | Acryl-silicone resin emulsion 2 (Tg: 21° C.) | — | — | — |
|  | Acryl-silicone resin emulsion 3 (Tg: 0° C.) | — | — | 6.0 |
|  | Acryl-silicone resin emulsion 4 (Tg: −14° C.) | — | 1.8 | — |
|  | Acryl-silicone resin emulsion 5 (Tg: −15° C.) | — | — | — |
|  | Acryl-silicone resin emulsion 6 (Tg: 0° C.) | — | — | — |
| Polyester resin particles | Polyester resin emulsion 1 | — | — | — |
|  | Polyester resin emulsion 2 | 25.0 | — | 25.0 |
|  | Polyester resin emulsion 3 | — | 30.0 | — |
| Organic solvents | 1,2-Propanediol | 4.0 | 10.0 | 13.0 |
|  | 1,3-Propanediol | 5.0 | 2.0 | 5.0 |
|  | 1,2-Butanediol | 5.0 | 5.0 | 5.0 |
|  | 2,3-Butanediol | 4.0 | 6.0 | 5.0 |
|  | 3-Methoxy-3-methylbutanol | 5.0 | 4.0 | 5.0 |
|  | 2-Methyl-2,4-pentanediol | 5.0 | 3.0 | 1.0 |
|  | Dipropylene glycol monomethyl ether | 5.0 | 3.0 | 1.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 0.6 | 1.8 |

TABLE D-3

|  |  | Comparative Examples | |
|---|---|---|---|
|  |  | D1 | D2 |
| Colorants | Self-dispersible black pigment dispersion liquid | 20.0 | 20.0 |
|  | Self-dispersible cyan pigment dispersion liquid | — | — |
|  | Self-dispersible magenta pigment dispersion liquid | — | — |
|  | Self-dispersible yellow pigment dispersion liquid | — | — |
|  | Resin dispersion-type black pigment dispersion liquid | — | — |
| Polysiloxane surfactant A | Polyoxyalkylene group-including silicone compound 1 (HLB value: 1.0) | — | — |
|  | Polyether-modified silicone 1 (HLB value: 4.0) | — | — |
|  | Polyether-modified silicone 2 (HLB value: 4.5) | — | — |
|  | Polyether-modified silicone 3 (HLB value: 5.0) | — | — |
|  | Polyoxyalkylene group-including silicone compound 2 (HLB value: 5.8) | — | — |
|  | Polyether-modified silicone 4 (HLB value: 6.0) | — | — |
|  | Polyether-modified silicone 5 (HLB value: 7.0) | — | 1.0 |
|  | Polyether-modified silicone 6 (HLB value: 7.4) | — | — |
|  | Polyether-modified silicone 7 (HLB value: 8.0) | — | — |
|  | Polyether-modified silicone 8 (HLB value: 10.0) | 1.0 | — |
| Acryl-silicone resin particles B | Acryl-silicone resin emulsion 1 (Tg: 50° C.) | — | — |
|  | Acryl-silicone resin emulsion 2 (Tg: 21° C.) | — | — |
|  | Acryl-silicone resin emulsion 3 (Tg: 0° C.) | — | — |
|  | Acryl-silicone resin emulsion 4 (Tg: −14° C.) | 2.0 | — |
|  | Acryl-silicone resin emulsion 5 (Tg: −15° C.) | — | — |
|  | Acryl-silicone resin emulsion 6 (Tg: 0° C.) | — | — |
| Polyester resin particles | Polyester resin emulsion 1 | 23.3 | 23.3 |
|  | Polyester resin emulsion 2 | — | — |
|  | Polyester resin emulsion 3 | — | — |

TABLE D-3-continued

|  |  | Comparative Examples | |
|---|---|---|---|
|  |  | D1 | D2 |
| Organic solvents | 1,2-Propanediol | 12.0 | 15.0 |
|  | 1,3-Propanediol | 10.0 | 2.0 |
|  | 1,2-Butanediol | 5.0 | 5.0 |
|  | 2,3-Butanediol | 5.0 | — |
|  | 3-Methoxy-3-methylbutanol | — | 2.0 |
|  | 2-Methyl-2,4-pentanediol | 3.0 | 5.0 |
|  | Dipropylene glycol monomethyl ether | 2.0 | 5.0 |
| Antiseptic agent | PROXEL LV | 0.1 | 0.1 |
| Water | Highly purified water | Balance | Balance |
|  | Total (% by mass) | 100 | 100 |
|  | Mass ratio (B/A) (in terms of solid content) | 1.0 | — |

Here, product names and manufacturing companies of the components in Tables D-1-1, D-1-2, D-2-1, D-2-2, and D-3 are as follows.

Polyester resin emulsion 1: available from Unitika Limited., product name: KZA-1449, solid concentration: 30% by mass Polyester resin emulsion 2: available from TAKAMATSU OIL&FAT CO., LTD., product name: A-125S, solid concentration: 30% by mass Polyester resin emulsion 3: available from TAKAMATSU OIL&FAT CO., LTD., product name: A-160P, solid concentration: 25% by mass The colorants, the polysiloxane surfactants, the styrene-acryl resin particles, the organic solvents, and the antiseptic agent of Tables D-1-1, D-1-2, D-2-1, D-2-2, and D-3 were the same colorants, polysiloxane surfactants, styrene-acryl resin particles, organic solvents, and antiseptic agent of Tables A-1-1, A-1-2, A-2-1, A-2-2, and A-3.

Next, the ink was evaluated for "storage stability", "fixability (beading)", "rubfastness", "weather resistance", "image gloss level", and "close adhesiveness" in the same manner as in Example B1. The results are presented in Table D-4.

image gloss level and having rubfastness and weather resistance even when an image is printed on an impermeable print medium.

Example D3 and Example D4 are examples where the polysiloxane surfactants have somewhat high HLB values. The inks of Example D3 and Example D4 were deteriorated in fixability compared to the ink of Example D1.

Example D5 and Example D6 are examples where the polysiloxane surfactants have somewhat low HLB values. The inks of Example D5 and Example D6 were deteriorated in storage stability compared to the ink of Example D1.

Example D7 is an example where the amount of the polysiloxane surfactant added is somewhat low. The ink of Example D7 was deteriorated in fixability and solvent resistance compared to the ink of Example D1.

Example D8 is an example where the amount of the polysiloxane surfactant added is somewhat high. The ink of Example D8 was deteriorated in storage stability and weather resistance compared to the ink of Example D1.

Example D9 and Example D10 are examples where the glass transition temperatures (Tg) of the acryl-silicone resin emulsions are higher than 0° C. The inks of Example D9 and

TABLE D-4

|  |  | Evaluation results | | | | | |
|---|---|---|---|---|---|---|---|
|  |  | Fixability (beading) | Storage stability | Rubfastness | Weather resistance | Image gloss level | Close adhesiveness |
| Examples | D1 | A | A | AA | AA | AA | A |
|  | D2 | A | A | AA | AA | AA | A |
|  | D3 | B | A | AA | AA | AA | A |
|  | D4 | B | A | AA | A | AA | A |
|  | D5 | A | B | AA | AA | AA | A |
|  | D6 | A | B | A | AA | A | A |
|  | D7 | B | A | AA | A | A | A |
|  | D8 | A | B | A | B | A | A |
|  | D9 | A | A | A | AA | AA | B |
|  | D10 | A | A | AA | AA | AA | B |
|  | D11 | A | B | AA | B | AA | A |
|  | D12 | A | A | A | A | B | A |
| Comparative Examples | D1 | C | A | A | B | B | B |
|  | D2 | A | D | A | B | A | C |

Example D1 and Example D2 are preferable Examples of the present disclosure. It is found that the inks of Example D1 and Example D2 are excellent in close adhesiveness to a PVC film print medium. In addition, it is found that use of the inks makes it possible to obtain images having high Example D10 were deteriorated in close adhesiveness compared to the ink of Example D1.

Example D11 is an example where the amount of the acryl-silicone resin particles is somewhat insufficient compared to the amount of the polysiloxane surfactant. The ink of Example D11 was deteriorated in storage stability and weather resistance compared to the ink of Example D1.

Example D12 is an example where the amount of the acryl-silicone resin particles is somewhat higher compared to the amount of the polysiloxane surfactant. The ink of Example D12 was deteriorated in image gloss level compared to the ink of Example D1.

Meanwhile, Comparative Example D1 is an example where the ink includes no polysiloxane surfactant having an HLB value of 8 or less. Comparative Example D2 is an example where the ink includes no acryl-silicone resin particles. The ink of Comparative Examples D1 was particularly deteriorated in fixability and weather resistance compared to the ink of Example D1. The ink of Comparative Example D2 was particularly deteriorated in storage stability and close adhesiveness compared to the ink of Example D1.

From the results of the Table D-4, it is found that the ink of the present disclosure is suitably used for outdoor applications. In addition, the inks of Examples D1 to D12 were excellent in fixability, storage stability, rubfastness, image gloss level, close adhesiveness, and weather resistance.

Example E1

A self-dispersible black pigment dispersion (20.0% by mass), polyether-modified silicone 2 (polysiloxane surfactant, product name: KF-6017, available from Shin-Etsu Chemical Co., Ltd., HLB value: 4.5) (1.0% by mass), acryl-silicone resin emulsion 4 (product name: AE 980, available from Emulsion Technology Co., Ltd., solid concentration: 50% by mass, glass transition temperature (Tg): −14° C.) (2.0% by mass), acryl-styrene resin emulsion 1 (available from Japan Coating Resin Corporation, product name: RIKABOND ET-700, solid concentration: 33.0% by mass) (21.2% by mass), 1,2-propanediol (12.0% by mass), 1,3-propanediol (10.0% by mass), 1,2-butanediol (3.0% by mass), 2,3-butanediol (3.0% by mass), 3-methoxy-3-methylbutanol (3.0% by mass), 2-methyl-2,4-pentanediol (3.0% by mass), dipropylene glycol monomethyl ether (4.0% by mass), product name: PROXEL LV (available from Avecia) (0.1% by mass) serving as an antiseptic agent, and highly purified water serving as a balance were added, and were mixed and stirred. The resultant mixture was filtered through a polypropylene filter (product name: BETAFINE, polypropylene pleat filter PPG series, available from 3M) having an average pore diameter of 0.2 μm to prepare ink E1.

Examples E2 to E12 and Comparative Examples E1 and E2

Inks E2 to E14 of Examples E2 to E12 and Comparative Examples E1 and E2 were prepared in the same manner as in Example E1 except that the formulation and the amounts in Example E1 were changed to formulations and amounts described in the following Tables E-1-1, E-1-2, E-2-1, E-2-2, and E-3.

TABLE E-1-1

|  |  | Examples | | |
|---|---|---|---|---|
|  |  | E1 | E2 | E3 |
| Colorants | Self-dispersible black pigment dispersion liquid | 20.0 | 20.0 | — |
|  | Self-dispersible cyan pigment dispersion liquid | — | — | — |
|  | Self-dispersible magenta pigment dispersion liquid | — | — | 20.0 |
|  | Self-dispersible yellow pigment dispersion liquid | — | — | — |
|  | Resin dispersion-type black pigment dispersion liquid | — | — | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | 1.0 | — | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | 2.0 | — |
|  | Polyether-modified silicone 6 (HLB value: 7.4) | — | — | 1.2 |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | — | — | — |
|  | Acryl-silicone resin emulsion 4 (Tg: −14° C.) | 2.0 | 4.8 | — |
|  | Acryl-silicone resin emulsion 5 (Tg: −15° C.) | — | — | 2.8 |
|  | Acryl-silicone resin emulsion 6 (Tg: 0° C.) | — | — | — |
| Acryl-styrene resin particles | Acryl-styrene resin emulsion 1 | 21.2 | 16.7 | — |
|  | Acryl-styrene resin emulsion 2 | — | — | 9.8 |
|  | Acryl-styrene resin emulsion 3 | — | — | — |
| Organic solvents | 1,2-Propanediol | 12.0 | 18.0 | 14.0 |
|  | 1,3-Propanediol | 10.0 | 4.0 | 2.0 |
|  | 1,2-Butanediol | 3.0 | 2.0 | 3.0 |
|  | 2,3-Butanediol | 3.0 | 5.0 | 3.0 |
|  | 3-Methoxy-3-methylbutanol | 3.0 | 6.0 | 8.0 |
|  | 2-Methyl-2,4-pentanediol | 3.0 | — | 2.0 |
|  | Dipropylene glycol monomethyl ether | 4.0 | 2.0 | — |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.0 | 1.2 | 1.2 |

TABLE E-1-2

|  |  | Examples | | |
|---|---|---|---|---|
|  |  | E4 | E5 | E6 |
| Colorants | Self-dispersible black pigment dispersion liquid | — | — | — |
|  | Self-dispersible cyan pigment dispersion liquid | — | 20.0 | — |
|  | Self-dispersible magenta pigment dispersion liquid | — | — | — |
|  | Self-dispersible yellow pigment dispersion liquid | 20.0 | — | — |
|  | Resin dispersion-type black pigment dispersion liquid | — | — | 20.0 |
| Polysiloxane surfactant A | Polyoxyalkylene group-including silicone compound 1 (HLB value: 1.0) | — | — | 1.6 |
|  | Polyether-modified silicone 1 (HLB value: 4.0) | — | 1.6 | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | 1.2 | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | 4.7 | — | — |
|  | Acryl-silicone resin emulsion 4 (Tg: −14° C.) | — | — | — |
|  | Acryl-silicone resin emulsion 5 (Tg: −15° C.) | — | 4.8 | 4.8 |
|  | Acryl-silicone resin emulsion 6 (Tg: 0° C.) | — | — | — |
| Acryl-styrene resin particles | Acryl-styrene resin emulsion 1 | — | — | 23.0 |
|  | Acryl-styrene resin emulsion 2 | — | — | — |
|  | Acryl-styrene resin emulsion 3 | 9.9 | 13.6 | — |
| Organic solvents | 1,2-Propanediol | 15.0 | 16.0 | 20.0 |
|  | 1,3-Propanediol | 2.0 | 2.0 | 5.0 |
|  | 1,2-Butanediol | 2.0 | 2.0 | 2.0 |
|  | 2,3-Butanediol | 3.0 | 5.0 | 4.0 |
|  | 3-Methoxy-3-methylbutanol | 5.0 | 4.0 | 3.0 |
|  | 2-Methyl-2,4-pentanediol | 2.0 | 5.0 | — |
|  | Dipropylene glycol monomethyl ether | 2.0 | 3.0 | 2.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 1.5 | 1.5 |

TABLE E-2-1

|  |  | Examples | | |
|---|---|---|---|---|
|  |  | E7 | E8 | E9 |
| Colorants | Self-dispersible block pigment dispersion liquid | 20.0 | — | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | 20.0 | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | 0.8 | — | — |
|  | Polyether-modified silicone 4 (HLB value: 6.0) | — | 2.4 | — |
|  | Polyether-modified silicone 5 (HLB value: 7.0) | — | — | 1.4 |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | 2.8 |
|  | Acryl-silicone resin emulsion 3 (Tg: 0° C.) | — | 6.3 | — |
|  | Acryl-silicone resin emulsion 4 (Tg: −14° C.) | — | — | — |
|  | Acryl-silicone resin emulsion 5 (Tg: −15° C.) | — | — | — |
|  | Acryl-silicone resin emulsion 6 (Tg: 0° C.) | 2.0 | — | — |
| Acryl-styrene resin particles | Acryl-styrene resin emulsion 1 | 12.1 | — | 21.2 |
|  | Acryl-styrene resin emulsion 2 | — | 9.8 | — |
|  | Acryl-styrene resin emulsion 3 | — | — | — |

TABLE E-2-1-continued

|  |  | Examples | | |
|---|---|---|---|---|
|  |  | E7 | E8 | E9 |
| Organic solvents | 1,2-Propanediol | 13.0 | 12.0 | 8.0 |
|  | 1,3-Propanediol | — | 4.0 | 5.0 |
|  | 1,2-Butanediol | 3.0 | 4.0 | 3.0 |
|  | 2,3-Butanediol | 3.0 | 1.0 | 4.0 |
|  | 3-Methoxy-3-methylbutanol | 3.0 | 4.0 | 6.0 |
|  | 2-Methyl-2,4-pentanediol | 5.0 | 4.0 | 3.0 |
|  | Dipropylene glycol monomethyl ether | 6.0 | 4.0 | 5.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.3 | 0.8 | 1.0 |

TABLE E-2-2

|  |  | Examples | | |
|---|---|---|---|---|
|  |  | E10 | E11 | E12 |
| Colorants | Self-dispersible black pigment dispersion liquid | 20.0 | 20.0 | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | — | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | 1.2 | — | — |
|  | Polyoxyalkylene group-including silicone compound 2 (HLB value: 5.8) | — | — | 1.0 |
|  | Polyether-modified silicone 4 (HLB value: 6.0) | — | 1.5 | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | 5.8 | — | — |
|  | Acryl-silicone resin emulsion 2 (Tg: 21° C.) | — | — | — |
|  | Acryl-silicone resin emulsion 3 (Tg: 0° C.) | — | — | 6.0 |
|  | Acryl-silicone resin emulsion 4 (Tg: −14° C.) | — | 1.8 | — |
|  | Acryl-silicone resin emulsion 5 (Tg: −15° C.) | — | — | — |
|  | Acryl-silicone resin emulsion 6 (Tg: 0° C.) | — | — | — |
| Acryl-styrene resin particles | Acryl-styrene resin emulsion 1 | — | — | — |
|  | Acryl-styrene resin emulsion 2 | 18.3 | — | 18.3 |
|  | Acryl-styrene resin emulsion 3 | — | 18.5 | — |
| Organic solvents | 1,2-Propanediol | 4.0 | 10.0 | 13.0 |
|  | 1,3-Propanediol | 5.0 | 2.0 | 5.0 |
|  | 1,2-Butanediol | 5.0 | 5.0 | 5.0 |
|  | 2,3-Butanediol | 4.0 | 6.0 | 5.0 |
|  | 3-Methoxy-3-methylbutanol | 5.0 | 4.0 | 5.0 |
|  | 2-Methyl-2,4-pentanediol | 5.0 | 3.0 | 1.0 |
|  | Dipropylene glycol monomethyl ether | 5.0 | 3.0 | 1.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 0.6 | 1.8 |

TABLE E-3

|  |  | Comparative Examples | |
|---|---|---|---|
|  |  | E1 | E2 |
| Colorants | Self-dispersible black pigment dispersion liquid | 20.0 | 20.0 |
|  | Self-dispersible cyan pigment dispersion liquid | — | — |
|  | Self-dispersible magenta pigment dispersion liquid | — | — |

TABLE E-3-continued

| | | Comparative Examples | |
|---|---|---|---|
| | | E1 | E2 |
| | Self-dispersible yellow pigment dispersion liquid | — | — |
| | Resin dispersion-type black pigment dispersion liquid | — | — |
| Polysiloxane surfactant A | Polyoxyalkylene group-including silicone compound 1 (HLB value: 1.0) | — | — |
| | Polyether-modified silicone 1 (HLB value 4.0) | — | — |
| | Polyether-modified silicone 2 (HLB value: 4.5) | — | — |
| | Polyether-modified silicone 3 (HLB value: 5.0) | — | — |
| | Polyoxyalkylene group-including silicone compound 2 (HLB value: 5.8) | — | — |
| | Polyether-modified silicone 4 (HLB value: 6.0) | — | — |
| | Polyether-modified silicone 5 (HLB value: 7.0) | — | 1.0 |
| | Polyether-modified silicone 6 (HLB value: 7.4) | — | — |
| | Polyether-modified silicone 7 (HLB value: 8.0) | — | — |
| | Polyether-modified silicone 8 (HLB value: 10.0) | 1.0 | — |
| Acryl-silicone resin particles B | Acryl-silicone resin emulsion 1 (Tg: 50° C.) | — | — |
| | Acryl-silicone resin emulsion 2 (Tg: 21° C.) | — | — |
| | Acryl-silicone resin emulsion 3 (Tg: 0° C.) | — | — |
| | Acryl-silicone resin emulsion 4 (Tg: −14° C.) | 2.0 | — |
| | Acryl-silicone resin emulsion 5 (Tg: −15° C.) | — | — |
| | Acryl-silicone resin emulsion 6 (Tg: 0° C.) | — | — |
| Acryl-styrene resin particles | Acryl-styrene resin emulsion 1 | 21.2 | 21.2 |
| | Acryl-styrene resin emulsion 2 | — | — |
| | Acryl-styrene resin emulsion 3 | — | — |
| Organic solvents | 1,2-Propanediol | 12.0 | 15.0 |
| | 1,3-Propanediol | 10.0 | 2.0 |
| | 1,2-Butanediol | 5.0 | 5.0 |
| | 2,3-Butanediol | 5.0 | — |
| | 3-Methoxy-3-methylbutanol | — | 2.0 |
| | 2-Methyl-2,4-pentanediol | 3.0 | 5.0 |
| | Dipropylene glycol monomethyl ether | 2.0 | 5.0 |
| Antiseptic agent | PROXEL LV | 0.1 | 0.1 |
| Water | Highly purified water | Balance | Balance |
| | Total (% by mass) | 100 | 100 |
| | Mass ratio (B/A) (in terms of solid content) | 1.0 | — |

Here, product names and manufacturing companies of the components in Tables E-1-1, E-1-2, E-2-1, E-2-2, and E-3 are as follows.

Acryl-styrene resin emulsion 1: available from Japan Coating Resin Corporation, RIKABOND ET-700, solid concentration: 33.0% by mass Acryl-styrene resin emulsion 2: available from SEIKO PMC CORPORATION, product name: J-140A, solid concentration: 41% by mass Acryl-styrene resin emulsion 3: available from SEIKO PMC CORPORATION, product name: QE-1042, solid concentration: 40.5% by mass The colorants, the polysiloxane surfactants, the styrene-acryl resin particles, the organic solvents, and the antiseptic agent of Tables E-1-1, E-1-2, E-2-1, E-2-2, and E-3 were the same colorants, polysiloxane surfactants, styrene-acryl resin particles, organic solvents, and antiseptic agent of Tables A-1-1, A-1-2, A-2-1, A-2-2, and A-3.

Next, "storage stability", "fixability (beading)", "rubfastness", "discharging reliability", "image gloss level", and "close adhesiveness" were evaluated in the following manners. The results are presented in Table E-4. Here, "storage stability", "fixability (beading)", "rubfastness", "image gloss level", and "close adhesiveness" were evaluated in the same manner as in Example A1.

<Discharging Reliability>

Each of the inks of Examples E1 to E12 and Comparative Examples E1 and E2 was loaded into the inkjet printer (apparatus name: remodeled apparatus of IPSIO GXE 5500, available from Ricoh Co., Ltd.) to be printed. After it was confirmed that an image was printed and the ink was stably discharged, the inkjet printer was left to stand at 50° C. under an environment of 40% RH for 4 weeks with its print head being moved from the home position to a different position. After that, this inkjet printer was transferred to a place of an environment of normal temperature (25° C.). After a temperature of the inkjet printer was decreased to normal temperature (25° C.), a main body of the inkjet printer was powered on. Then, the printing was performed again. A state that the ink had been discharged again was visually observed. When the ink was not stably discharged, the number of the cleaning operations of the predetermined print head was examined and was used for the evaluation of "discharging reliability" based on the following evaluation criteria.

[Evaluation Criteria]

A: The ink is stably discharged again after left to stand and the cleaning operation of the print head is unnecessary.

B: The ink is unstably discharged again after left to stand. However, when the cleaning operation of the print head is performed, the ink is stably discharged again.

C: The ink is unstably discharged again after left to stand. Moreover, when the cleaning operation of the print head is performed, the ink is still unstably discharged.

TABLE E-4

| | | Evaluation results | | | | | |
| --- | --- | --- | --- | --- | --- | --- | --- |
| | | Fixability (beading) | Storage stability | Rubfastness | Discharging reliability | Image gloss level | Close adhesiveness |
| Examples | E1 | A | A | AA | A | AA | A |
| | E2 | A | A | AA | A | AA | A |
| | E3 | B | A | AA | A | AA | A |
| | E4 | B | A | AA | A | AA | A |
| | E5 | A | B | AA | A | AA | A |
| | E6 | A | B | A | A | A | A |
| | E7 | B | A | AA | A | A | A |
| | E8 | A | B | A | B | A | A |
| | E9 | A | A | A | A | AA | B |
| | E10 | A | A | AA | A | AA | B |
| | E11 | A | B | AA | B | AA | A |
| | E12 | A | A | A | A | B | A |
| Comparative | E1 | C | A | A | C | B | B |
| Examples | E2 | A | D | A | B | A | C |

Example E1 and Example E2 are preferable Examples of the present disclosure. It is found that the inks of Example E1 and Example E2 are excellent in close adhesiveness to a PVC film print medium. In addition, it is found that use of the inks makes it possible to obtain images having high image gloss level and having rubfastness and discharging reliability even when an image is printed on an impermeable print medium.

Example E3 and Example E4 are examples where the polysiloxane surfactants have somewhat high HLB values. The inks of Example E3 and Example E4 were deteriorated in fixability compared to the ink of Example E1.

Example E5 and Example E6 are examples where the polysiloxane surfactants have somewhat low HLB values. The inks of Example E5 and Example E6 were deteriorated in storage stability compared to the ink of Example E1.

Example E7 is an example where the amount of the polysiloxane surfactant added is somewhat low. The ink of Example E7 was deteriorated in fixability and discharging reliability compared to the ink of Example E1.

Example E8 is an example where the amount of the polysiloxane surfactant added is somewhat high. The ink of Example E8 was deteriorated in storage stability and discharging reliability compared to the ink of Example E1.

Example E9 and Example E10 are examples where the glass transition temperatures (Tg) of the acryl-silicone resin emulsions are higher than 0° C. The inks of Example E9 and Example E10 were deteriorated in close adhesiveness compared to the ink of Example E1.

Example E11 is an example where the amount of the acryl-silicone resin particles is somewhat insufficient compared to the amount of the polysiloxane surfactant. The ink of Example E11 was deteriorated in storage stability and discharging reliability compared to the ink of Example E1.

Example E12 is an example where the amount of the acryl-silicone resin particles is somewhat higher compared to the amount of the polysiloxane surfactant. The ink of Example E12 was deteriorated in image gloss level compared to the ink of Example E1.

Meanwhile, Comparative Example E1 is an example where the ink includes no polysiloxane surfactant having an HLB value of 8 or less. Comparative Example E2 is an example where the ink includes no acryl-silicone resin particles. The ink of Comparative Examples E1 was particularly deteriorated in fixability and discharging reliability compared to the ink of Example E1. The ink of Comparative Example E2 was particularly deteriorated in storage stability and close adhesiveness compared to the ink of Example E1.

From the results of the Table E-4, it is found that the ink of the present disclosure is suitably used for outdoor applications. In addition, the inks of Examples E1 to E12 were excellent in fixability, storage stability, rubfastness, discharging reliability, image gloss level, and close adhesiveness.

Example F1

A self-dispersible black pigment dispersion (20.0% by mass), polyether-modified silicone 2 (polysiloxane surfactant, product name: KF-6017, available from Shin-Etsu Chemical Co., Ltd., HLB value: 4.5) (1.0% by mass), acryl-silicone resin emulsion 4 (product name: AE 980, available from Emulsion Technology Co., Ltd., solid concentration: 50% by mass, glass transition temperature (Tg): −14° C.) (2.0% by mass), polyvinyl alcohol resin emulsion 1 (available from JAPAN VAM & POVAL CO., LTD., product name: POVAL JF-17, solid concentration: 30% by mass) (23.3% by mass), 1,2-propanediol (12.0% by mass), 1,3-propanediol (10.0% by mass), 1,2-butanediol (3.0% by mass), 2,3-butanediol (3.0% by mass), 3-methoxy-3-methylbutanol (3.0% by mass), 2-methyl-2,4-pentanediol (3.0% by mass), dipropylene glycol monomethyl ether (4.0% by mass), product name: PROXEL LV (available from Avecia) (0.1% by mass) serving as an antiseptic agent, and highly purified water serving as a balance were added, and were mixed and stirred. The resultant mixture was filtered through a polypropylene filter (product name: BETAFINE, polypropylene pleat filter PPG series, available from 3M) having an average pore diameter of 0.2 μm to prepare ink F1.

Examples F2 to F12 and Comparative Examples F1 and F2

Inks F2 to F14 of Examples F2 to F12 and Comparative Examples F1 and F2 were prepared in the same manner as in Example F1 except that the formulation and the amounts in Example F1 were changed to formulations and amounts described in the following Tables F-1-1, F-1-2, F-2-1, F-2-2, and F-3.

TABLE F-1-1

|  |  | Examples | | |
|---|---|---|---|---|
|  |  | F1 | F2 | F3 |
| Colorants | Self-dispersible black pigment dispersion liquid | 20.0 | 20.0 | — |
|  | Self-dispersible cyan pigment dispersion liquid | — | — | — |
|  | Self-dispersible magenta pigment dispersion liquid | — | — | 20.0 |
|  | Self-dispersible yellow pigment dispersion liquid | — | — | — |
|  | Resin dispersion-type black pigment dispersion liquid | — | — | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | 1.0 | — | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | 2.0 | — |
|  | Polyether-modified silicone 6 (HLB value: 7.4) | — | — | 1.2 |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | — | — | — |
|  | Acryl-silicone resin emulsion 4 (Tg: −14° C.) | 2.0 | 4.8 | — |
|  | Acryl-silicone resin emulsion 5 (Tg: −15° C.) | — | — | 2.8 |
|  | Acryl-silicone resin emulsion 6 (Tg: 0° C.) | — | — | — |
| Polyvinyl alcohol resin particles | Polyvinyl alcohol resin emulsion 1 | 23.3 | 18.3 | — |
|  | Polyvinyl alcohol resin emulsion 2 | — | — | 13.3 |
|  | Polyvinyl alcohol resin emulsion 3 | — | — | — |
| Organic solvents | 1,2-Propanediol | 12.0 | 18.0 | 14.0 |
|  | 1,3-Propanediol | 10.0 | 4.0 | 2.0 |
|  | 1,2-Butanediol | 3.0 | 2.0 | 3.0 |
|  | 2,3-Butanediol | 3.0 | 5.0 | 3.0 |
|  | 3-Methoxy-3-methylbutanol | 3.0 | 6.0 | 8.0 |
|  | 2-Methyl-2,4-pentanediol | 3.0 | — | 2.0 |
|  | Dipropylene glycol monomethyl ether | 4.0 | 2.0 | — |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.0 | 1.2 | 1.2 |

TABLE F-1-2

|  |  | Examples | | |
|---|---|---|---|---|
|  |  | F4 | F5 | F6 |
| Colorants | Self-dispersible black pigment dispersion liquid | — | — | — |
|  | Self-dispersible cyan pigment dispersion liquid | — | 20.0 | — |
|  | Self-dispersible magenta pigment dispersion liquid | — | — | — |
|  | Self-dispersible yellow pigment dispersion liquid | 20.0 | — | — |
|  | Resin dispersion-type black pigment dispersion liquid | — | — | 20.0 |
| Polysiloxane surfactant A | Polyoxyalkylene group-including silicone compound 1 (HLB value: 1.0) | — | — | 1.6 |
|  | Polyether-modified silicone 1 (HLB value: 4.0) | — | 1.6 | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | 1.2 | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | 4.7 | — | — |
|  | Acryl-silicone resin emulsion 4 (Tg: −14° C.) | — | — | — |
|  | Acryl-silicone resin emulsion 5 (Tg: −15° C.) | — | 4.8 | 4.8 |
|  | Acryl-silicone resin emulsion 6 (Tg: 0° C.) | — | — | — |
| Polyvinyl alcohol resin particles | Polyvinyl alcohol resin emulsion 1 | — | — | 25.3 |
|  | Polyvinyl alcohol resin emulsion 2 | — | — | — |
|  | Polyvinyl alcohol resin emulsion 3 | 13.3 | 18.3 | — |

TABLE F-1-2-continued

|  |  | Examples | | |
|---|---|---|---|---|
|  |  | F4 | F5 | F6 |
| Organic solvents | 1,2-Propanediol | 15.0 | 16.0 | 20.0 |
|  | 1,3-Propanediol | 2.0 | 2.0 | 5.0 |
|  | 1,2-Butanediol | 2.0 | 2.0 | 2.0 |
|  | 2,3-Butanediol | 3.0 | 5.0 | 4.0 |
|  | 3-Methoxy-3-methylbutanol | 5.0 | 4.0 | 3.0 |
|  | 2-Methyl-2,4-pentanediol | 2.0 | 5.0 | — |
|  | Dipropylene glycol monomethyl ether | 2.0 | 3.0 | 2.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 1.5 | 1.5 |

TABLE F-2-1

|  |  | Examples | | |
|---|---|---|---|---|
|  |  | F7 | F8 | F9 |
| Colorants | Self-dispersible black pigment dispersion liquid | 20.0 | — | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | 20.0 | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | 0.8 | — | — |
|  | Polyether-modified silicone 4 (HLB value: 6.0) | — | 2.4 | — |
|  | Polyether-modified silicone 5 (HLB value: 7.0) | — | — | 1.4 |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | 2.8 |
|  | Acryl-silicone resin emulsion 3 (Tg: 0° C.) | — | 6.3 | — |
|  | Acryl-silicone resin emulsion 4 (Tg: −14° C.) | — | — | — |
|  | Acryl-silicone resin emulsion 5 (Tg: −15° C.) | — | — | — |
|  | Acryl-silicone resin emulsion 6 (Tg: 0° C.) | 2.0 | — | — |
| Polyvinyl alcohol resin particles | Polyvinyl alcohol resin emulsion 1 | 13.3 | — | 23.3 |
|  | Polyvinyl alcohol resin emulsion 2 | — | 13.3 | — |
|  | Polyvinyl alcohol resin emulsion 3 | — | — | — |
| Organic solvents | 1,2-Propanediol | 13.0 | 12.0 | 8.0 |
|  | 1,3-Propanediol | — | 4.0 | 5.0 |
|  | 1,2-Butanediol | 3.0 | 4.0 | 3.0 |
|  | 2,3-Butanediol | 3.0 | 1.0 | 4.0 |
|  | 3-Methoxy-3-methylbutanol | 3.0 | 4.0 | 6.0 |
|  | 2-Methyl-2,4-pentanediol | 5.0 | 4.0 | 3.0 |
|  | Dipropylene glycol monomethyl ether | 6.0 | 4.0 | 5.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.3 | 0.8 | 1.0 |

TABLE F-2-2

|  |  | Examples | | |
|---|---|---|---|---|
|  |  | F10 | F11 | F12 |
| Colorants | Self-dispersible black pigment dispersion liquid | 20.0 | 20.0 | — |
|  | Self-dispersible cyan pigment dispersion liquid | — | — | 20.0 |
|  | Self-dispersible magenta pigment dispersion liquid | — | — | — |

TABLE F-2-2-continued

|  |  | Examples | | |
|---|---|---|---|---|
|  |  | F10 | F11 | F12 |
|  | Self-dispersible yellow pigment dispersion liquid | — | — | — |
|  | Resin dispersion-type black pigment dispersion liquid | — | — | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | 1.2 | — | — |
|  | Polyoxyalkylene group-including silicone compound 2 (HLB value: 5.8) | — | — | 1.0 |
|  | Polyether-modified silicone 4 (HLB value: 6.0) | — | 1.5 | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | 5.8 | — | — |
|  | Acryl-silicone resin emulsion 2 (Tg: 21° C.) | — | — | — |
|  | Acryl-silicone resin emulsion 3 (Tg: 0° C.) | — | — | 6.0 |
|  | Acryl-silicone resin emulsion 4 (Tg: −14° C.) | — | 1.8 | — |
|  | Acryl-silicone resin emulsion 5 (Tg: −15° C.) | — | — | — |
|  | Acryl-silicone resin emulsion 6 (Tg: 0° C.) | — | — | — |
| Polyvinyl alcohol resin particles | Polyvinyl alcohol resin emulsion 1 | — | — | — |
|  | Polyvinyl alcohol resin emulsion 2 | 25.0 | — | 25.0 |
|  | Polyvinyl alcohol resin emulsion 3 | — | 25.0 | — |
| Organic solvents | 1,2-Propanediol | 4.0 | 10.0 | 13.0 |
|  | 1,3-Propanediol | 5.0 | 2.0 | 5.0 |
|  | 1,2-Butanediol | 5.0 | 5.0 | 5.0 |
|  | 2,3-Butanediol | 4.0 | 6.0 | 5.0 |
|  | 3-Methoxy-3-methylbutanol | 5.0 | 4.0 | 5.0 |
|  | 2-Methyl-2,4-pentanediol | 5.0 | 3.0 | 1.0 |
|  | Dipropylene glycol monomethyl ether | 5.0 | 3.0 | 1.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 0.6 | 1.8 |

TABLE F-3

|  |  | Comparative Examples | |
|---|---|---|---|
|  |  | F1 | F2 |
| Colorants | Self-dispersible black pigment dispersion liquid | 20.0 | 20.0 |
|  | Self-dispersible cyan pigment dispersion liquid | — | — |
|  | Self-dispersible magenta pigment dispersion liquid | — | — |
|  | Self-dispersible yellow pigment dispersion liquid | — | — |
|  | Resin dispersion-type black pigment dispersion liquid | — | — |
| Polysiloxane surfactant A | Polyoxyalkylene group-including silicone compound 1 (HLB value: 1.0) | — | — |
|  | Polyether-modified silicone 1 (HLB value: 4.0) | — | — |
|  | Polyether-modified silicone 2 (HLB value: 4.5) | — | — |
|  | Polyether-modified silicone 3 (HLB value: 5.0) | — | — |
|  | Polyoxyalkylene group-including silicone compound 2 (HLB value: 5.8) | — | — |
|  | Polyether-modified silicone 4 (HLB value: 6.0) | — | — |
|  | Polyether-modified silicone 5 (HLB value: 7.0) | — | 1.0 |
|  | Polyether-modified silicone 6 (HLB value: 7.4) | — | — |
|  | Polyether-modified silicone 7 (HLB value: 8.0) | — | — |
|  | Polyether-modified silicone 8 (HLB value: 10.0) | 1.0 | — |
| Acryl-silicone resin particles B | Acryl-silicone resin emulsion 1 (Tg: 50° C.) | — | — |
|  | Acryl-silicone resin emulsion 2 (Tg: 21° C.) | — | — |
|  | Acryl-silicone resin emulsion 3 (Tg: 0° C.) | — | — |
|  | Acryl-silicone resin emulsion 4 (Tg: −14° C.) | 2.0 | — |
|  | Acryl-silicone resin emulsion 5 (Tg: −15° C.) | — | — |
|  | Acryl-silicone resin emulsion 6 (Tg: 0° C.) | — | — |
| Polyvinyl alcohol resin particles | Polyvinyl alcohol resin emulsion 1 | 23.3 | 23.3 |
|  | Polyvinyl alcohol resin emulsion 2 | — | — |
|  | Polyvinyl alcohol resin emulsion 3 | — | — |

TABLE F-3-continued

|  |  | Comparative Examples | |
|---|---|---|---|
|  |  | F1 | F2 |
| Organic solvents | 1,2-Propanediol | 12.0 | 15.0 |
|  | 1,3-Propanediol | 10.0 | 2.0 |
|  | 1,2-Butanediol | 5.0 | 5.0 |
|  | 2,3-Butanediol | 5.0 | — |
|  | 3-Methoxy-3-methylbutanol | — | 2.0 |
|  | 2-Methyl-2,4-pentanediol | 3.0 | 5.0 |
|  | Dipropylene glycol monomethyl ether | 2.0 | 5.0 |
| Antiseptic agent | PROXEL LV | 0.1 | 0.1 |
| Water | Highly purified water | Balance | Balance |
|  | Total (% by mass) | 100 | 100 |
|  | Mass ratio (B/A) (in terms of solid content) | 1.0 | — |

Here, product names and a manufacturing company of the components in Tables F-1-1, F-1-2, F-2-1, F-2-2, and F-3 are as follows.

Polyvinyl alcohol resin emulsion 1: available from JAPAN VAM & POVAL CO., LTD., product name: POVAL JF-17, solid concentration: 30% by mass Polyvinyl alcohol resin emulsion 2: available from JAPAN VAM & POVAL CO., LTD., product name: POVAL JF-04, solid concentration: 30% by mass Polyvinyl alcohol resin emulsion 3: available from JAPAN VAM & POVAL CO., LTD., product name: POVAL JF-05, solid concentration: 30% by mass The colorants, the polysiloxane surfactants, the styrene-acryl resin particles, the organic solvents, and the antiseptic agent of Tables F-1-1, F-1-2, F-2-1, F-2-2, and F-3 were the same colorants, polysiloxane surfactants, styrene-acryl resin particles, organic solvents, and antiseptic agent of Tables A-1-1, A-1-2, A-2-1, A-2-2, and A-3.

Next, "storage stability", "fixability (beading)", "rubfastness", "solvent resistance", "image gloss level", "close adhesiveness", and "weather resistance" were evaluated in the same manner as in Example B1. The results are presented in Table F-4.

image gloss level and having weather resistance, solvent resistance, fixability, storage stability, and rubfastness even when an image is printed on an impermeable print medium.

Example F3 and Example F4 are examples where the polysiloxane surfactants have somewhat high HLB values. The inks of Example F3 and Example F4 were deteriorated in fixability compared to the ink of Example F1.

Example F5 and Example F6 are examples where the polysiloxane surfactants have somewhat low HLB values. The inks of Example F5 and Example F6 were deteriorated in storage stability compared to the ink of Example F1.

Example F7 is an example where the amount of the polysiloxane surfactant added is somewhat low. The ink of Example F7 was deteriorated in fixability compared to the ink of Example F1.

Example F8 is an example where the amount of the polysiloxane surfactant added is somewhat high. The ink of Example F8 was deteriorated in storage stability and weather resistance compared to the ink of Example F1.

Example F9 and Example F10 are examples where the glass transition temperatures (Tg) of the acryl-silicone resin emulsions are higher than 0° C. The inks of Example F9 and

TABLE F-4

|  |  | Evaluation results | | | | | | |
|---|---|---|---|---|---|---|---|---|
|  |  | Fixability (beading) | Storage stability | Rubfastness | Solvent resistance | Image gloss level | Close adhesiveness | Weather resistance |
| Examples | F1 | A | A | AA | AA | AA | A | AA |
|  | F2 | A | A | AA | AA | AA | A | AA |
|  | F3 | B | A | AA | A | AA | A | AA |
|  | F4 | B | A | AA | AA | AA | A | B |
|  | F5 | A | B | AA | A | AA | A | A |
|  | F6 | A | B | A | AA | A | A | AA |
|  | F7 | B | A | AA | A | A | A | A |
|  | F8 | A | B | A | A | A | A | B |
|  | F9 | A | A | A | A | AA | B | AA |
|  | F10 | A | A | AA | A | AA | B | A |
|  | F11 | A | B | AA | A | AA | A | A |
|  | F12 | A | A | A | A | B | A | A |
| Comparative Examples | F1 | C | A | A | C | B | B | A |
|  | F2 | A | D | A | B | A | C | A |

Example F1 and Example F2 are preferable Examples of the present disclosure. It is found that the inks of Example F1 and Example F2 are excellent in close adhesiveness to a PVC film print medium. In addition, it is found that use of the inks makes it possible to obtain images having high Example A10 were deteriorated in close adhesiveness compared to the ink of Example F1.

Example F11 is an example where the amount of the acryl-silicone resin particles is somewhat insufficient compared to the amount of the polysiloxane surfactant. The ink of Example F11 was deteriorated in storage stability compared to the ink of Example F1.

Example F12 is an example where the amount of the acryl-silicone resin particles is somewhat higher compared to the amount of the polysiloxane surfactant. The ink of Example F12 was deteriorated in image gloss level compared to the ink of Example F1.

Meanwhile, Comparative Example F1 is an example where the ink includes no polysiloxane surfactant having an HLB value of 8 or less. Comparative Example F2 is an example where the ink includes no acryl-silicone resin particles. The ink of Comparative Examples F1 was particularly deteriorated in fixability and solvent resistance compared to the ink of Example F1. The ink of Comparative Example F2 was particularly deteriorated in storage stability and close adhesiveness compared to the ink of Example F1.

From the results of the Table F-4, it is found that the ink of the present disclosure is suitably used for outdoor applications. In addition, the inks of Examples F1 to F12 were excellent in fixability, storage stability, rubfastness, solvent resistance, image gloss level, close adhesiveness, and weather resistance.

Example G1

A self-dispersible black pigment dispersion (20.0% by mass), polyether-modified silicone 2 (polysiloxane surfactant, product name: KF-6017, available from Shin-Etsu Chemical Co., Ltd., HLB value: 4.5) (1.0% by mass), acryl-silicone resin emulsion 4 (product name: AE 980, available from Emulsion Technology Co., Ltd., solid concentration: 50% by mass, glass transition temperature (Tg): −14° C.) (2.0% by mass), polycarbonate polyurethane resin emulsion (solid concentration: 30% by mass) (23.3% by mass), N,N-dimethyl-13-butoxy propionamide (22.0 parts by mass), 1,2-butanediol (3.0% by mass), 2,3-butanediol (3.0% by mass), 3-methoxy-3-methylbutanol (3.0% by mass), 2-methyl-2,4-pentanediol (3.0% by mass), dipropylene glycol monomethyl ether (4.0% by mass), product name: PROXEL LV (available from Avecia) (0.1% by mass) serving as an antiseptic agent, and highly purified water serving as a balance were added, and were mixed and stirred. The resultant mixture was filtered through a polypropylene filter (product name: BETAFINE, polypropylene pleat filter PPG series, available from 3M) having an average pore diameter of 0.2 μm to prepare ink G1.

Examples G2 to G12 and Comparative Examples G1 and G2

Inks G2 to G14 of Examples G2 to G12 and Comparative Examples G1 and G2 were prepared in the same manner as in Example G1 except that the formulation and the amounts in Example G1 were changed to formulations and amounts described in the following Tables G-1-1, G-1-2, G-2-1, G-2-2, and G-3.

TABLE G-1-1

| | | Examples | | |
|---|---|---|---|---|
| | | G1 | G2 | G3 |
| Colorants | Self-dispersible black pigment dispersion liquid | 20.0 | 20.0 | — |
| | Self-dispersible cyan pigment dispersion liquid | — | — | — |
| | Self-dispersible magenta pigment dispersion liquid | — | — | 20.0 |
| | Self-dispersible yellow pigment dispersion liquid | — | — | — |
| | Resin dispersion-type black pigment dispersion liquid | — | — | — |
| Polysiloxane surfactant A | Polyoxyalkylene group-including silicone compound 1 (HLB value: 1.0) | — | — | — |
| | Polyether-modified silicone 1 (HLB value: 4.0) | — | — | — |
| | Polyether-modified silicone 2 (HLB value: 4.5) | 1.0 | — | — |
| | Polyether-modified silicone 3 (HLB value: 5.0) | — | — | — |
| | Polyoxyalkylene group-including silicone compound 2 (HLB value: 5.8) | — | — | — |
| | Polyether-modified silicone 4 (HLB value: 6.0) | — | — | — |
| | Polyether-modified silicone 5 (HLB value: 7.0) | — | 2.0 | — |
| | Polyether-modified silicone 6 (HLB value: 7.4) | — | — | 1.2 |
| | Polyether-modified silicone 7 (HLB value: 8.0) | — | — | — |
| | Polyether-modified silicone 8 (HLB value: 10.0) | — | — | — |
| Acryl-silicone resin particles B | Acryl-silicone resin emulsion 1 (Tg: 50° C.) | — | — | — |
| | Acryl-silicone resin emulsion 2 (Tg: 21° C.) | — | — | — |
| | Acryl-silicone resin emulsion 3 (Tg: 0° C.) | — | — | — |
| | Acryl-silicone resin emulsion 4 (Tg: −14° C.) | 2.0 | 4.8 | — |
| | Acryl-silicone resin emulsion 5 (Tg: −15° C.) | — | — | 2.8 |
| | Acryl-silicone resin emulsion 6 (Tg: 0° C.) | — | — | — |
| Polyurethane resin particles | Polycarbonate polyurethane resin emulsion | 23.3 | 18.3 | — |
| | Polyether polyurethane resin emulsion | — | — | 13.3 |
| | Polyester polyurethane resin emulsion | — | — | — |
| Compounds represented by General Formula (1) | N,N-dimethyl-β-butoxy propionamide | 22.0 | — | 16.0 |
| | N,N-dimethyl-β-heptoxypropionamide | — | 22.0 | — |
| | N,N-diethyl-β-butoxy propionamide | — | — | — |
| | N,N-diethyl-β-heptoxypropionamide | — | — | — |
| Organic solvents | 1,2-Butanediol | 3.0 | 9.0 | 3.0 |
| | 2,3-Butanediol | 3.0 | 5.0 | 3.0 |
| | 3-Methoxy-3-methylbutanol | 3.0 | 6.0 | 8.0 |
| | 2-Methyl-2,4-pentanediol | 3.0 | — | 2.0 |
| | Dipropylene glycol monomethyl ether | 4.0 | 2.0 | — |

TABLE G-1-1-continued

|  |  | Examples | | |
|---|---|---|---|---|
|  |  | G1 | G2 | G3 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.0 | 1.2 | 1.2 |

TABLE G-1-2

|  |  | Examples | | |
|---|---|---|---|---|
|  |  | G4 | G5 | G6 |
| Colorants | Self-dispersible black pigment dispersion liquid | — | — | — |
|  | Self-dispersible cyan pigment dispersion liquid | — | 20.0 | — |
|  | Self-dispersible magenta pigment dispersion liquid | — | — | — |
|  | Self-dispersible yellow pigment dispersion liquid | 20.0 | — | — |
|  | Resin dispersion-type black pigment dispersion liquid | — | — | 20.0 |
| Polysiloxane surfactant A | Polyoxyalkylene group-including silicone compound 1 (HLB value: 1.0) | — | — | 1.6 |
|  | Polyether-modified silicone 1 (HLB value: 4.0) | — | — | — |
|  | Polyether-modified silicone 2 (HLB value: 4.5) | — | 1.6 | — |
|  | Polyether-modified silicone 3 (HLB value: 5.0) | — | — | — |
|  | Polyoxyalkylene group-including silicone compound 2 (HLB value: 5.8) | — | — | — |
|  | Polyether-modified silicone 4 (HLB value: 6.0) | — | — | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | 1.2 | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | — |
|  | Acryl-silicone resin emulsion 3 (Tg: 0° C.) | 4.7 | — | — |
|  | Acryl-silicone resin emulsion 4 (Tg: −14° C.) | — | — | — |
|  | Acryl-silicone resin emulsion 5 (Tg: −15° C.) | — | 4.8 | 4.8 |
|  | Acryl-silicone resin emulsion 6 (Tg: 0° C.) | — | — | — |
| Polyurethane resin particles | Polycarbonate polyurethane resin emulsion | — | — | 25.3 |
|  | Polyether polyurethane resin emulsion | — | — | — |
|  | Polyester polyurethane resin emulsion | 13.3 | 18.3 | — |
| Compounds represented by General Formula (1) | N,N-dimethyl-β-butoxy propionamide | — | — | 25.0 |
|  | N,N-dimethyl-β-heptoxypropionamide | 17.0 | — | — |
|  | N,N-diethyl-β-butoxy propionamide | — | 18.0 | — |
|  | N,N-diethyl-β-heptoxypropionamide | — | — | — |
| Organic solvents | 1,2-Butanediol | 2.0 | 2.0 | 2.0 |
|  | 2,3-Butanediol | 3.0 | 5.0 | 4.0 |
|  | 3-Methoxy-3-methylbutanol | 5.0 | 4.0 | 3.0 |
|  | 2-Methyl-2,4-pentanediol | 2.0 | 5.0 | — |
|  | Dipropylene glycol monomethyl ether | 2.0 | 3.0 | 2.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 1.5 | 1.5 |

TABLE G-2-1

|  |  | Examples | | |
|---|---|---|---|---|
|  |  | G7 | G8 | G9 |
| Colorants | Self-dispersible black pigment dispersion liquid | 20.0 | — | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | 20.0 | — |

TABLE G-2-1-continued

|  |  | Examples | | |
|---|---|---|---|---|
|  |  | G7 | G8 | G9 |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | — | — | — |
|  | Polyoxyalkylene group-including silicone compound 2 (HLB value: 5.8) | 0.8 | — | — |
|  | Polyether-modified silicone 4 (HLB value: 6.0) | — | 2.4 | — |
|  | Polyether-modified silicone 5 (HLB value: 7.0) | — | — | 1.4 |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | — | — | — |
|  | Acryl-silicone resin emulsion 2 (Tg: 21° C.) | — | — | 2.8 |
|  | Acryl-silicone resin emulsion 3 (Tg: 0° C.) | — | 6.3 | — |
|  | Acryl-silicone resin emulsion 4 (Tg: −14° C.) | — | — | — |
|  | Acryl-silicone resin emulsion 5 (Tg: −15° C.) | — | — | — |
|  | Acryl-silicone resin emulsion 6 (Tg: 0° C.) | 2.0 | — | — |
| Polyurethane resin particles | Polycarbonate polyurethane resin emulsion | 13.3 | — | 23.3 |
|  | Polyether polyurethane resin emulsion | — | 13.3 | — |
|  | Polyester polyurethane resin emulsion | — | — | — |
| Compounds represented by General Formula (1) | N,N-dimethyl-β-butoxy propionamide | — | 10.0 | 4.0 |
|  | N,N-dimethyl-β-heptoxypropionamide | — | — | — |
|  | N,N-diethyl-β-butoxy propionamide | — | 6.0 | — |
|  | N,N-diethyl-β-heptoxypropionamide | 6.0 | — | 9.0 |
| Organic solvents | 1,2-Butanediol | 2.0 | 4.0 | 3.0 |
|  | 2,3-Butanediol | 2.0 | 1.0 | 4.0 |
|  | 3-Methoxy-3-methylbutanol | 1.0 | 4.0 | 6.0 |
|  | 2-Methyl-2,4-pentanediol | 3.0 | 4.0 | 3.0 |
|  | Dipropylene glycol monomethyl ether | 5.0 | 4.0 | 5.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.3 | 0.8 | 1.0 |

TABLE G-2-2

|  |  | Examples | | |
|---|---|---|---|---|
|  |  | G10 | G11 | G12 |
| Colorants | Self-dispersible black pigment dispersion liquid | 20.0 | 20.0 | — |
|  | Self-dispersible cyan pigment dispersion liquid | — | — | 20.0 |
|  | Self-dispersible magenta pigment dispersion liquid | — | — | — |
|  | Self-dispersible yellow pigment dispersion liquid | — | — | — |
|  | Resin dispersion-type black pigment dispersion liquid | — | — | — |
| Polysiloxane surfactant A | Polyoxyalkylene group-including silicone compound 1 (HLB value: 1.0) | — | — | — |
|  | Polyether-modified silicone 1 (HLB value: 4.0) | — | — | — |
|  | Polyether-modified silicone 2 (HLB value: 4.5) | — | — | — |
|  | Polyether-modified silicone 3 (HLB value: 5.0) | 1.2 | — | — |
|  | Polyoxyalkylene group-including silicone compound 2 (HLB value: 5.8) | — | — | 1.0 |
|  | Polyether-modified silicone 4 (HLB value: 6.0) | — | 1.5 | — |
|  | Polyether-modified silicone 5 (HLB value: 7.0) | — | — | — |
|  | Polyether-modified silicone 6 (HLB value: 7.4) | — | — | — |
|  | Polyether-modified silicone 7 (HLB value: 8.0) | — | — | — |
|  | Polyether-modified silicone 8 (HLB value: 10.0) | — | — | — |
| Acryl-silicone resin particles B | Acryl-silicone resin emulsion 1 (Tg: 50° C.) | 5.8 | — | — |
|  | Acryl-silicone resin emulsion 2 (Tg: 21° C.) | — | — | — |
|  | Acryl-silicone resin emulsion 3 (Tg: 0° C.) | — | — | 6.0 |
|  | Acryl-silicone resin emulsion 4 (Tg: −14° C.) | — | 1.8 | — |
|  | Acryl-silicone resin emulsion 5 (Tg: −15° C.) | — | — | — |
|  | Acryl-silicone resin emulsion 6 (Tg: 0° C.) | — | — | — |
| Polyurethane resin particles | Polycarbonate polyurethane resin emulsion | — | — | — |
|  | Polyether polyurethane resin emulsion | 25.0 | — | 25.0 |
|  | Polyester polyurethane resin emulsion | — | 25.0 | — |
| Compounds represented by General | N,N-dimethyl-β-butoxy propionamide | 9.0 | — | — |
|  | N,N-dimethyl-β-heptoxypropionamide | — | 12.0 | — |
|  | N,N-diethyl-β-butoxy propionamide | — | — | — |

TABLE G-2-2-continued

|  |  | Examples | | |
|---|---|---|---|---|
|  |  | G10 | G11 | G12 |
| Formula (1) | N,N-diethyl-β-heptoxypropionamide | — | — | 18.0 |
| Organic solvents | 1,2-Butanediol | 5.0 | 5.0 | 5.0 |
|  | 2,3-Butanediol | 4.0 | 6.0 | 5.0 |
|  | 3-Methoxy-3-methylbutanol | 5.0 | 4.0 | 5.0 |
|  | 2-Methyl-2,4-pentanediol | 5.0 | 3.0 | 1.0 |
|  | Dipropylene glycol monomethyl ether | 5.0 | 3.0 | 1.0 |
| Antiseptic agent | PROXEL LV | 0.1 | 0.1 | 0.1 |
| Water | Highly purified water | Balance | Balance | Balance |
|  | Total (% by mass) | 100 | 100 | 100 |
|  | Mass ratio (B/A) (in terms of solid content) | 1.2 | 0.6 | 1.8 |

TABLE G-3

|  |  | Comparative Examples | |
|---|---|---|---|
|  |  | G1 | G2 |
| Colorants | Self-dispersible black pigment dispersion liquid | 20.0 | 20.0 |
|  | Self-dispersible cyan pigment dispersion liquid | — | — |
|  | Self-dispersible magenta pigment dispersion liquid | — | — |
|  | Self-dispersible yellow pigment dispersion liquid | — | — |
|  | Resin dispersion-type black pigment dispersion liquid | — | — |
| Polysiloxane surfactant A | Polyoxyalkylene group-including silicone compound 1 (HLB value: 1.0) | — | — |
|  | Polyether-modified silicone 1 (HLB value: 4.0) | — | — |
|  | Polyether-modified silicone 2 (HLB value: 4.5) | — | — |
|  | Polyether-modified silicone 3 (HLB value: 5.0) | — | — |
|  | Polyoxyalkylene group-including silicone compound 2 (HLB value: 5.8) | — | — |
|  | Polyether-modified silicone 4 (HLB value: 6.0) | — | — |
|  | Polyether-modified silicone 5 (HLB value: 7.0) | — | 1.0 |
|  | Polyether-modified silicone 6 (HLB value: 7.4) | — | — |
|  | Polyether-modified silicone 7 (HLB value: 8.0) | — | — |
|  | Polyether-modified silicone 8 (HLB value: 10.0) | 1.0 | — |
| Acryl-silicone resin particles B | Acryl-silicone resin emulsion 1 (Tg: 50° C.) | — | — |
|  | Acryl-silicone resin emulsion 2 (Tg: 21° C.) | — | — |
|  | Acryl-silicone resin emulsion 3 (Tg: 0° C.) | — | — |
|  | Acryl-silicone resin emulsion 4 (Tg: −14° C.) | 2.0 | — |
|  | Acryl-silicone resin emulsion 5 (Tg: −15° C.) | — | — |
|  | Acryl-silicone resin emulsion 6 (Tg: 0° C.) | — | — |
| Polyurethane resin particles | Polycarbonate polyurethane resin emulsion | 23.3 | 23.3 |
|  | Polyether polyurethane resin emulsion | — | — |
|  | Polyester polyurethane resin emulsion | — | — |
| Compounds represented by General Formula (1) | N,N-dimethyl-β-butoxy propionamide | 22.0 | — |
|  | N,N-dimethyl-β-heptoxypropionamide | — | — |
|  | N,N-diethyl-β-butoxy propionamide | — | 17.0 |
|  | N,N-diethyl-β-heptoxypropionamide | — | — |
| Organic solvents | 1,2-Butanediol | 5.0 | 5.0 |
|  | 2,3-Butanediol | 5.0 | — |
|  | 3-Methoxy-3-methylbutanol | — | 2.0 |
|  | 2-Methyl-2,4-pentanediol | 3.0 | 5.0 |
|  | Dipropylene glycol monomethyl ether | 2.0 | 5.0 |
| Antiseptic agent | PROXEL LV | 0.1 | 0.1 |
| Water | Highly purified water | Balance | Balance |
|  | Total (% by mass) | 100 | 100 |
|  | Mass ratio (B/A) (in terms of solid content) | 1.0 | — |

Here, product names and a manufacturing company of the components in Tables G-1-1, G-1-2, G-2-1, G-2-2, and G-3 are as follows.

N,N-dimethyl-β-butoxy propionamide: available from Idemitsu Kosan Co., Ltd.

N,N-dimethyl-β-heptoxypropionamide: available from Idemitsu Kosan Co., Ltd.

N,N-diethyl-β-butoxy propionamide: available from Idemitsu Kosan Co., Ltd.

N,N-diethyl-β-heptoxypropionamide: available from Idemitsu Kosan Co., Ltd.

The colorants, the polysiloxane surfactant, the styrene-acryl resin particles, the polyurethane resin particles, the organic solvent, and the antiseptic agent of Tables G-1-1, G-1-2, G-2-1, G-2-2, and G-3 were the same colorants, polysiloxane surfactant, styrene-acryl resin particles, polyurethane resin particles, organic solvent, and antiseptic agent of Tables A-1-1, A-1-2, A-2-1, A-2-2, and A-3.

Next, "storage stability", "fixability (beading)", "rubfastness", "solvent resistance", "image gloss level", "close adhesiveness", and "drying ability" were evaluated in the following manners. The results are presented in Table G-4. Here, "storage stability", "fixability (beading)", "rubfastness", "solvent resistance", "image gloss level", and "close adhesiveness" were evaluated in the same manners as in Example A1.

<Drying Ability>

Next, each of the inks G1 to G14 of Examples G1 to G12 and Comparative Examples G1 and G2 was loaded into the inkjet printer (apparatus name: remodeled apparatus of IPSIO GXE 5500, available from Ricoh Co., Ltd.) and a solid image was printed on a polyvinyl chloride film (CP-PVWP 1300, available from SAKURAI CO., LTD., hereinafter may be referred to as "PVC film") print medium so that an amount of the ink deposited was 0.6 g/cm². After the printing, the solid image was dried on a hot plate (NINOS ND-1, available from AS ONE Corporation.) that had been set to 50° C. A filter paper was attached to the solid portion of the solid image after the drying, and transfer of the ink onto the filter paper was visually observed to evaluate the ink for "drying ability" based on the following evaluation criteria.

[Evaluation Criteria]

A: The ink is not transferred onto the filter paper even after the ink is dried at 50° C. for 5 minutes or less.

B: The ink is not transferred onto the filter paper after the ink is dried at 50° C. for more than 5 minutes but 8 minutes or less.

C: The ink is not transferred onto the filter paper after the ink is dried at 50° C. for more than 8 minutes but 10 minutes or less.

D: The ink transferred onto the filter paper is found even after the ink is dried at 50° C. for more than 10 minutes.

Example G3 is an example where the polysiloxane surfactant has somewhat high HLB value. The ink of Example G3 was deteriorated in fixability and drying ability compared to the ink of Example G1.

Example G4 is an example where the polysiloxane surfactant has somewhat high HLB value. The ink of Example G4 was deteriorated in fixability compared to the ink of Example G1.

Example G5 and Example G6 are examples where the polysiloxane surfactants have somewhat low HLB values. The inks of
Example G5 and Example G6 were deteriorated in storage stability compared to the ink of Example G1.

Example G7 is an example where the amount of the polysiloxane surfactant added is somewhat low. The ink of Example G7 is deteriorated in fixability, solvent resistance, and drying ability compared to the ink of Example G1.

Example G8 is an example where the amount of the polysiloxane surfactant added is somewhat high. The ink of Example G8 is deteriorated in storage stability and drying ability compared to the ink of Example G1.

Example G9 is an example where the glass transition temperature (Tg) of the acryl-silicone resin emulsions is higher than 0° C. The ink of Example G9 was deteriorated in close adhesiveness and drying ability compared to the ink of Example G1.

Example G10 is an example where the glass transition temperature (Tg) of the acryl-silicone resin emulsions is higher than 0° C. The ink of Example G10 was deteriorated in close adhesiveness compared to the ink of Example G1.

Example G11 is an example where the amount of the acryl-silicone resin particles is somewhat insufficient compared to the amount of the polysiloxane surfactant. The ink of Example G11 was deteriorated in storage stability compared to the ink of Example G1.

Example G12 is an example where the amount of the acryl-silicone resin particles is somewhat higher compared to the amount of the polysiloxane surfactant. The ink of

TABLE G-4

| | | Evaluation results | | | | | | |
|---|---|---|---|---|---|---|---|---|
| | | Fixability (beading) | Storage stability | Rubfastness | Solvent resistance | Image gloss level | Close adhesiveness | Drying ability |
| Examples | G1 | A | A | AA | A | AA | A | A |
| | G2 | A | A | AA | A | AA | A | A |
| | G3 | B | A | AA | A | AA | A | B |
| | G4 | B | A | AA | A | AA | A | A |
| | G5 | A | B | AA | A | AA | A | A |
| | G6 | A | B | A | A | A | A | A |
| | G7 | B | A | AA | B | A | A | B |
| | G8 | A | B | A | A | A | A | B |
| | G9 | A | A | A | A | AA | B | B |
| | G10 | A | A | AA | A | AA | B | A |
| | G11 | A | B | AA | A | AA | A | A |
| | G12 | A | A | A | A | B | A | A |
| Comparative Examples | G1 | C | A | A | C | B | B | A |
| | G2 | A | D | A | B | A | C | B |

Example G1 and Example G2 are preferable Examples of the present disclosure. It is found that the inks of Example G1 and Example G2 are excellent in close adhesiveness to a PVC film print medium. In addition, it is found that use of the inks makes it possible to obtain images having high image gloss level and having rubfastness, solvent resistance, and drying ability even when an image is printed on an impermeable print medium.

Example G12 was deteriorated in image gloss level compared to the ink of Example G1.

Meanwhile, Comparative Example G1 is an example where the ink includes no polysiloxane surfactant having an HLB value of 8 or less. Comparative Example G2 is an example where the ink includes no acryl-silicone resin particles. The ink of Comparative Examples G1 was particularly deteriorated in fixability and solvent resistance compared to the ink of Example G1. The ink of Comparative Example G2 was particularly deteriorated in storage stability and close adhesiveness compared to the ink of Example G1.

From the results of the Table G-4, it is found that the ink of the present disclosure is suitably used for outdoor applications. In addition, the inks of Examples G1 to G12 were excellent in fixability, storage stability, rubfastness, solvent resistance, image gloss level, close adhesiveness, and drying ability.

Test Examples A to G

<Evaluation of Influence Through Heating and Drying>

The ink A1 of Example A1, the ink B1 of Example B1, the ink C1 of Example C1, the ink D1 of Example D1, the ink E1 of Example E1, the ink F1 of Example F1, and the ink G1 of Example G1 were evaluated for fixability (beading) and rubfastness in the same manner as in Example A1 and were evaluated for drying ability in the same manner as in Example G1 except that the heating conditions (heating temperature and heating time) after printing were changed as presented in the following Tables H-1 to H7. The results are presented in Table H-1 to Table H-7.

Here, Test Examples A1-8, B1-8, C1-8, D1-8, E1-8, F1-8, and G1-8 were performed in the following manners. The ink A1, the ink B1, the ink C1, the ink D1, the ink E1, the ink F1, and the ink G1 were used to print solid images in the same manner as in the Example A1. Then, the solid images were left to stand at 25° C. for 24 hours without heating after the printing to dry the solid images.

TABLE H-1

|  |  | Ink Nos. | Heating temperature (° C.) | Heating time | Evaluation results | | |
|---|---|---|---|---|---|---|---|
|  |  |  |  |  | Fixability (beading) | Drying ability | Rubfastness |
| Test Examples A | A1-1 | A1 | 80 | 1 Hour | A | A | AA |
|  | A1-2 | A1 | 70 | 1 Hour | A | A | AA |
|  | A1-3 | A1 | 75 | 1 Hour | A | A | AA |
|  | A1-4 | A1 | 85 | 1 Hour | A | A | AA |
|  | A1-5 | A1 | 90 | 1 Hour | A | A | AA |
|  | A1-6 | A1 | 80 | 10 Minutes | A | A | A |
|  | A1-7 | A1 | 80 | 30 Minutes | A | A | AA |
|  | A1-8 | A1 | — | — | A | B | B |

TABLE H-2

|  |  | Ink Nos. | Heating temperature (° C.) | Heating time | Evaluation results | | |
|---|---|---|---|---|---|---|---|
|  |  |  |  |  | Fixability (beading) | Drying ability | Rubfastness |
| Test Examples B | B1-1 | B1 | 80 | 1 Hour | A | A | AA |
|  | B1-2 | B1 | 70 | 1 Hour | A | A | AA |
|  | B1-3 | B1 | 75 | 1 Hour | A | A | AA |
|  | B1-4 | B1 | 85 | 1 Hour | A | A | AA |
|  | B1-5 | B1 | 90 | 1 Hour | A | A | AA |
|  | B1-6 | B1 | 80 | 10 Minutes | A | A | A |
|  | B1-7 | B1 | 80 | 30 Minutes | A | A | AA |
|  | B1-8 | B1 | — | — | A | B | B |

TABLE H-3

|  |  | Ink Nos. | Heating temperature (° C.) | Heating time | Evaluation results | | |
|---|---|---|---|---|---|---|---|
|  |  |  |  |  | Fixability (beading) | Drying ability | Rubfastness |
| Test Examples C | C1-1 | C1 | 80 | 1 Hour | A | A | AA |
|  | C1-2 | C1 | 70 | 1 Hour | A | A | AA |
|  | C1-3 | C1 | 75 | 1 Hour | A | A | AA |
|  | C1-4 | C1 | 85 | 1 Hour | A | A | AA |
|  | C1-5 | C1 | 90 | 1 Hour | A | A | AA |
|  | C1-6 | C1 | 80 | 10 Minutes | A | A | A |
|  | C1-7 | C1 | 80 | 30 Minutes | A | A | AA |
|  | C1-8 | C1 | — | — | A | B | B |

TABLE H-4

| | Ink Nos. | Heating temperature (° C.) | Heating time | Evaluation results Fixability (beading) | Drying ability | Rubfastness |
|---|---|---|---|---|---|---|
| Test Examples D | D1-1 D1 | 80 | 1 Hour | A | A | AA |
| | D1-2 D1 | 70 | 1 Hour | A | A | AA |
| | D1-3 D1 | 75 | 1 Hour | A | A | AA |
| | D1-4 D1 | 85 | 1 Hour | A | A | AA |
| | D1-5 D1 | 90 | 1 Hour | A | A | AA |
| | D1-6 D1 | 80 | 10 Minutes | A | A | A |
| | D1-7 D1 | 80 | 30 Minutes | A | A | AA |
| | D1-8 D1 | — | — | A | B | B |

TABLE H-5

| | Ink Nos. | Heating temperature (° C.) | Heating time | Evaluation results Fixability (beading) | Drying ability | Rubfastness |
|---|---|---|---|---|---|---|
| Test Examples E | E1-1 E1 | 80 | 1 Hour | A | A | AA |
| | E1-2 E1 | 70 | 1 Hour | A | A | AA |
| | E1-3 E1 | 75 | 1 Hour | A | A | AA |
| | E1-4 E1 | 85 | 1 Hour | A | A | AA |
| | E1-5 E1 | 90 | 1 Hour | A | A | AA |
| | E1-6 E1 | 80 | 10 Minutes | A | A | A |
| | E1-7 E1 | 80 | 30 Minutes | A | A | AA |
| | E1-8 E1 | — | — | A | B | B |

TABLE H-6

| | Ink Nos. | Heating temperature (° C.) | Heating time | Evaluation results Fixability (beading) | Drying ability | Rubfastness |
|---|---|---|---|---|---|---|
| Test Examples F | F1-1 F1 | 80 | 1 Hour | A | A | AA |
| | F1-2 F1 | 70 | 1 Hour | A | A | AA |
| | F1-3 F1 | 75 | 1 Hour | A | A | AA |
| | F1-4 F1 | 85 | 1 Hour | A | A | AA |
| | F1-5 F1 | 90 | 1 Hour | A | A | AA |
| | F1-6 F1 | 80 | 10 Minutes | A | A | A |
| | F1-7 F1 | 80 | 30 Minutes | A | A | AA |
| | F1-8 F1 | — | — | A | B | B |

TABLE H-7

| | Ink Nos. | Heating temperature (° C.) | Heating time | Evaluation results Fixability (beading) | Drying ability | Rubfastness |
|---|---|---|---|---|---|---|
| Test Examples G | G1-1 G1 | 80 | 1 Hour | A | A | AA |
| | G1-2 G1 | 70 | 1 Hour | A | A | AA |
| | G1-3 G1 | 75 | 1 Hour | A | A | AA |
| | G1-4 G1 | 85 | 1 Hour | A | A | AA |
| | G1-5 G1 | 90 | 1 Hour | A | A | AA |
| | G1-6 G1 | 80 | 10 Minutes | A | A | A |
| | G1-7 G1 | 80 | 30 Minutes | A | A | AA |
| | G1-8 G1 | — | — | A | B | B |

Aspects of the present disclosure are as follows, for example.

<1> An ink including:
water;
at least one organic solvent;
a polysiloxane surfactant; and
acryl-silicone resin particles,
wherein the polysiloxane surfactant has an Etta value of 8 or less.

<2> The ink according to <1>, further including
at least one selected from the group consisting of polyurethane resin particles, fluororesin particles, vinyl chloride resin particles, polyester resin particles, acryl-styrene copolymer resin particles, and polyvinyl alcohol resin particles.

<3> The ink according to <1> or <2>,
wherein the at least one organic solvent includes a compound represented by General Formula (1) below:

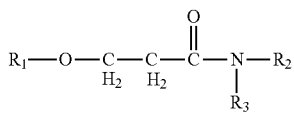

General Formula (1)

where in the General Formula (1) $R_1$, $R_2$, and $R_3$ each independently represent a hydrocarbon group including 1 or more but 8 or less carbon atoms and the hydrocarbon group may have an ether bond.

<4> The ink according to any one of <1> to <3>,
wherein the polysiloxane surfactant has an HLB value of 4.5 or more but 7.0 or less.

<5> The ink according to any one of <1> to <4>,
wherein an amount of the polysiloxane surfactant is 1.0% by mass or more but 2.0% by mass or less.

<6> The ink according to any one of <1> to <5>,
wherein the acryl-silicone resin particles have a glass transition temperature of 0° C. or less.

<7> The ink according to any one of <1> to <6>,
wherein a mass ratio (B/A) of an amount B (% by mass) of the acryl-silicone resin particles to an amount A (% by mass) of the polysiloxane surfactant is 0.8 or more but 1.5 or less.

<8> The ink according to any one of <1> to <7>,
wherein an amount of a silicone derived from the acryl-silicone resin particles is 0.01% by mass or more but 0.04% by mass or less.

<9> The ink according to any one of <1> to <8>,
wherein a minimum film forming temperature of the acryl-silicone resin particles is 20° C. or less.

<10> The ink according to any one of <1> to <9>,
wherein an amount of the acryl-silicone resin particles is 0.5% by mass or more but 5% by mass or less.

<11> The ink according to any one of <1> to <10>,
wherein a glass transition temperature of the fluororesin particles is 100° C. or more but 300° C. or less.

<12> The ink according to any one of <1> to <11>,
wherein an amount of the at least one organic solvent is 10% by mass or more but 60% by mass or less.

<13> The ink according to any one of <3> to <12>,
wherein an amount of the compound represented by the General Formula (1) is 5% by mass or more but 30% by mass or less.

<14> The ink according to any one of <1> to <13>, further including a colorant.

<15> The ink according to <14>,
wherein the colorant is a pigment.

<16> An inkjet printing apparatus including:
an ink accommodating section including the ink according to any one of <1> to <15>; and
a discharging head configured to apply a stimulus to the ink to discharge the ink.

<17> The inkjet printing apparatus according to <16>,
wherein the discharging head includes:
an individual liquid chamber;
an inflow path configured to allow the ink to flow into the individual liquid chamber; and
an outflow path configured to allow the ink to flow out from the individual liquid chamber.

<18> The inkjet printing apparatus according to <17>,
further including a circulating unit configured to circulate the ink from the inflow path toward the outflow path.

<19> An inkjet printing method including
applying a stimulus to the ink according to any one of <1> to <15> to discharge the ink to print an image on a print medium.

<20> The inkjet printing method according to <19>, further including allowing an ink discharging head to apply a thermal energy or a mechanical energy to the ink according to any one of <1> to <15> and to discharge the ink to print an image,
wherein the ink discharging head includes an inflow path configured to allow the ink to flow into an individual liquid chamber and an outflow path configured to allow the ink to flow out from the individual liquid chamber.

<21> The inkjet printing method according to <20>, further including circulating the ink from the inflow path toward the outflow path while no printing is performed.

<22> The inkjet printing method according to any one of <19> to <21>, further including
heating the print medium.

<23> The inkjet printing method according to <22>,
wherein a heating temperature in the heating is 40° C. or more but 100° C. or less.

<24> A printed matter including
a print medium; and
an image on the print medium, the image including a polysiloxane surfactant and an acryl-silicone resin,
wherein the polysiloxane surfactant has an HLB value of 8 or less.

The ink according to any one of <1> to <15>, the inkjet printing apparatus according to any one of <16> to <18>, the inkjet printing method according to any one of <19> to <23>, and the printed matter according to <24> can solve the various existing problems and can achieve the object of the present disclosure.

What is claimed is:
1. An ink comprising:
water;
at least one organic solvent;
a polysiloxane surfactant; and
acryl-silicone resin particles,
wherein the polysiloxane surfactant has an HLB value of 8 or less, and
the acryl-silicone resin particles have a glass transition temperature of 0° C. or less.

2. The ink according to claim 1, further comprising
at least one selected from the group consisting of polyurethane resin particles, fluororesin particles, vinyl chloride resin particles, polyester resin particles, acryl-styrene copolymer resin particles, and polyvinyl alcohol resin particles.

3. The ink according to claim 1,
wherein the at least one organic solvent includes a compound represented by General Formula (1) below:

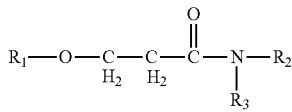

General Formula (1)

where in the General Formula (1), $R_1$, $R_2$, and $R_3$ each independently represent a hydrocarbon group including 1 or more but 8 or less carbon atoms and
the hydrocarbon group may have an ether bond.

4. The ink according to claim 1,
wherein the polysiloxane surfactant has an HLB value of 4.5 or more but 7.0 or less.

5. The ink according to claim 1,
wherein an amount of the polysiloxane surfactant is 1.0% by mass or more but 2.0% by mass or less.

6. The ink according to claim 1,
wherein a mass ratio (B/A) of an amount B (% by mass) of the acryl-silicone resin particles to an amount A (% by mass) of the polysiloxane surfactant is 0.8 or more but 1.5 or less.

7. The ink according to claim 1,
wherein an amount of a silicone derived from the acryl-silicone resin particles is 0.01% by mass or more but 0.04% by mass or less relative to the total amount of the ink.

8. The ink according to claim 1,
wherein a minimum film forming temperature of the acryl-silicone resin particles is 20° C. or less.

9. An inkjet printing apparatus comprising:
an ink accommodating section including an ink; and
a discharging head configured to apply a stimulus to the ink to discharge the ink,
wherein the ink includes:
water;
at least one organic solvent;
a polysiloxane surfactant; and
acryl-silicone resin particles,
wherein the polysiloxane surfactant has an HLB value of 8 or less, and
the acryl-silicone resin particles have a glass transition temperature of 0° C. or less.

10. The inkjet printing apparatus according to claim 9,
wherein the discharging head includes:
an individual liquid chamber;
an inflow path configured to allow the ink to flow into the individual liquid chamber; and
an outflow path configured to allow the ink to flow out from the individual liquid chamber.

11. The inkjet printing apparatus according to claim 10, further comprising
a circulating unit configured to circulate the ink from the inflow path toward the outflow path.

12. The inkjet printing apparatus according to claim 9,
wherein the ink further includes at least one selected from the group consisting of polyurethane resin particles, fluororesin particles, vinyl chloride resin particles, polyester resin particles, acryl-styrene copolymer resin particles, and polyvinyl alcohol resin particles.

13. An inkjet printing method comprising
applying a stimulus to the ink according to claim 1 to discharge the ink to print an image on a print medium.

14. The inkjet printing method according to claim 13, further comprising
allowing an ink discharging head to apply a thermal energy or a mechanical energy to the ink and to discharge the ink to print an image,
wherein the ink discharging head includes an inflow path configured to allow the ink to flow into an individual liquid chamber and an outflow path configured to allow the ink to flow out from the individual liquid chamber.

15. The inkjet printing method according to claim 14, further comprising
circulating the ink from the inflow path toward the outflow path while no printing is performed.

16. The inkjet printing method according to claim 13, further comprising
heating the print medium.

17. The inkjet printing method according to claim 16,
wherein a heating temperature in the heating is 40° C. or more but 100° C. or less.

18. The inkjet printing method according to claim 13,
wherein the ink further includes at least one selected from the group consisting of polyurethane resin particles, fluororesin particles, vinyl chloride resin particles, polyester resin particles, acryl-styrene copolymer resin particles, and polyvinyl alcohol resin particles.

19. A printed matter comprising:
a print medium; and
an image on the print medium, the image including a polysiloxane surfactant and an acryl-silicone resin,
wherein the polysiloxane surfactant has an HLB value of 8 or less, and the acryl-silicone resin particles have a glass transition temperature of 0° C. or less.

* * * * *